(12) United States Patent
Matsumoto et al.

(10) Patent No.: US 12,495,528 B2
(45) Date of Patent: Dec. 9, 2025

(54) ACCOMMODATING DEVICE AND ELECTRIC POWER SYSTEM

(71) Applicant: HONDA MOTOR CO., LTD., Tokyo (JP)

(72) Inventors: Takashi Matsumoto, Wako (JP); Tsutomu Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 18/247,950

(22) PCT Filed: Oct. 7, 2021

(86) PCT No.: PCT/JP2021/037237
§ 371 (c)(1),
(2) Date: Apr. 5, 2023

(87) PCT Pub. No.: WO2022/075431
PCT Pub. Date: Apr. 14, 2022

(65) Prior Publication Data
US 2023/0413496 A1    Dec. 21, 2023

(30) Foreign Application Priority Data

Oct. 7, 2020  (JP) ................................ 2020-169849
Oct. 7, 2020  (JP) ................................ 2020-169863

(51) Int. Cl.
*H05K 7/20* (2006.01)
*B60L 53/80* (2019.01)
(Continued)

(52) U.S. Cl.
CPC .......... *H05K 7/20909* (2013.01); *B60L 53/80* (2019.02); *H01M 10/441* (2013.01);
(Continued)

(58) Field of Classification Search
None
See application file for complete search history.

(56) References Cited

U.S. PATENT DOCUMENTS 5,381,684 A    1/1995   Kawamura
6,498,457 B1   12/2002  Tsuboi
(Continued)

FOREIGN PATENT DOCUMENTS

EP    0 902 348 A2   3/1999
EP    3 605 644 A1   2/2020
(Continued)

OTHER PUBLICATIONS

International Search Report issued Dec. 14, 2021 in related International Application No. PCT/JP2021/037230; English translation included (6 pages).
(Continued)

*Primary Examiner* — Mukundbhai G Patel
(74) *Attorney, Agent, or Firm* — Rankin, Hill & Clark LLP

(57) ABSTRACT

A battery exchanger is provided with a slot sleeve for accommodating a mobile battery in an insertable and removable manner. The slot sleeve has a tubular portion and a bottom portion connected to the tubular portion. The tubular portion surrounds the outer periphery of the mobile battery accommodated in the slot sleeve. The bottom portion has an air inlet for causing the inside and the outside of the slot sleeve to communicate with each other, and the tubular portion has exhaust slits for causing the inside and the out-side of the slot sleeve to communicate with each other.

22 Claims, 48 Drawing Sheets

(51) Int. Cl.
*H01M 10/44* (2006.01)
*H01M 10/613* (2014.01)
*H01M 10/6563* (2014.01)
*H01M 50/244* (2021.01)
*H02J 7/00* (2006.01)
*H05K 7/14* (2006.01)
*B60L 53/302* (2019.01)

(52) U.S. Cl.
CPC ..... *H01M 10/613* (2015.04); *H01M 10/6563* (2015.04); *H01M 50/244* (2021.01); *H02J 7/0045* (2013.01); *H05K 7/14* (2013.01); *B60L 53/302* (2019.02); *H01M 2220/20* (2013.01); *H02J 7/0042* (2013.01)

(56) References Cited

U.S. PATENT DOCUMENTS

| | | | | |
|---|---|---|---|---|
| 6,704,198 | B2 * | 3/2004 | Replogle | H05K 7/186 |
| | | | | 165/122 |
| 7,843,692 | B2 * | 11/2010 | Everhart | H05K 7/20572 |
| | | | | 361/679.55 |
| 2005/0056401 | A1 | 3/2005 | Saito et al. | |
| 2007/0086158 | A1 * | 4/2007 | Hartung | H05K 7/20563 |
| | | | | 361/690 |
| 2014/0376221 | A1 * | 12/2014 | Eliason | B05D 3/067 |
| | | | | 362/235 |
| 2015/0382496 | A1 * | 12/2015 | Burant, Jr. | H01M 10/0445 |
| | | | | 361/624 |
| 2016/0068075 | A1 | 3/2016 | Chen et al. | |
| 2019/0372365 | A1 | 12/2019 | Qin et al. | |
| 2019/0393627 | A1 | 12/2019 | Etsunagi et al. | |
| 2022/0137689 | A1 | 5/2022 | Fujita | |

FOREIGN PATENT DOCUMENTS

| | | |
|---|---|---|
| EP | 3 644 288 A2 | 4/2020 |
| JP | 62-164686 U | 10/1987 |
| JP | H5-238324 A | 9/1993 |
| JP | H9-207626 A | 8/1997 |
| JP | 10-313543 A | 11/1998 |
| JP | 11-98613 A | 4/1999 |
| JP | 2000-82499 A | 3/2000 |
| JP | 2000-164185 A | 6/2000 |
| JP | 2000-339538 A | 12/2000 |
| JP | 2000-341868 A | 12/2000 |
| JP | 2004-215330 A | 7/2004 |
| JP | 2005-93662 A | 4/2005 |
| JP | 2010-129474 A | 6/2010 |
| JP | 2011-249018 A | 12/2011 |
| JP | 2013-089289 A | 5/2013 |
| JP | 2017-529821 A | 10/2017 |
| JP | 2018-163757 A | 10/2018 |
| JP | 2019-193325 A | 10/2019 |
| WO | 2013/054686 A1 | 4/2013 |
| WO | 2020/153477 A1 | 7/2020 |
| WO | 2020/171170 A1 | 8/2020 |

OTHER PUBLICATIONS

Extended European Search Report dated Oct. 9, 2024 issued in corresponding European application No. 21877730.8; English text (8 pages).
Thingverse.com: "IKEA Grono lamp by Holixus—Thingiverse", Feb. 6, 2020, pp. 1-7, XP093203393, Retrieved from the Internet: URL: https://www.thingiverse.com/thing:4147435/files.
Extended European Search Report dated Nov. 20, 2024 issued in related European application No. 21877726.6; English text (10 pages).
International Search Report dated Dec. 21, 2021, Application No. PCT/JP2021/037237; English translation Included, 4 pages.
Japanese Office Action dated Jul. 1, 2025 issued in corresponding Japanese application No. 2022-555575; English machine translation included (10 pages).
Japanese Office Action Corresponding to JP Application No. 2022-555576, dated Oct. 21, 2025, 8 pages.

* cited by examiner

FIG. 21
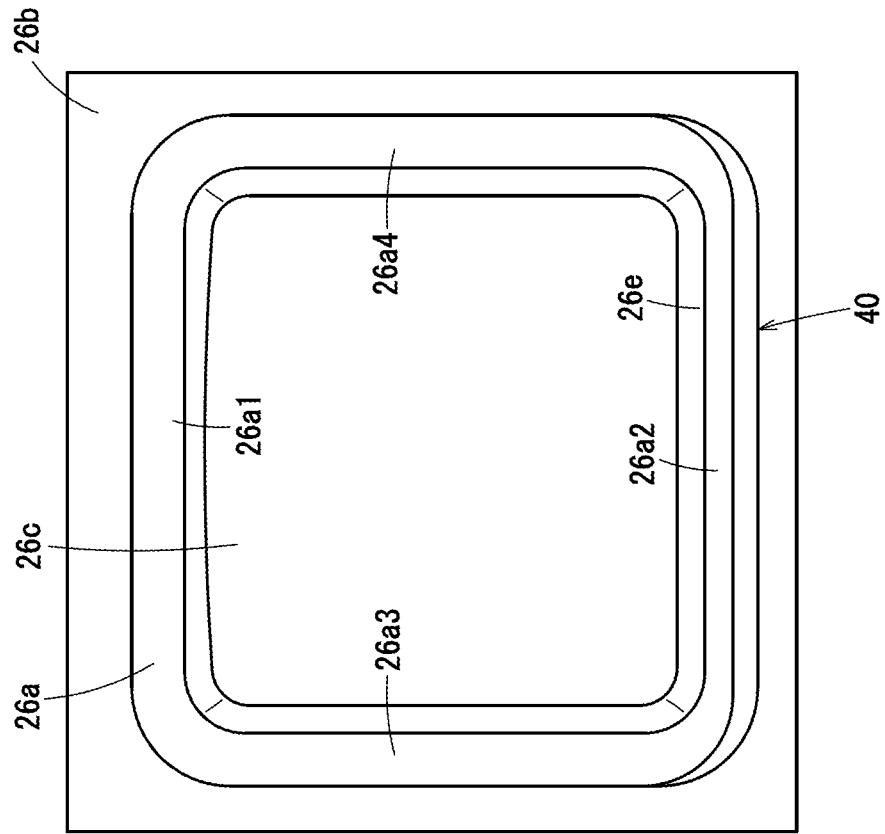
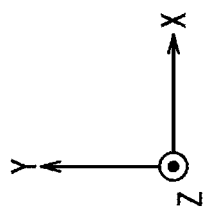

ACCOMMODATING DEVICE AND ELECTRIC POWER SYSTEM

TECHNICAL FIELD

The present invention relates to a storage apparatus (accommodating device) that stores electric devices.

BACKGROUND ART

JP 2018-163757 A discloses a storage apparatus that stores a storage battery. Furthermore, JP H11-098613 A discloses a storage apparatus that performs temperature management of a storage battery stored therein.

SUMMARY OF THE INVENTION

However, there is room for improvement with regard to air flow inside the storage apparatus.

The present invention has an object of providing a better storage apparatus.

A storage apparatus according to an aspect of the present invention includes a storage portion that includes an insertion port into which an electric device is inserted, the storage portion being configured to store the electric device in an insertable and removable manner, wherein: the storage portion includes a tubular portion and a bottom portion connected to the tubular portion; the tubular portion surrounds an outer periphery of the electric device stored in the storage portion; the bottom portion includes a first communication path configured to allow an outside and an inside of the storage portion to communication with each other; and the tubular portion includes a second communication path configured to allow the outside and the inside of the storage portion to communicate with each other.

According to the present invention, it is possible to provide a storage apparatus in which interior air flow thereof is improved.

BRIEF DESCRIPTION OF DRAWINGS

FIG. 21 is a front view of a slot flange.

DETAILED DESCRIPTION OF THE INVENTION

First Embodiment

Figure 1:
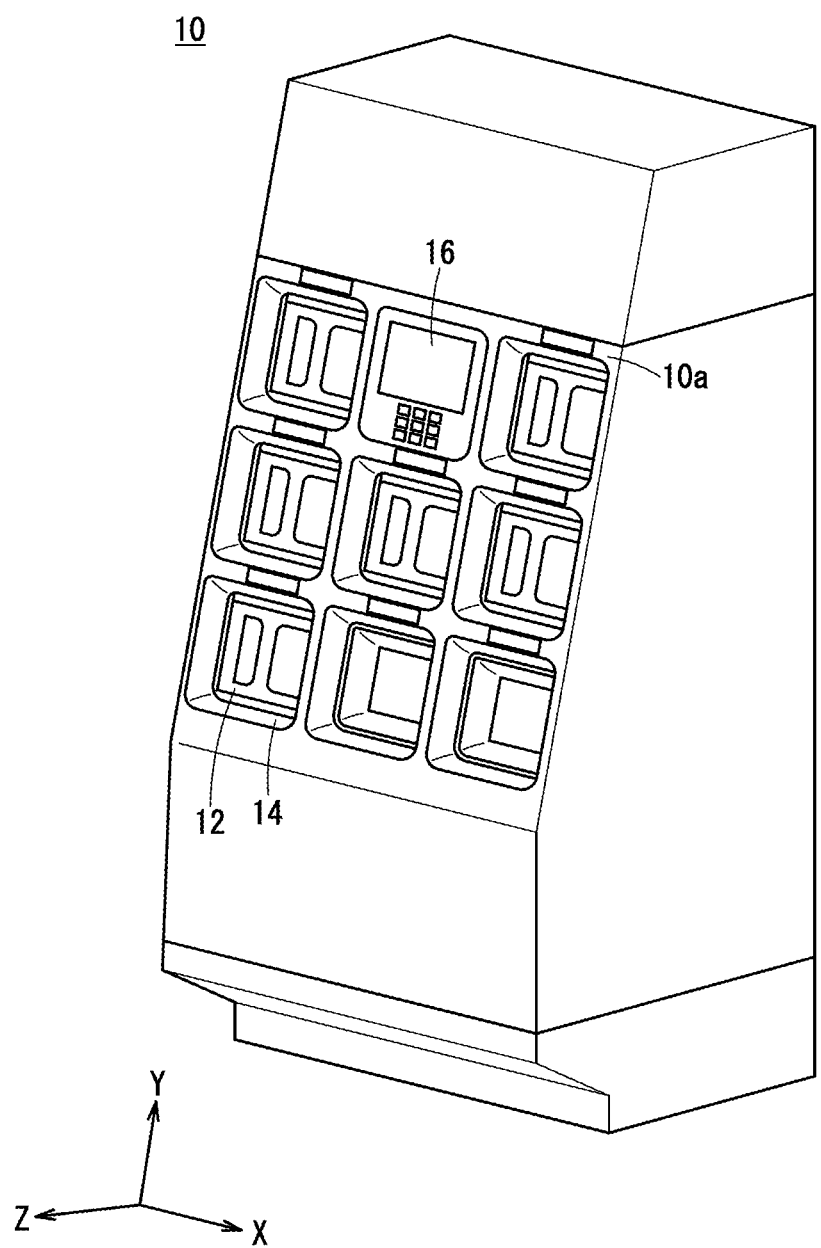
FIG. 1 is an external schematic view of a battery exchanger.

FIG. 1 is an external schematic view of a battery exchanger 10. The battery exchanger 10 is an apparatus that charges a mobile battery 12. A user stores a mobile battery 12 whose SOC (State Of Charge) has become low, in the battery exchanger 10. The user takes a different mobile battery 12 that has been charged, from the battery exchanger 10. The battery exchanger 10 corresponds to a storage apparatus of the present invention. The mobile battery 12 corresponds to an electric device of the present invention.

The battery exchanger 10 includes eight slots 14 and one operation panel 16. The user inserts a mobile battery 12 into a slot 14. When the mobile battery 12 is inserted into the slot 14, the battery exchanger 10 starts charging the mobile battery 12. The slot 14 corresponds to a storage portion of the present invention. The operation panel 16 is an apparatus that is operated by the user. The user makes a payment or the like, for example, by operating the operation panel 16.

The slot 14 opens in a front surface 10a of the battery exchanger 10. The front surface 10a of the battery exchanger 10 is inclined relative to a vertical direction (direction of gravity). In a state where the user is standing and facing the front surface 10a, the top portion of the front surface 10a is positioned farther from the user than the bottom portion of the front surface 10a. Due to this, when the user inserts the mobile battery 12 into the slot 14, the user can lean forward. Therefore, the mobile battery 12 can be easily inserted into the slot 14.

Figure 2:
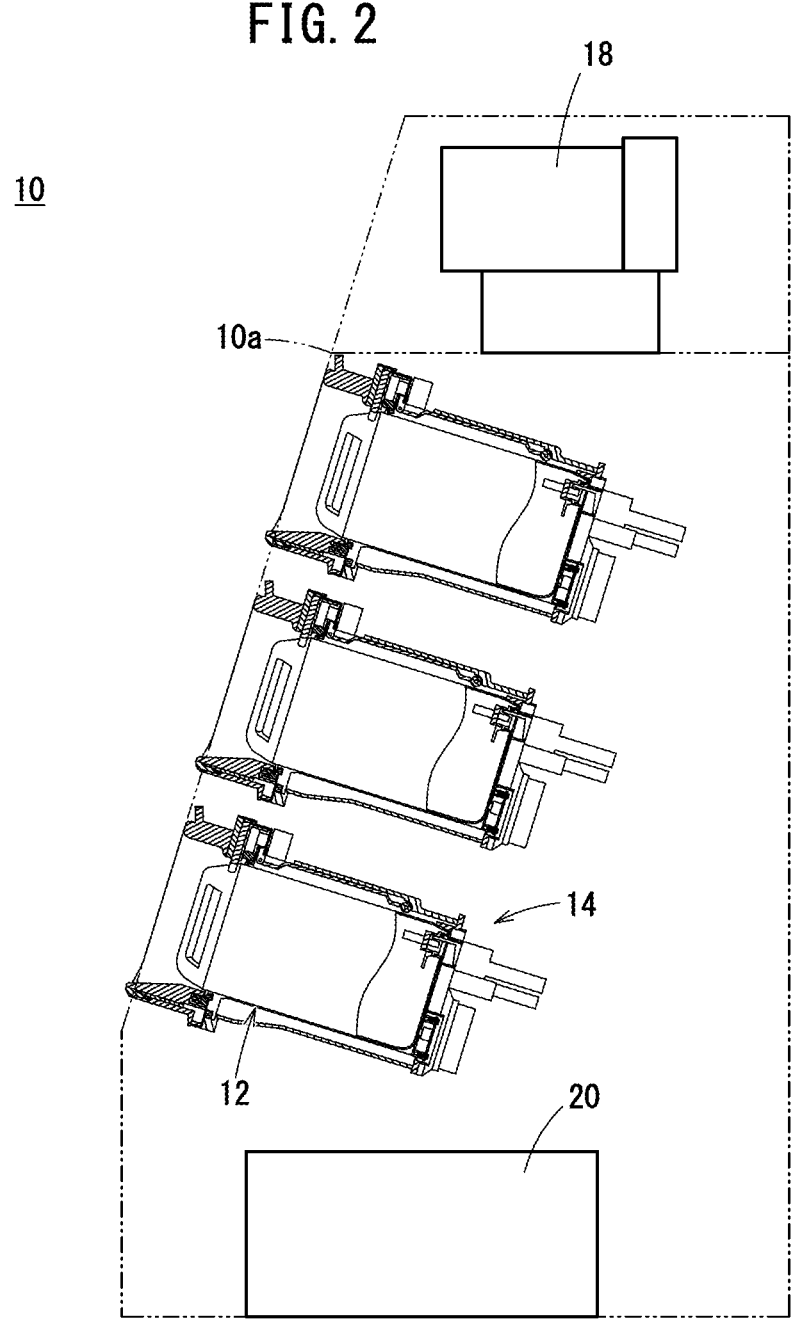
FIG. 2 is a cross-sectional schematic view of the battery exchanger.

FIG. 2 is a cross-sectional schematic view of the battery exchanger 10. The battery exchanger 10 includes a control apparatus 18 above the slots 14. The control apparatus 18 controls the battery exchanger 10. The battery exchanger 10 includes a utility space 20 below the slots 14. A cooling apparatus, which cools the inside of the battery exchanger 10, and the like are optionally installed in the utility space 20.

The following describes the battery exchanger 10 based on an X-axis, a Y-axis, and a Z-axis defined as shown below. The direction in which the mobile battery 12 is inserted into and removed from the slot 14 is the Z-axis direction, and the direction from the depth of the slot 14 toward the opening 26e is the +Z-axis direction. The +Z-axis direction is the direction in which the mobile battery 12 is removed from the slot 14. A direction parallel to the width direction of the battery exchanger 10 is the X-axis direction, and a direction to the right side, when viewed from the side toward which the slot 14 opens in the front surface 10a of the battery exchanger 10, is the +X-axis direction. A direction orthogonal to the Z-axis and the X-axis is the Y-axis direction, and a direction upward is the +Y-axis direction.

In the following, a view from the +Z-axis direction is a front view, a view from the −Z-axis direction is a rear view, a view from the +Y-axis direction is a top view, a view from the −Y-axis direction is a bottom view, a view from the +X-axis direction is a right side view, and a view from the −X-axis direction is a left side view.

[Overall Configuration of the Slot]

Figure 3:
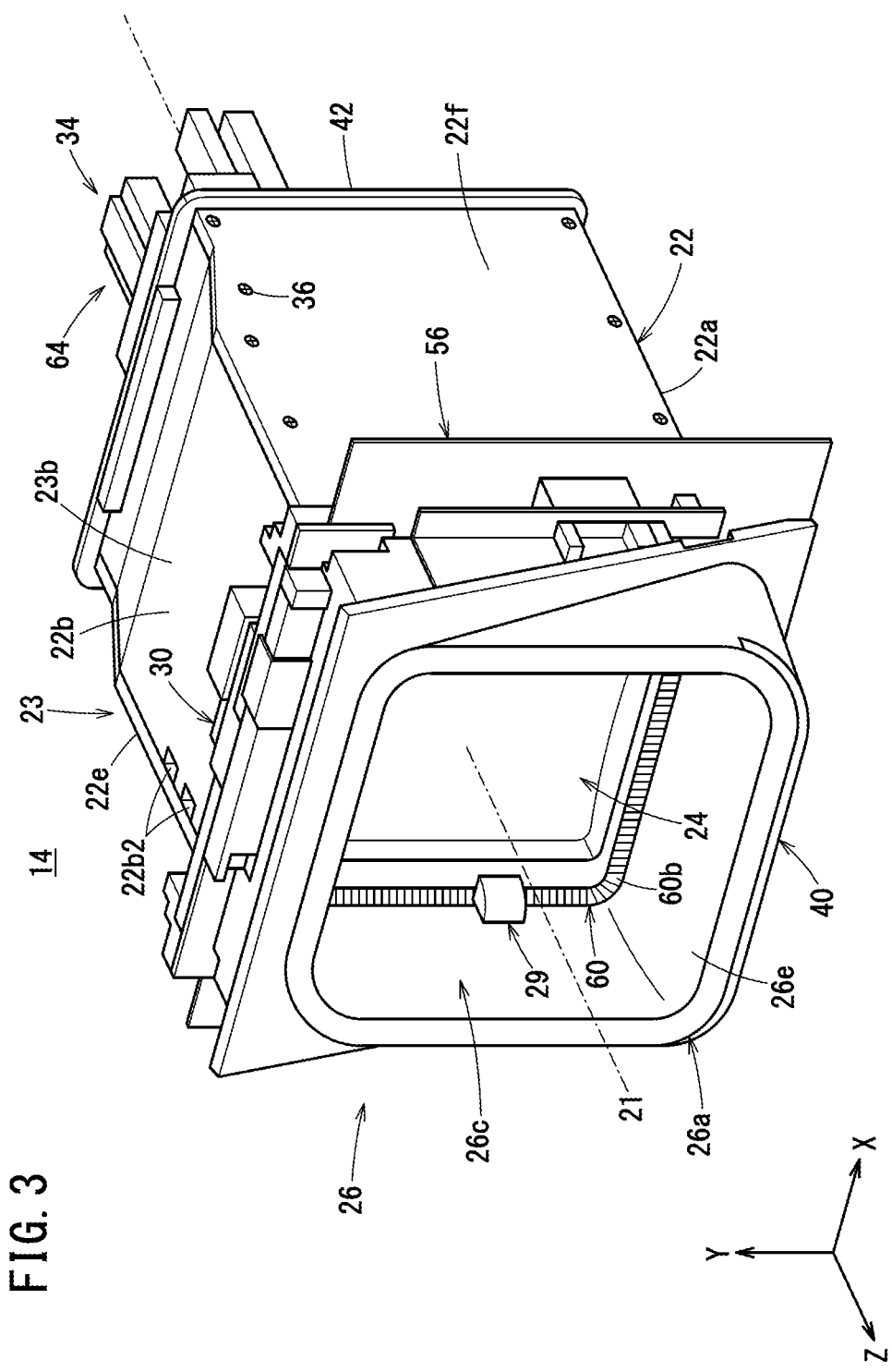
FIG. 3 is a perspective view of a slot.
Figure 4:
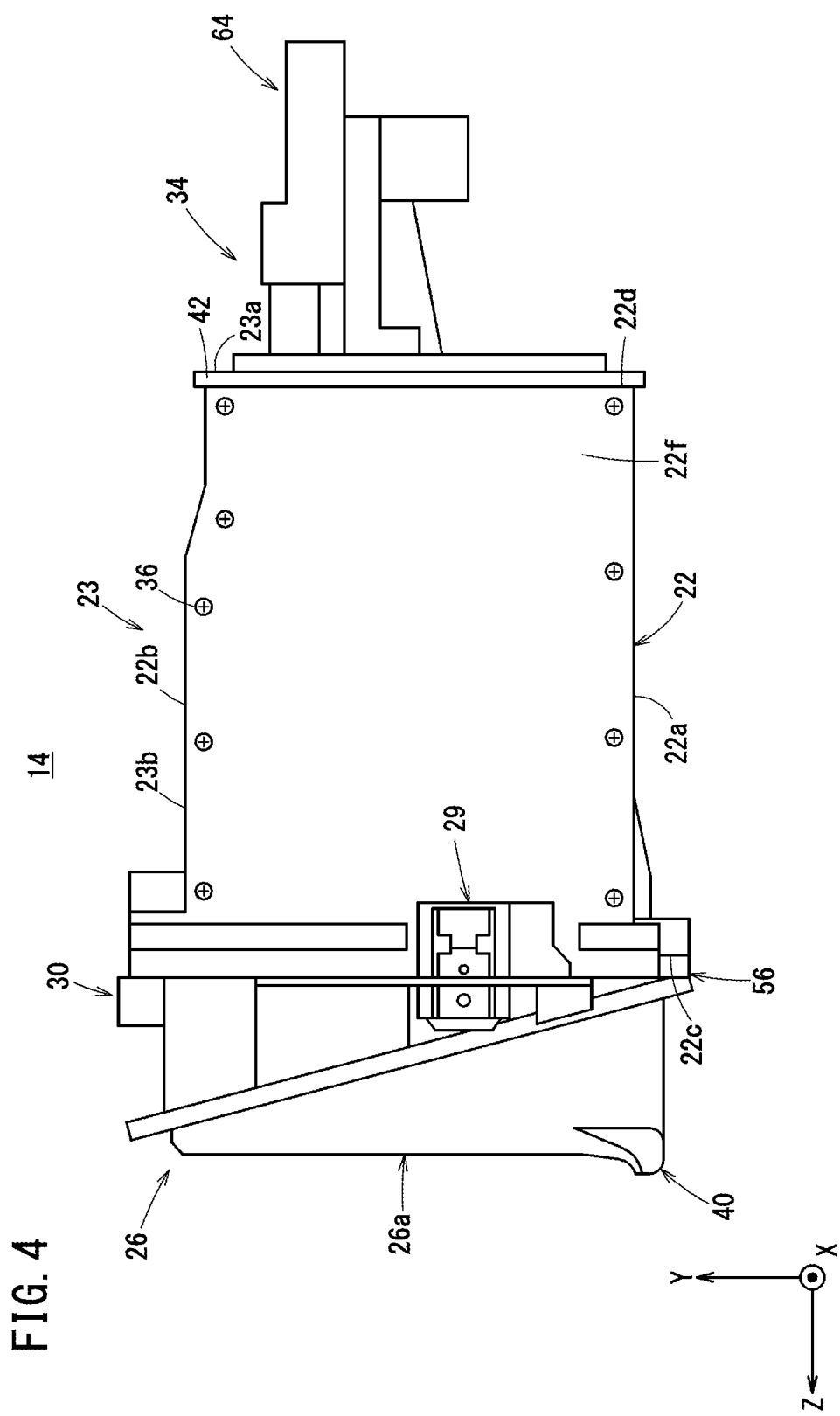
FIG. 4 is a right side view of the slot.
Figure 5:
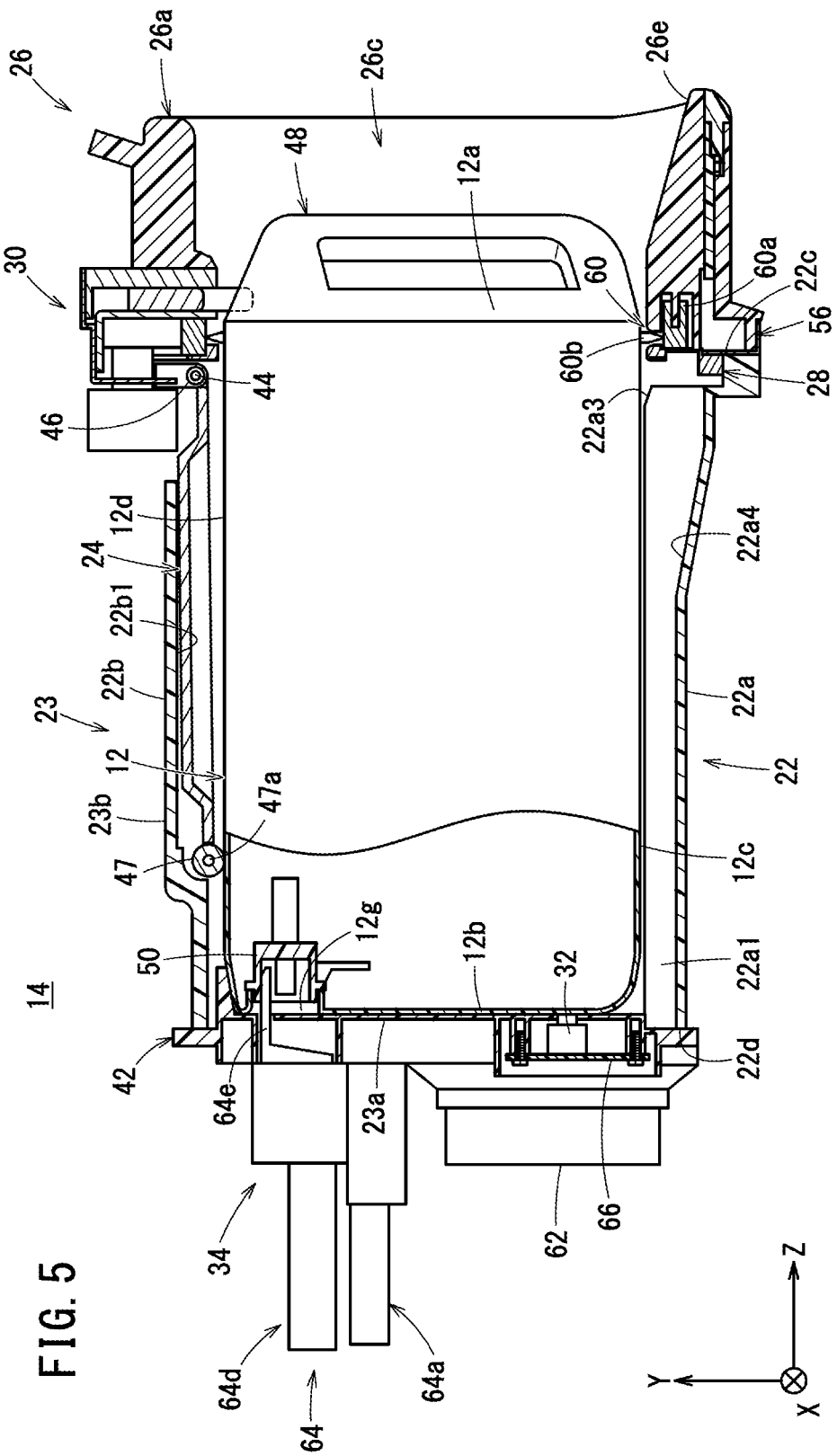
FIG. 5 is a cross-sectional view of the slot.
Figure 6:
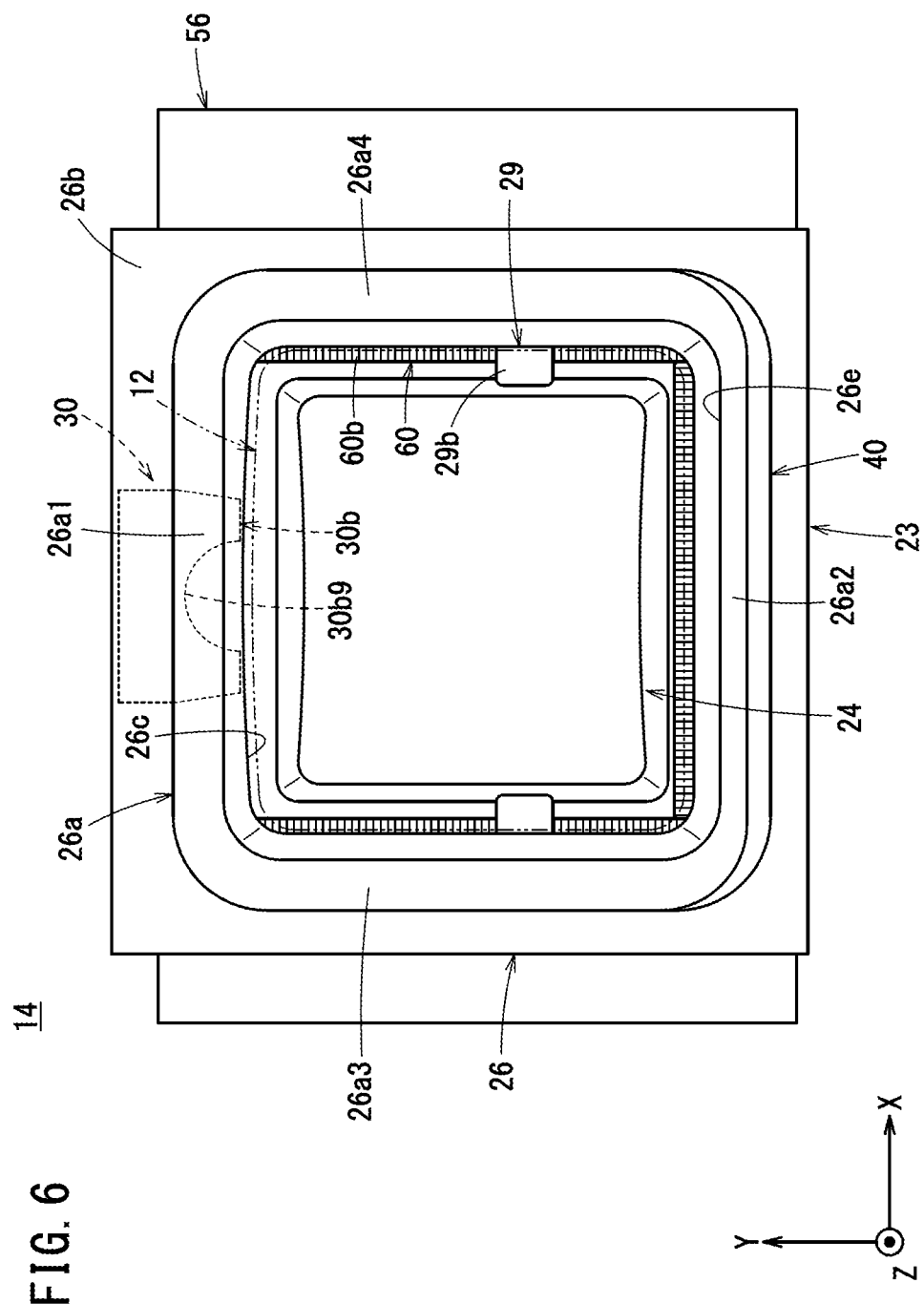
FIG. 6 is a front view of the slot.
Figure 7:
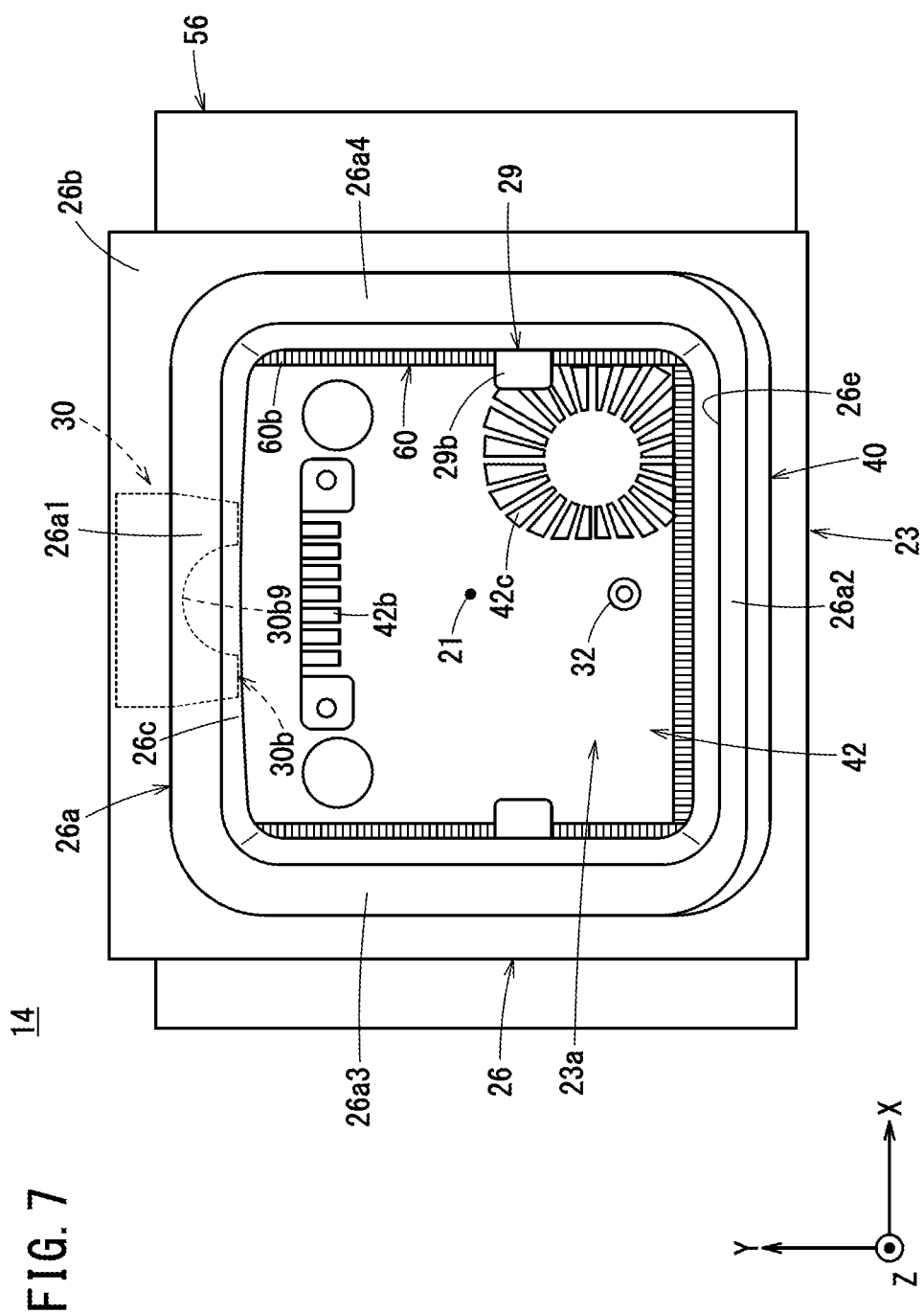
FIG. 7 is a front view of the slot.
Figure 8:
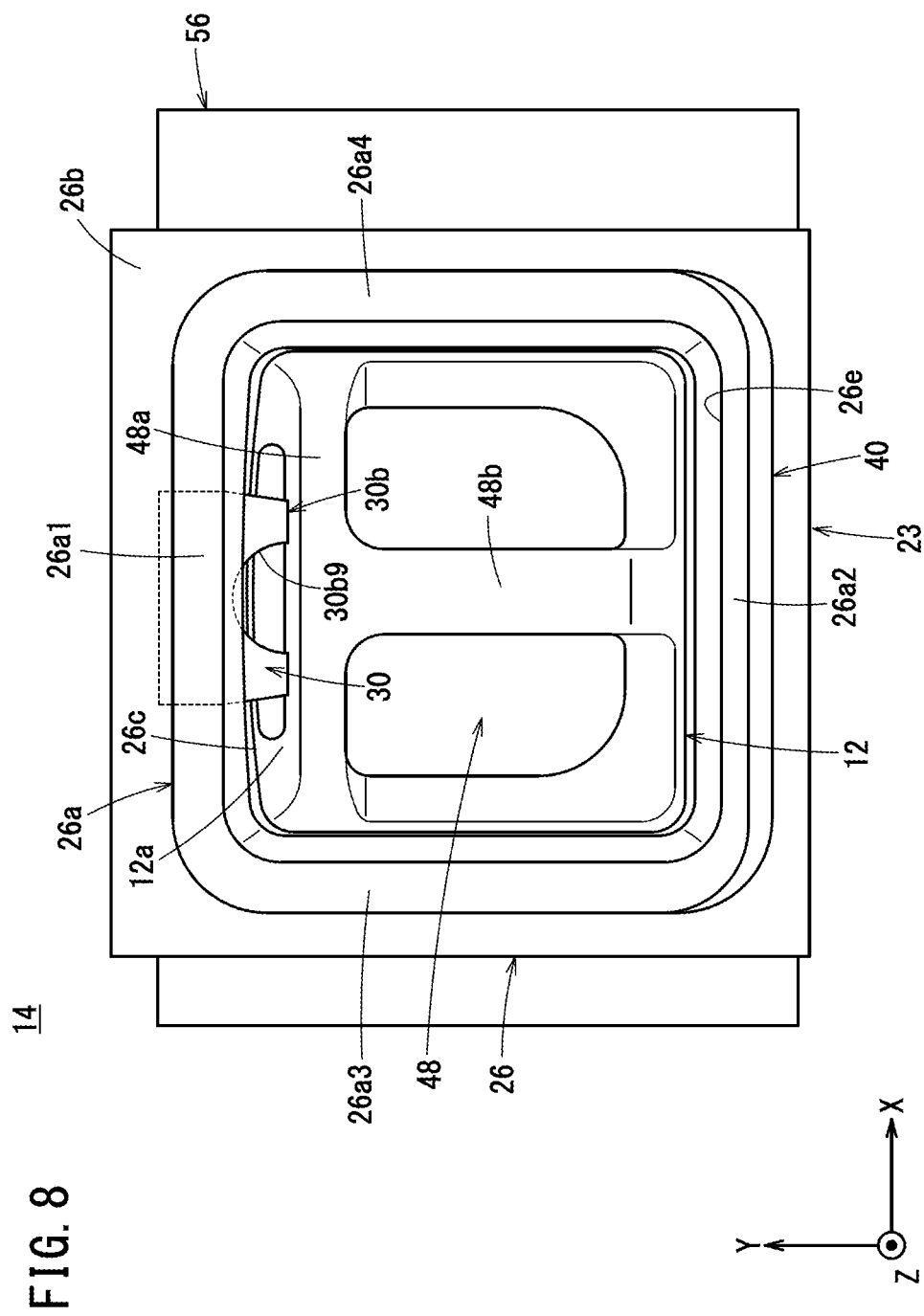
FIG. 8 is a front view of the slot.

FIG. 3 is a perspective view of a slot 14. FIG. 4 is a right side view of the slot 14. FIG. 5 is a cross-sectional view of the slot 14. FIGS. 6, 7, and 8 are each a front view of the slot 14. FIGS. 3, 4, and 6 each show a state in which a mobile battery 12 is not stored in the slot 14. FIG. 7 shows a state in which an inner door 24, described further below, is open. FIGS. 5 and 8 each show a state in which the mobile battery 12 is stored in the slot 14. The overall configuration of the slot 14 will be described using FIGS. 3, 4, 5, 6, 7, and 8.

The slot 14 includes a slot sleeve 23. The slot sleeve 23 is shaped as a bottomed tube, and includes a bottom portion 23a and a tubular portion 23b. The slot sleeve 23 stores the mobile battery 12. The tubular portion 23b surrounds the outer periphery of the mobile battery 12 stored in the slot sleeve 23. The slot sleeve 23 includes a slot body 22, a slot flange 26, and a bottom cover 42.

The tubular portion 23b of the slot sleeve 23 is the slot body 22. As shown in FIGS. 3 and 4, the slot body 22 includes four side surfaces, which are a bottom side plate 22a, a top side plate 22b, a left side surface 22e, and a right side surface 22f. The bottom side plate 22a, the top side plate 22b, the left side surface 22e, and the right side surface 22f are each a plate formed of aluminum. The bottom side plate 22a, the top side plate 22b, the left side surface 22e, and the right side surface 22f are fastened together by bolts 36 to form the tubular portion 23b of the slot sleeve 23. When the slot body 22 is viewed from the Z-axis direction, the external shape of the tubular portion 23b is formed to be approximately rectangular.

The slot body 22 may be made of resin. Furthermore, the four side surfaces of the slot body 22 may be formed integrally by extrusion molding, injection molding, or the like. The slot body 22 is not limited to being made of aluminum, and may be made of another metal or resin. By using aluminum for the slot body 22, the durability of the slot body 22 can be increased compared to a case where resin is used for the slot body 22.

As shown in FIGS. 4 and 5, the slot flange 26 is attached to an opening portion 22c on the +Z-axis-direction side of the slot body 22. The slot flange 26 is formed of resin. The slot flange 26 is not limited to being made of resin, and may be made of metal, for example. As shown in FIGS. 3, 5, 6, 7, and 8, the slot flange 26 includes a guide portion 26a. The guide portion 26a is provided with an insertion port 26c that communicates in the Z-axis direction. The insertion port 26c has an approximately rectangular shape, when the guide portion 26a is viewed from the Z-axis direction. The end portion of the insertion port 26c on a side that does not face toward the slot body 22 is the opening 26e.

As shown in FIGS. 3, 5, and 6, the inner door 24 is provided at the opening portion 22c on the +Z-axis direction side of the slot body 22. When a mobile battery 12 is not being stored in the slot sleeve 23, the inner door 24 closes to block the opening portion 22c of the slot body 22, as shown in FIGS. 3 and 6. When a mobile battery 12 is stored in the slot sleeve 23, the inner door 24 opens on the inside of the slot body 22 and the mobile battery 12 is stored in the slot body 22, as shown in FIG. 5.

As shown in FIGS. 3 and 5, the bottom cover 42 is attached to the opening portion 22d on the −Z-axis direction side of the slot body 22. The bottom cover 42 is made of resin. The bottom portion 23a of the slot sleeve 23 is provided to the bottom cover 42. The bottom cover 42 is not limited to being made of resin, and may be made of metal, for example. The bottom portion 23a is formed with a rectangular shape, when viewed from the Z-axis direction. The tubular portion 23b extends in the Z-axis direction from each of the four edges of the bottom portion 23a.

Resin is used for each of the slot flange 26, the inner door 24, and the bottom cover 42. Due to this, the slot flange 26, inner door 24, and bottom cover 42 can each be manufactured at a lower cost than in a case where metal is used for each of the slot flange 26, inner door 24, and bottom cover 42.

As shown in FIG. 5, a reverse-insertion prevention flange 28 is provided between the slot body 22 and the slot flange 26.

As shown in FIGS. 3, 6, and 7, an inner door lock mechanism 29 is provided to the insertion port 26c of the slot flange 26. When a mobile battery 12 is not stored in the slot sleeve 23, the inner door lock mechanism 29 is in a locked state. Due to this, pivoting of the inner door 24 is restricted, such that the closed inner door 24 does not open. When a mobile battery 12 is inserted into the slot sleeve 23, the inner door lock mechanism 29 enters an unlocked state. Due to this, the restriction on the pivoting of the inner door 24 is released. At this time, the inner door 24 is pressed by the mobile battery 12 to pivot to the inside of the slot body 22.

As shown in FIGS. 3, 4, 5, and 8, a battery lock mechanism 30 is provided to the +Z-axis-direction side opening portion of the slot body 22. The battery lock mechanism 30 is disposed further toward the +Y-axis direction side than the opening portion 22c of the slot body 22. As shown in FIG. 8, when the battery lock mechanism 30 is in the locked state, a plate 30b protrudes to the inside of the slot sleeve 23. At this time, when the mobile battery 12 stored in the slot sleeve 23 moves in the +Z-axis direction, the plate 30b abuts against the top surface 12a of the mobile battery 12. Due to this, the battery lock mechanism 30 restricts the movement of the mobile battery 12 in the +Z-axis direction.

As shown in FIGS. 5 and 7, the bottom cover 42 is provided with a holding detection switch 32. When the mobile battery 12 is held in the slot sleeve 23, the holding detection switch 32 is pressed by the mobile battery 12 to switch from OFF to ON.

As shown in FIGS. 3, 4, and 5, a bottom cover assembly 34 is attached to the opening portion on the −Z-axis direction side of the slot body 22. A fan 62, a connector unit 64, and an electronic circuit board 66 are attached to the bottom portion 23a of the bottom cover 42, to form the bottom cover assembly 34. The bottom cover assembly 34 includes the connector unit 64. The connector unit 64 includes the fan 62 and a connector 64e (see FIG. 5). The fan 62 sends air into the slot sleeve 23. The connector 64e engages with a connector 50 of the mobile battery 12.

[Configuration of the Mobile Battery]

Figure 9:
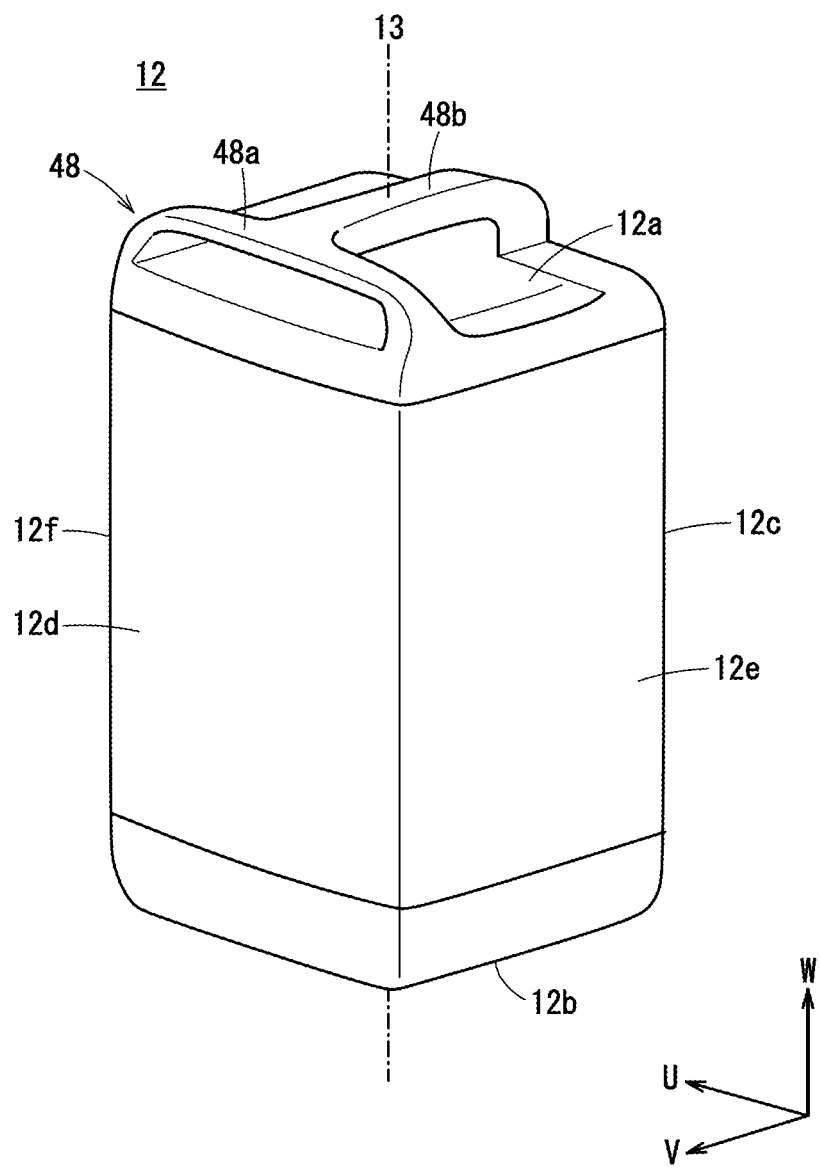
FIG. 9 is a perspective view of a mobile battery.
Figure 10:
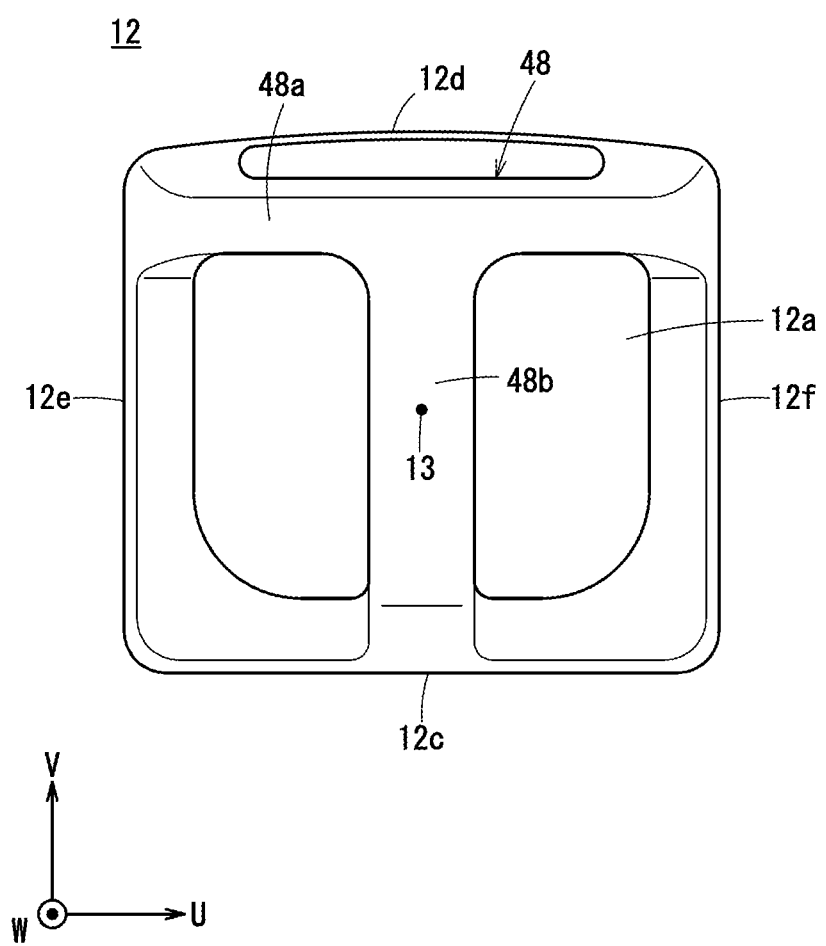
FIG. 10 is a top view of the mobile battery.
Figure 11:
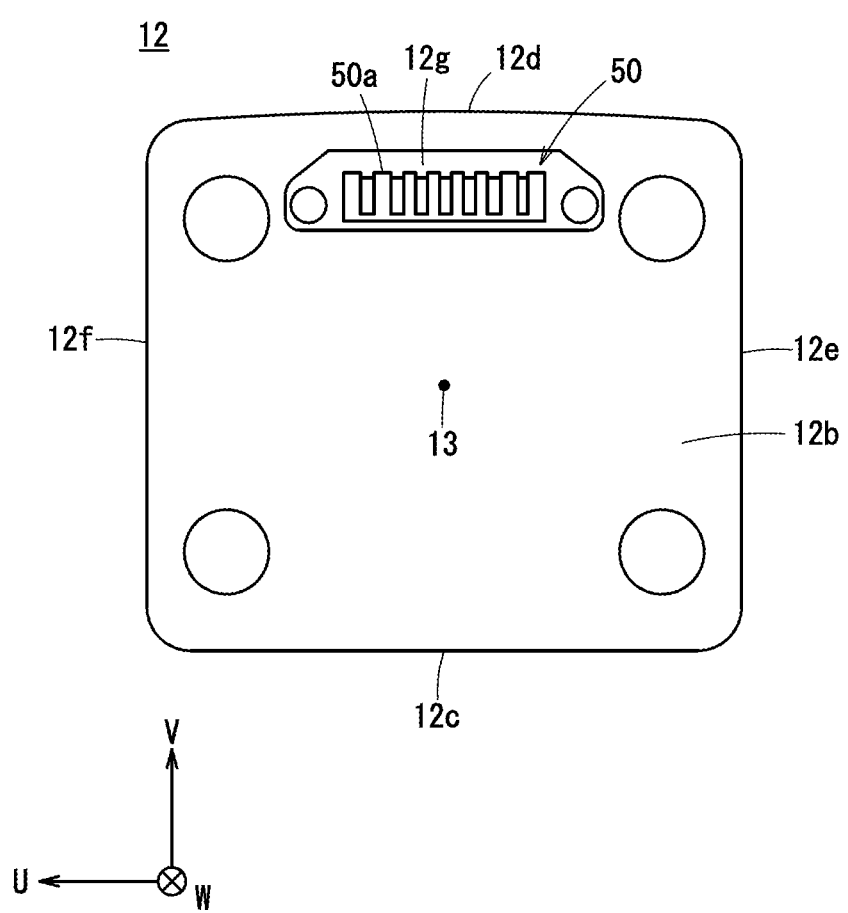
FIG. 11 is a bottom view of the mobile battery.
Figure 12:
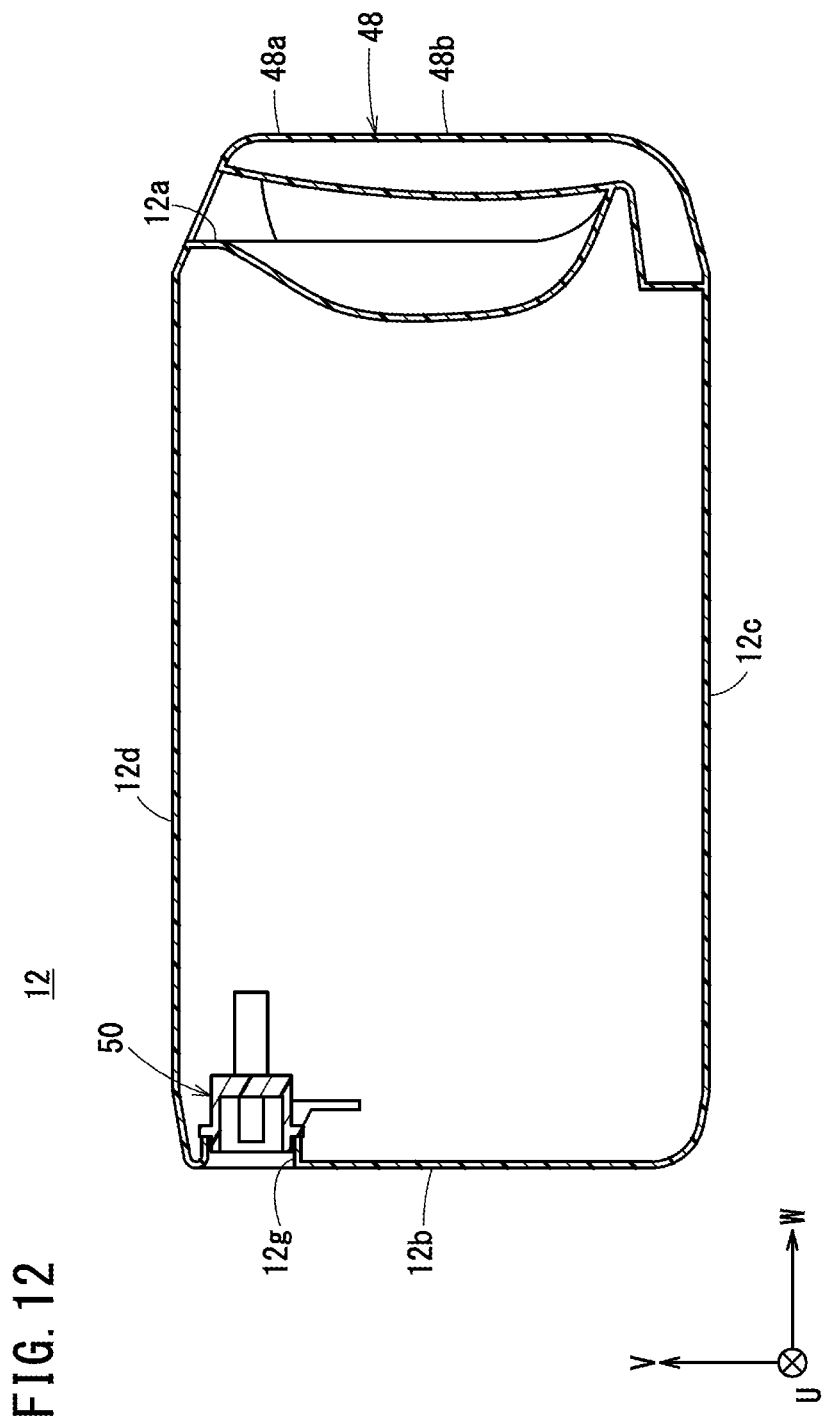
FIG. 12 is a cross-sectional view of the mobile battery.

FIG. 9 is a perspective view of the mobile battery 12. FIG. 10 shows the top surface 12a of the mobile battery 12. FIG. 11 shows the bottom surface 12b of the mobile battery 12. FIG. 12 is a cross-sectional view of the mobile battery 12. The following describes the configuration of the mobile battery 12, using FIGS. 9, 10, 11, and 12.

In the following description of the configuration of the mobile battery 12, the U-axis, V-axis, and W-axis defined as shown below are used. The longitudinal direction of the mobile battery 12 is the W-axis direction, and the direction from the bottom surface 12b to the top surface 12a is the +W-axis direction. The direction along which the side surface 12c and the side surface 12d of the mobile battery 12 are lined up is the V-axis direction, and the direction from the side surface 12c toward the side surface 12d is the +V-axis direction. The direction in which the side surface 12e and the side surface 12f are lined up is the U-axis direction, and the direction from the side surface 12e toward the side surface 12f is the +U-axis direction.

As shown in FIGS. 9 and 10, a handle 48 is provided on the top surface 12a of the mobile battery 12. The handle 48 includes a first grip portion 48a that extends in the U-axis direction and a second grip portion 48b that extends in the V-axis direction. The user grips the handle 48 and inserts or removes the mobile battery 12 into or from the slot 14.

As shown in FIGS. 10 and 11, among the side surfaces 12c, 12d, 12e, and 12f of the mobile battery 12, the side surface 12d is a curved surface that protrudes outward. Among the side surfaces 12c, 12d, 12e, and 12f thereof, the side surfaces 12c, 12e, and 12f are approximately flat surfaces. That is, the external shape of the mobile battery 12 is rotationally asymmetrical with respect to an axial line 13 shown in FIGS. 9 to 11. The axial line 13 is a line that passes through the center of the mobile battery 12 and extends in the W-axis direction. The W-axis direction is the same as the direction in which the mobile battery 12 is inserted into and removed from the slot sleeve 23.

As shown in FIGS. 11 and 12, the connector 50 (female connector 50) is exposed in the bottom surface 12b on the −W-axis direction side of the mobile battery 12. The connector 50 is arranged, in the V-axis direction, at a position further toward the +V-axis direction side than the center of the bottom surface 12b. The connector 50 is provided in a recessed portion 12g of the mobile battery 12. The recessed portion 12g is formed to be depressed further toward the +W-axis direction side than the bottom surface 12b. The female connector 50 corresponds to a first electric terminal of the present invention.

The connector 50 is positioned further toward the +W-axis direction side than the bottom surface 12b. Due to this, when the mobile battery 12 is placed on a ground surface or the like with the bottom surface 12b at the bottom, contact between the connector 50 and the ground surface or the like can be restricted. Accordingly, the connector 50 can be prevented from getting dirty, being damaged, or the like. Furthermore, the connector 50 can be restricted from contacting a conducive body. Accordingly, unintentional discharge of the mobile battery 12 can be restricted.

[Configuration of the Inner Door]

Figure 13:
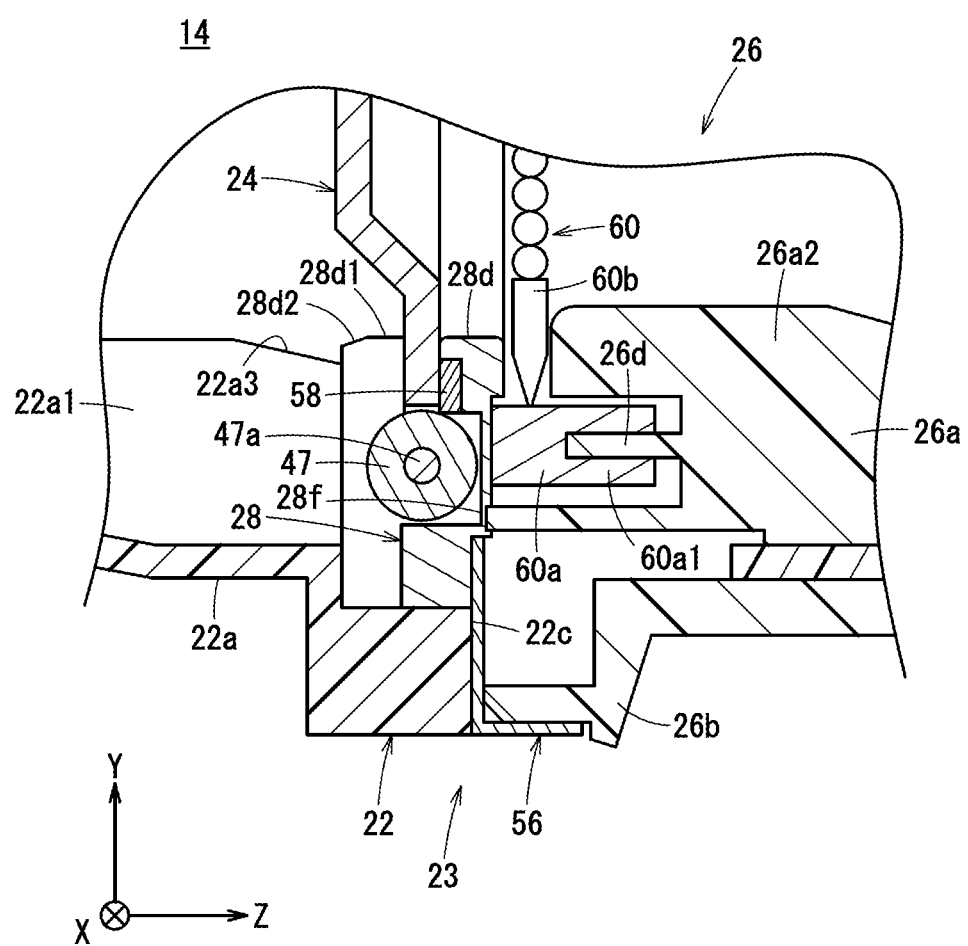
FIG. 13 is a cross-sectional view of the slot.
Figure 14:
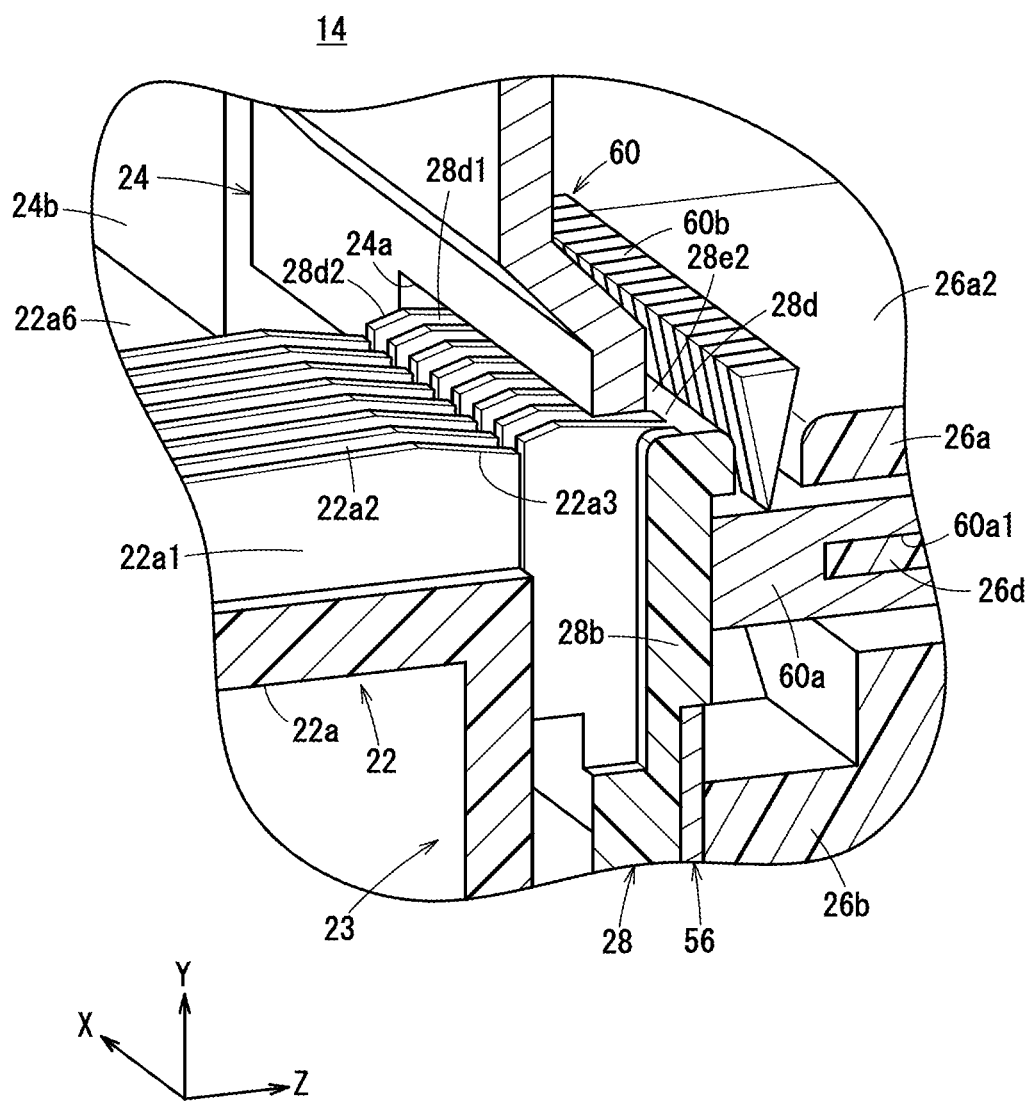
FIG. 14 is a perspective cross-sectional view of the slot.

FIG. 13 is a cross-sectional view of the slot 14. FIG. 14 is a perspective cross-sectional view of the slot 14. FIGS. 13 and 14 show the end portion on the −Y-axis direction side of the inner door 24 and the vicinity thereof, in a state where the inner door 24 is closed. The configuration of the inner door 24 will be described using FIGS. 5, 6, 13, and 14.

As shown in FIG. 5, the inner door 24 is provided to be pivotable centered on a shaft 44. The shaft 44 is attached to the slot body 22. The shaft 44 extends in the X-axis direction. That is, the shaft 44 extends in a direction that intersects the direction (Z-axis direction) in which the mobile battery 12 is inserted into and removed from the slot sleeve 23. The shaft 44 is arranged further toward the +Y-axis direction side than the mobile battery 12 stored in the slot sleeve 23. That is, the shaft 44 is arranged further upward in the vertical direction than mobile battery 12 stored in the slot sleeve 23. Due to this, when the mobile battery 12 is pulled out from the slot sleeve 23, the inner door 24 closes due to its own weight.

The inner door 24 is biased in a direction to pivot counterclockwise centered on the shaft 44, when viewed from the −X-axis direction, by a torsion spring 46 provided to the shaft 44. Due to this, when the mobile battery 12 is pulled out from the slot sleeve 23, the inner door 24 is pressed by the torsion spring 46 in a closing direction. Therefore, the inner door 24 can reliably block the insertion port 26c of the slot flange 26. In a state where the mobile battery 12 is not stored in the slot sleeve 23, the inner door 24 is positioned at a first position. At this time, the amount of the insertion port 26c of the slot flange 26 blocked by the inner door 24 is at a maximum.

When the inner door 24 is at the first position, at least a portion of the inner door 24 is arranged on the trajectory along which the mobile battery 12 is inserted into and removed from the slot sleeve 23. By arranging the inner door 24 in this manner, when the mobile battery 12 is inserted into the slot 14, the inner door 24 is pressed open by the mobile battery 12. That is, the inner door 24 pivots in an opening direction, against the bias force of the torsion spring 46. As a result, the inner door 24 opens the insertion port 26c of the slot flange 26. In a state where the mobile battery 12 is stored in the slot sleeve 23, the inner door 24 is positioned at a second position. At this time, the amount of the insertion port 26c of the slot flange 26 blocked by the inner door 24 is at a minimum.

The inner door 24 is not limited to being a door that opens and closes by pivoting centered on the shaft 44, and may be a door that opens and closes by moving parallel to the X-axis direction or the Y-axis direction.

The torsion spring 46 described above can be said to bias the inner door 24 in a direction from the second position toward the first position.

As shown in FIG. 13, a roller 47 is provided at an edge of the inner door 24 on the −Y-axis direction side. The roller 47 is provided to be rotatable centered on a shaft 47a.

As shown in FIG. 13, when the inner door 24 is closed, the portion of the roller 47 furthest on the +Z-axis direction side is positioned further toward the +Z-axis direction side than the portion of the inner door 24 furthest on the +Z-axis direction side. That is, the portion of the roller 47 closest to the slot body 22 is closer to the slot body 22 than the portion of the inner door 24 closest to the slot body 22.

As shown in FIG. 14, the inner door 24 includes a cutout portion 24a. The cutout portion 24a is provided at a position corresponding to a slider 22a1, described further below, of the slot body 22 and a slider 28d, described further below, of the reverse-insertion prevention flange 28, when the inner door 24 is positioned at the first position. The cutout portion 24a is depressed toward the shaft 47a from a side of the inner door 24 opposite the shaft 47a.

As shown in FIG. 14, the inner door 24 includes a protruding portion 24b. The protruding portion 24b is provided at a position corresponding to a roller escape groove 22a4, described further below, of the slot body 22 and a recessed portion 22a6, described further below, of the slot body 22, when the inner door 24 is positioned at the first position. The protruding portion 24b is formed to protrude further toward a side of the inner door 24 opposite the shaft 47a than the cutout portion 24a.

Due to this, when the inner door 24 is closed, the inner door 24 does not interfere with the slider 28d and the slider 22a1. Furthermore, when the inner door 24 is closed and positioned at the first position, the inside of the slot body 22 is firmly sealed by the inner door 24.

[Configuration of the Slot Body]

Figure 15:
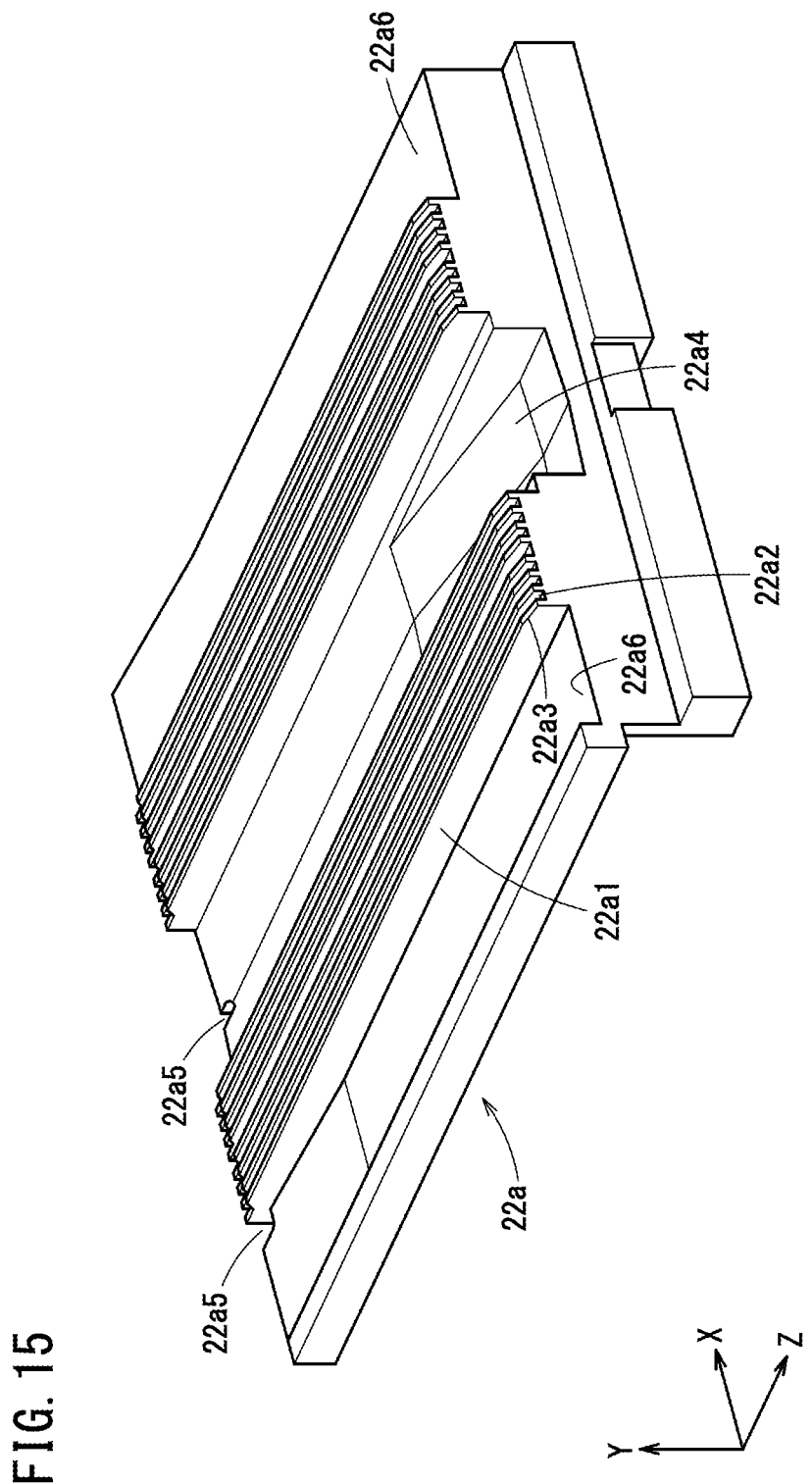
FIG. 15 is a perspective view showing a bottom side plate of the slot body.
Figure 16:
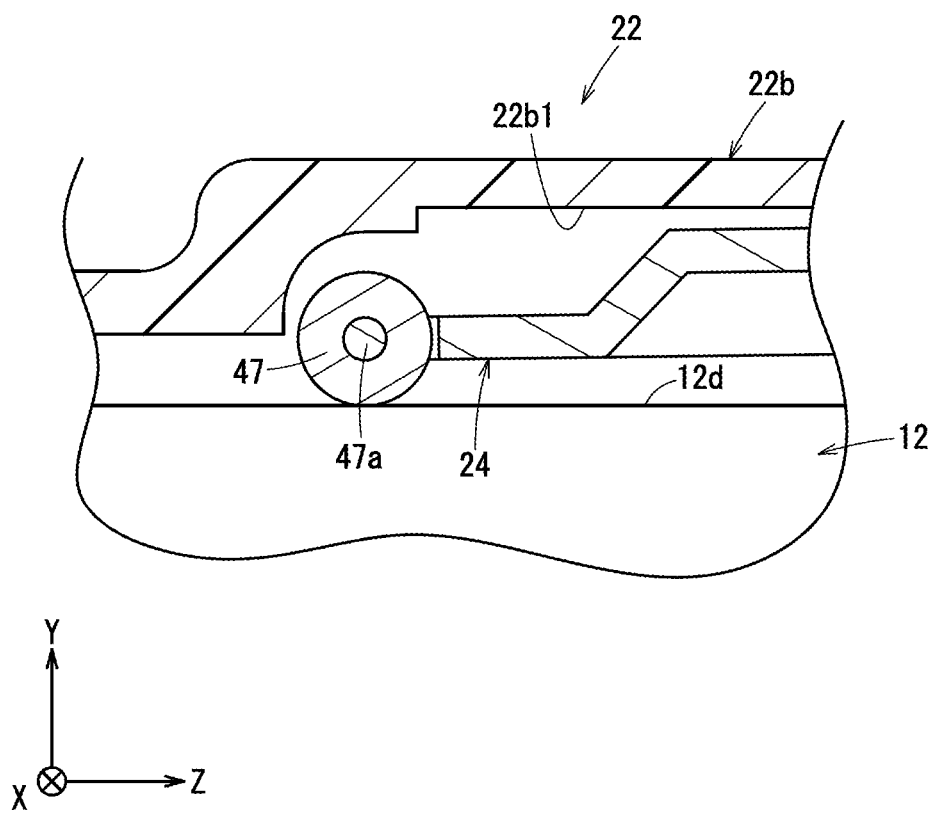
FIG. 16 is a cross-sectional view of the slot body, an inner door and the mobile battery.
Figure 17:
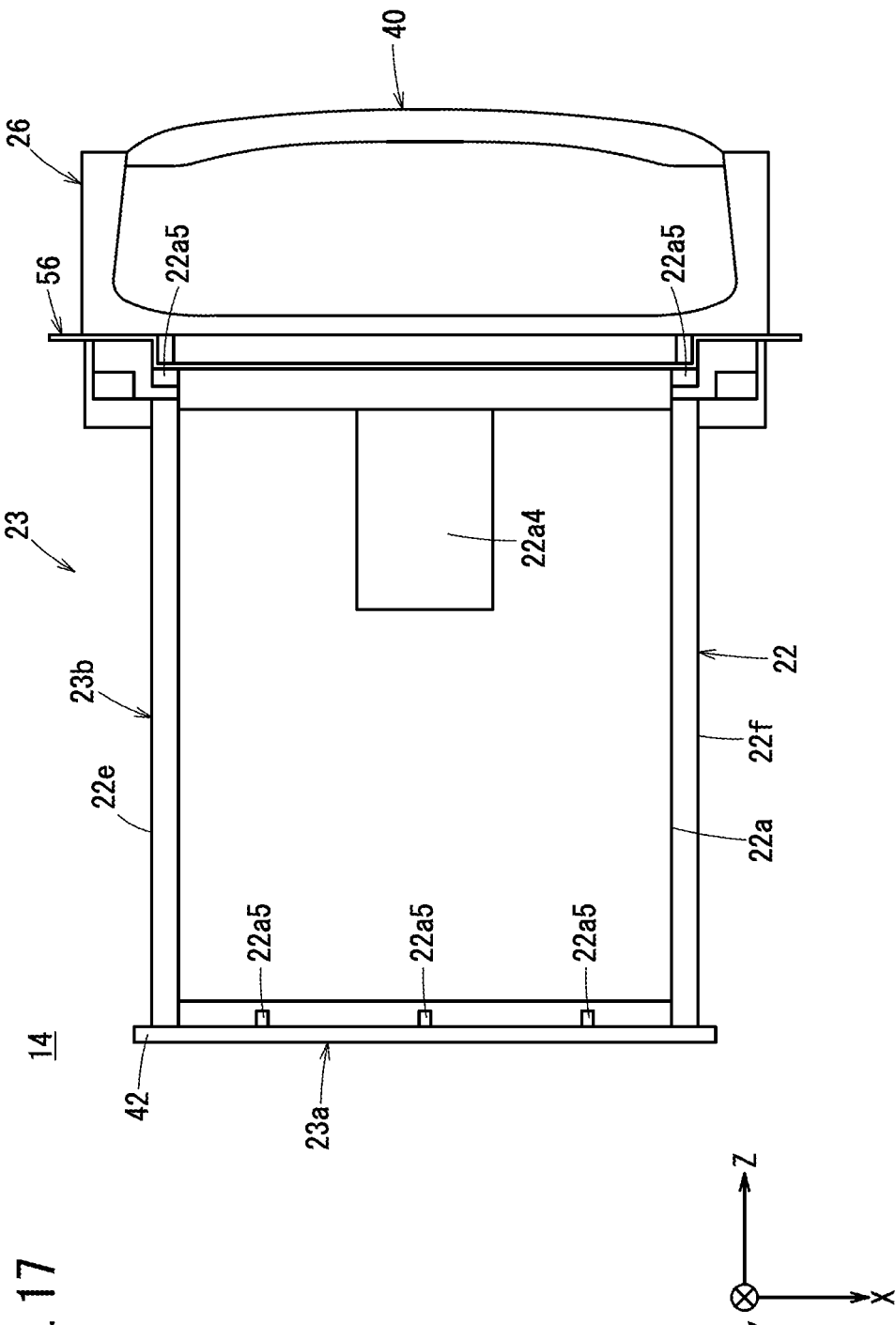
FIG. 17 is a bottom view of the slot.

FIG. 15 is a perspective view showing the bottom side plate 22a of the slot body 22. FIG. 16 is a cross-sectional view of the slot body 22, the inner door 24, and the mobile battery 12. FIG. 16 shows a state in which the inner door 24 is open. Furthermore, FIG. 16 shows the roller 47 and the region around the roller 47. FIG. 17 is a bottom view of the slot 14. The configuration of the slot body 22 will be described using FIGS. 2, 3, 5, 14, 15, 16, and 17.

As shown in FIGS. 5, 14, and 15, two sliders 22a1 are formed on the inner surface of the bottom side plate 22a at the −Y-axis direction side of the slot body 22. These two sliders 22a1 extend in the Z-axis direction. Each slider 22a1 protrudes with a convex shape in the +Y-axis direction from the surface of the bottom side plate 22a. In a state where the mobile battery 12 is stored in the slot sleeve 23, the bottom side plate 22a is positioned vertically below the mobile battery 12. Each slider 22a1 extends in the Z-axis direction. That is, each slider 22a1 extends in the direction in which the mobile battery 12 is inserted into and removed from the slot sleeve 23. Seven grooves 22a2 extending in the Z-axis direction are formed in each slider 22a1. Due to this, the contact surface area between the sliders 22a1 and the mobile battery 12, which is inserted into and removed from the slot 14 in the Z-axis direction, can be decreased. Therefore, friction between the mobile battery 12 and the sliders 22a1 can be decreased. In the present embodiment, the sliders 22a1 are provided to the bottom side plate 22a. The sliders 22a1 may be provided to the top side plate 22b, the left side surface 22e, or the right side surface 22f. The sliders 22a1 correspond to protruding portions of the present invention.

Air is guided into the inside of the slot sleeve 23 by the fan 62, described further below. The sliders 22a1 align the flow of air inside the slot sleeve 23 to be in the Z-axis direction.

As shown in FIGS. 14 and 15, each slider 22a1 includes a chamfered portion 22a3. The chamfered portion 22a3 is disposed at the end portion of the slider 22a1 on the +Z-axis direction side. Due to the chamfered portion 22a3, when the mobile battery 12 is inserted into the slot body 22, catching between the mobile battery 12 and the end portion of the slider 22a1 on the +Z-axis direction side can be restricted.

As shown in FIGS. 5 and 15, the roller escape groove 22a4 is formed in the inner surface of the bottom side plate 22a of the slot body 22. The roller escape groove 22a4 is formed between the two sliders 22a1. The roller escape groove 22a4 is formed at the end portion of the bottom side plate 22a on the +Z-axis direction side. The roller escape groove 22a4 includes a tapered surface that is inclined relative to the Z-axis direction. The +Z-axis direction side of this tapered surface is positioned further toward the −Y-axis direction side than the −Z-axis direction side of the tapered surface. When the inner door 24 is opened or closed, the roller 47 of the inner door 24 passes through the inside of the roller escape groove 22a4.

As shown in FIG. 15, the recessed portions 22a6 are formed in the inner surface of the bottom side plate 22a of the slot body 22. The recessed portions 22a6 are formed outside the two sliders 22a1. The recessed portions 22a6 extend in the Z-axis direction.

As shown in FIGS. 5 and 16, an inner door shelter portion 22b1 is formed in the inner surface of the top side plate 22b positioned on the +Y-axis direction side of the slot body 22. The inner door shelter portion 22b1 has a recessed shape depressed in the +Y-axis direction. In a state where the mobile battery 12 is stored in the slot sleeve 23, the inner door 24 is withdrawn inside the inner door shelter portion 22b1. The position of the inner door 24 at this time is the second position. In a state where the inner door 24 is withdrawn inside the inner door shelter portion 22b1, the roller 47 abuts against the side surface 12d of the mobile battery 12. Due to this, friction between the mobile battery 12 being inserted into or removed from the slot 14 and the inner door 24 can be reduced.

As shown in FIGS. 15 and 17, five water drain holes 22a5 that allow communication between the outside and the inside of the slot body 22 are formed in the bottom side plate 22a of the slot body 22. Three of the water drain holes 22a5 are formed at positions further toward the −Z-axis direction side than the center of the bottom side plate 22a in the Z-axis direction. The two of the water drain holes 22a5 are formed at positions further toward the +Z-axis direction side than the center of the bottom side plate 22a in the Z-axis direction. As shown in FIG. 2, the −Z-axis direction side of the slot 14 is positioned further vertically downward than the +Z-axis direction side of the slot 14. Therefore, most of the liquid that intrudes into the slot 14 is discharged from the three water drain holes 22a5 formed at the positions further on the −Z-axis direction side than the center of bottom side plate 22a.

As shown in FIG. 3, two exhaust slits 22b2 that allow communication between the outside and the inside of the slot sleeve 23 are formed in the top side plate 22b of the slot body 22. The top side plate 22b is positioned further upward than the center of the slot sleeve 23 in the vertical direction. Air that has been warmed by heat of the mobile battery 12 stored in the slot sleeve 23 moves upward inside the slot sleeve 23. After this, the warmed air is discharged to the outside of the slot sleeve 23 from the exhaust slits 22b2 provided in the top side plate 22b. The exhaust slits 22b2 correspond to a second communication path of the present invention.

The exhaust slits 22b2 are formed by cutting out part of an edge of the top side plate 22b that lies on the −X-axis direction side. Due to this, in the horizontal direction (X-axis direction) the exhaust slits 22b2 are arranged at the −X-axis direction side of the slot body 22 relative to an axial line 21. Furthermore, the exhaust slits 22b2 are arranged further vertically upward than the axial line 21. The vertically upward direction corresponds to a fourth direction of the present invention. Furthermore, the exhaust slits 22b2 are arranged further toward the +Z-axis direction side than the center of the slot sleeve 23 in the Z-axis direction. The +Z-axis direction corresponds to a fifth direction of the present invention.

The air guided into the slot body 22 by the fan 62 passes between the slot body 22 and the side surfaces 12c to 12f of the mobile battery 12, and is discharged from the exhaust slits 22b2. Due to this, the cooling efficiency of the mobile battery 12 can be improved. Furthermore, the intrusion of dust through the exhaust slits 22b2 can be prevented.

[Configurations of the Reverse Insertion Prevention Flange and Slot Fixing Stay]

Figure 18:
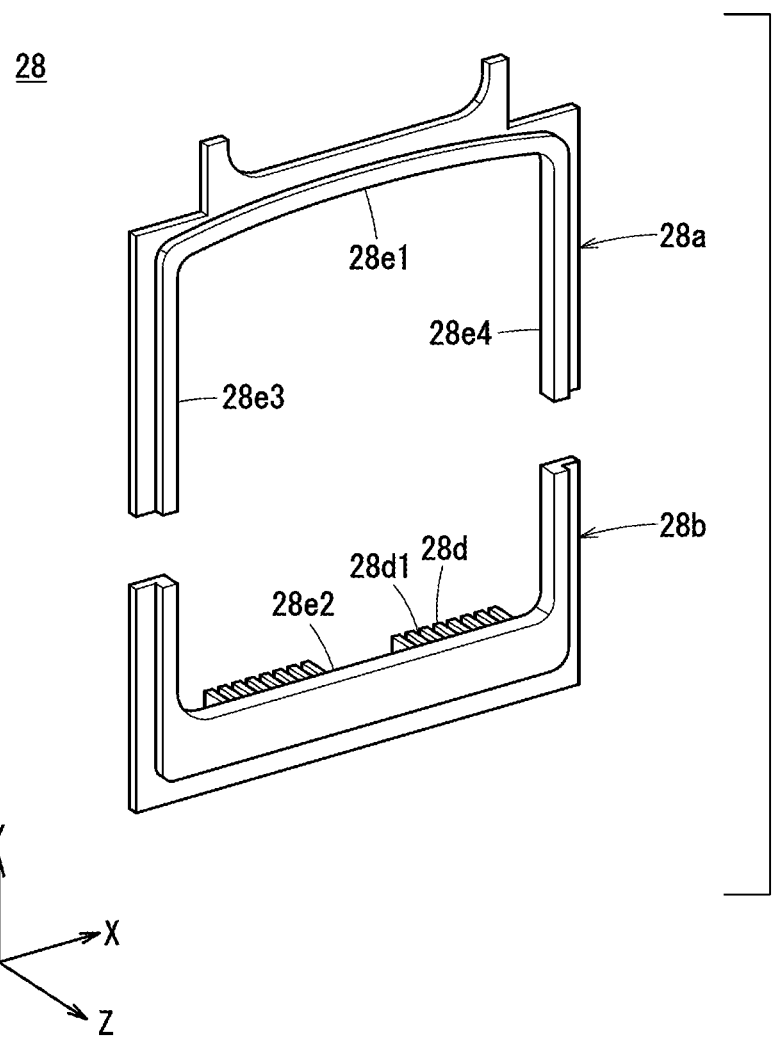
FIG. 18 is a perspective view showing a reverse-insertion prevention flange.
Figure 19:
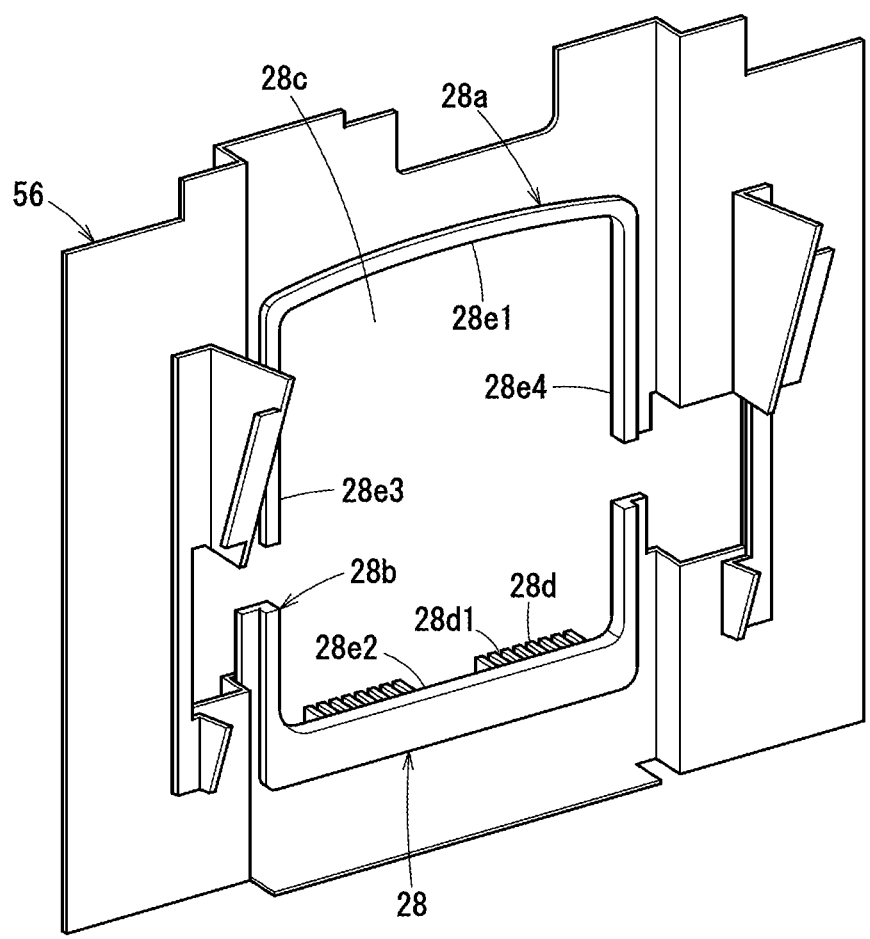
FIG. 19 is a perspective view of the reverse-insertion prevention flange and a slot fixing stay.
Figure 20:
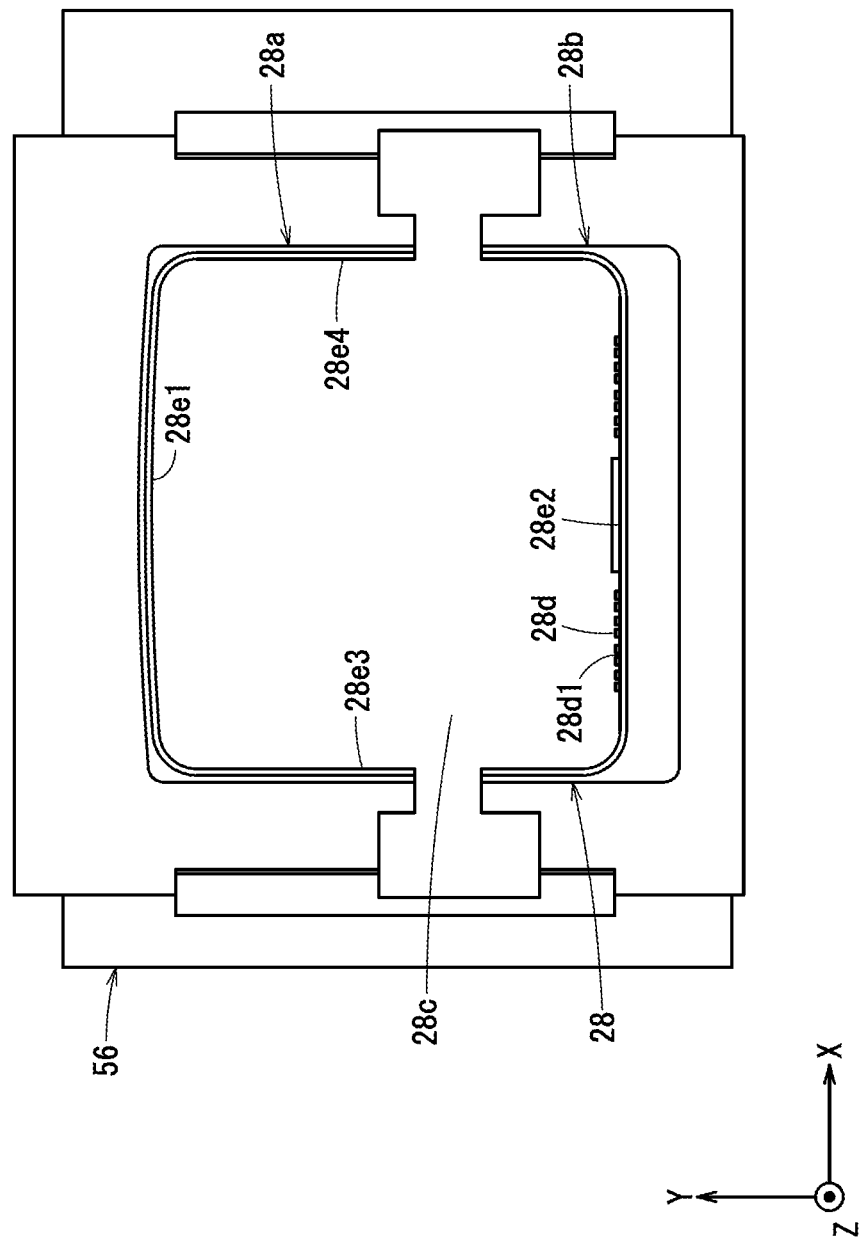
FIG. 20 is a front view of the reverse-insertion prevention flange and the slot fixing stay.

FIG. 18 is a perspective view showing the reverse-insertion prevention flange 28. FIG. 19 is a perspective view of the reverse-insertion prevention flange 28 and a slot fixing stay 56. FIG. 20 is a front view of the reverse-insertion prevention flange 28 and the slot fixing stay 56. The configuration of the reverse-insertion prevention flange 28 and the slot fixing stay 56 will be described using FIGS. 13, 14, 18, 19, and 20.

As shown in FIG. 18, the reverse-insertion prevention flange 28 includes a top member 28a and a bottom member 28b. As shown in FIG. 19, the top member 28a and the bottom member 28b are attached to the slot fixing stay 56. The reverse-insertion prevention flange 28 includes an insertion hole 28c penetrating therethrough in the Z-axis direction in a state where the top member 28a and bottom member 28b are attached to the slot fixing stay 56.

As shown in FIG. 20, among the inner surfaces 28e1, 28e2, 28e3, and 28e4 of the reverse-insertion prevention flange 28, the inner surfaces 28e2, 28e3, and 28e4 are approximately flat surfaces. On the other hand, among the inner surfaces 28e1, 28e2, 28e3, and 28e4 of the reverse-insertion prevention flange 28, the inner surface 28e1 is a curved surface that protrudes in the +Y-axis direction. The inner surfaces 28e1, 28e2, 28e3, and 28e4 are shaped to follow the side surfaces 12d, 12c, 12e, and 12f of the mobile battery 12.

When the mobile battery 12 is inserted into the slot sleeve 23 with a posture in which the side surface 12d faces in the +Y-axis direction, the mobile battery 12 is inserted into the slot body 22 through the insertion hole 28c. That is, when the mobile battery 12 is inserted into the slot sleeve 23 with a proper posture, which is a posture in which the side surface 12d faces in the +Y-axis direction, the reverse-insertion prevention flange 28 allows the mobile battery 12 to be inserted into the slot sleeve 23.

On the other hand, when the mobile battery 12 is inserted into the slot sleeve 23 with a posture in which the side surface 12d faces in a direction other than the +Y-axis direction, the mobile battery 12 interferes with the reverse-insertion prevention flange 28. Therefore, the mobile battery 12 cannot pass through the insertion hole 28c, and is not inserted into the slot body 22. That is, when the mobile battery 12 is inserted into the slot sleeve 23 with an improper posture, which is a posture in which the side surface 12d faces in a direction other than the +Y-axis direction, the reverse-insertion prevention flange 28 impedes the insertion of the mobile battery 12 into the slot sleeve 23.

As shown in FIGS. 14, 18, and 19, two sliders 28d extending in the Z-axis direction are formed on the inner surface 28e2 of the reverse-insertion prevention flange 28. Seven grooves 28d1 extending in the Z-axis direction are formed in each slider 28d. Due to this, the contact surface area between the sliders 28d and the mobile battery 12 inserted into the slot 14 in the Z-axis direction can be reduced. Therefore, friction between the mobile battery 12 and the sliders 28d can be reduced.

As shown in FIG. 14, each slider 28d includes a chamfered portion 28d2. The chamfered portion 28d2 is provided at the end portion of the slider 28d on the −Z-axis direction side. Due to the chamfered portion 28d2, when the mobile battery 12 passes by the reverse-insertion prevention flange 28, the mobile battery 12 and the end portion of the slider 28d on the −Z-axis direction side can be prevented from catching on each other.

As shown in FIGS. 13 and 14, the end portion of the slider 28d of the reverse-insertion prevention flange 28 on the −Z-axis direction side is positioned further toward the +Y-axis direction side than the end portion of the slider 22a1 of the slot body 22 on the +Z-axis direction side. Due to this, when the mobile battery 12 is inserted in the −Z-axis direction into the slot sleeve 23, the mobile battery can be prevented from catching on the end portion of the slider 22a1 of the slot body 22 on the +Z-axis direction side.

As shown in FIG. 13, a seal member 58 is attached to the surface of the bottom member 28b on the −Z-axis direction side. In a state where the inner door 24 is closed, the seal member 58 abuts against the surface of the inner door 24 on the +Z-axis direction side. Due to this, liquid, dust, and the like can be restricted from intruding into the slot body 22 from between the reverse-insertion prevention flange 28 and the inner door 24.

As shown in FIG. 13, a roller escape portion 28f is formed in the bottom member 28b at a position further toward the −Y-axis direction side than the seal member 58. The roller escape portion 28f is recessed in the +Z-axis direction. By providing the roller escape portion 28f, the roller 47 and the reverse-insertion prevention flange 28 do not contact each other when the inner door 24 is in the closed state. Due to this, when the inner door 24 is in the closed state, the inner door 24 can firmly contact the seal member 58. Therefore, liquid, dust, and the like can be restricted from intruding into the slot body 22 from between the reverse-insertion prevention flange 28 and the inner door 24.

[Configuration of the Slot Flange]

Figure 22:
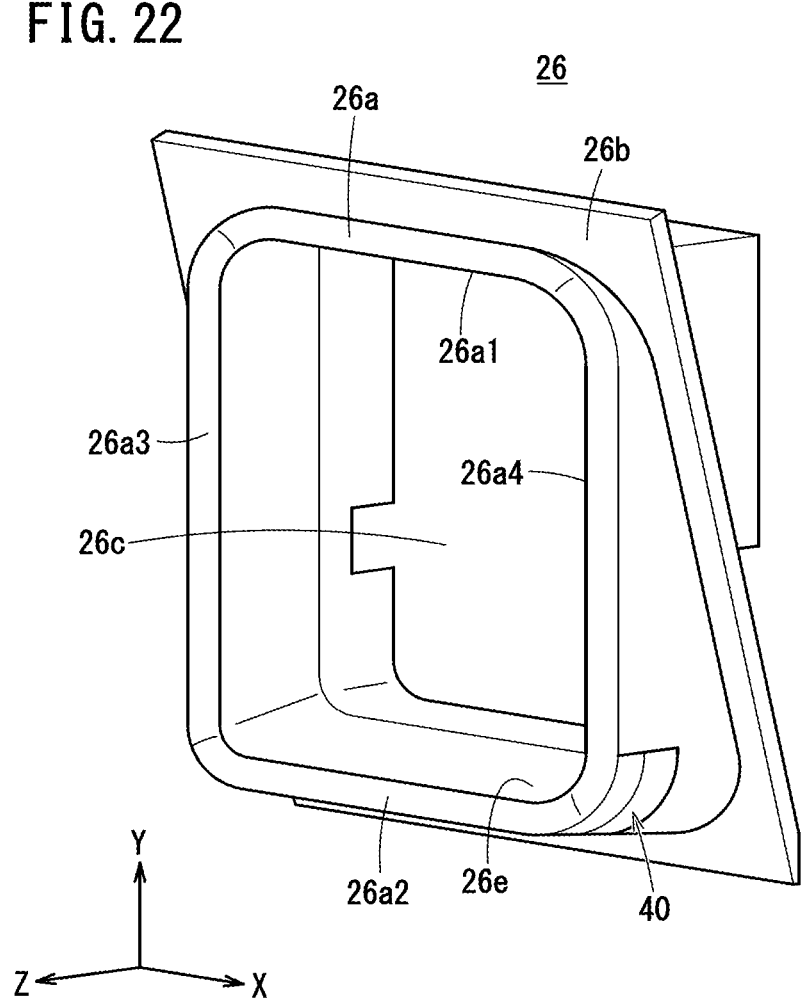
FIG. 22 is a perspective view of the slot flange.
Figure 23:
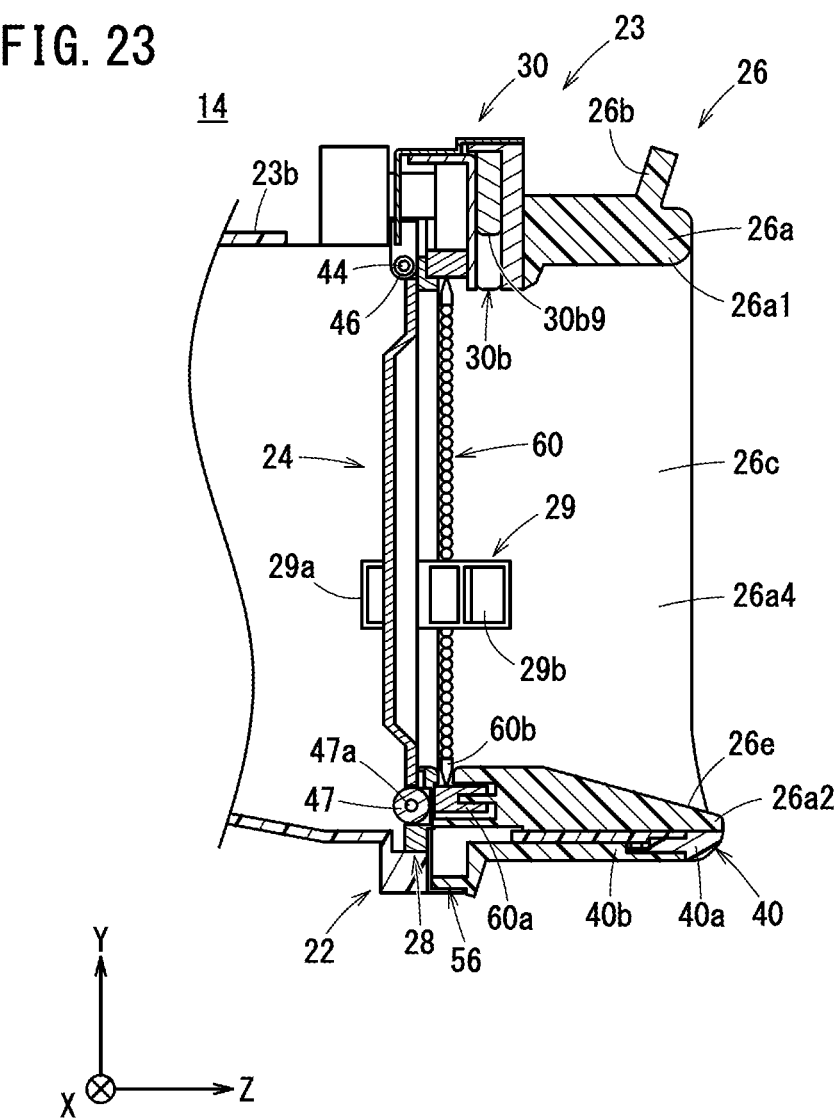
FIG. 23 is a cross-sectional view of the slot.
Figure 24:
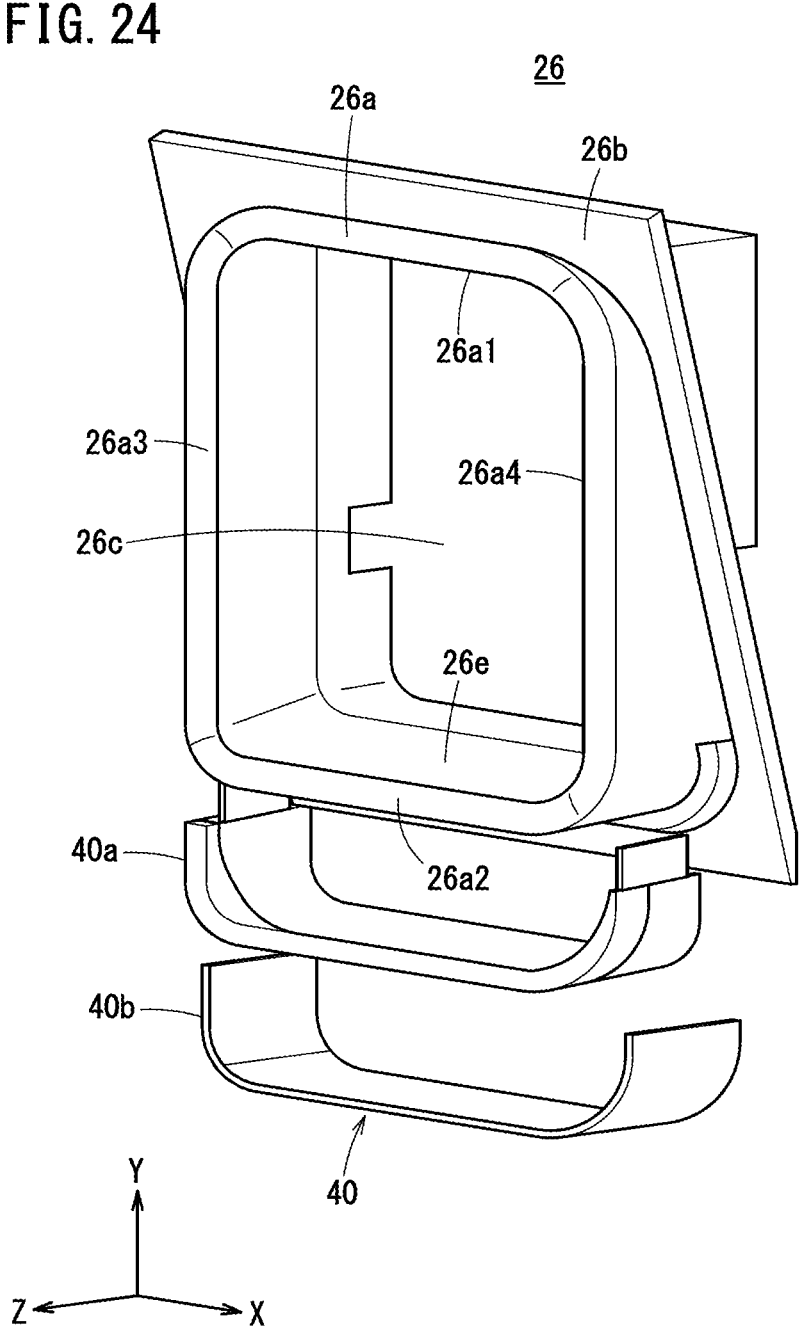
FIG. 24 is an exploded perspective view of the slot flange.
Figure 25:
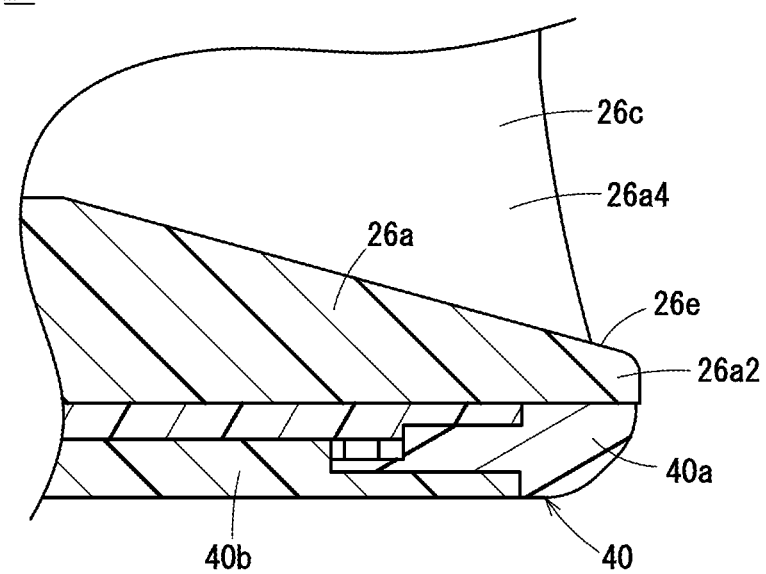
FIG. 25 is a cross-sectional view of the slot flange.
Figure 26:
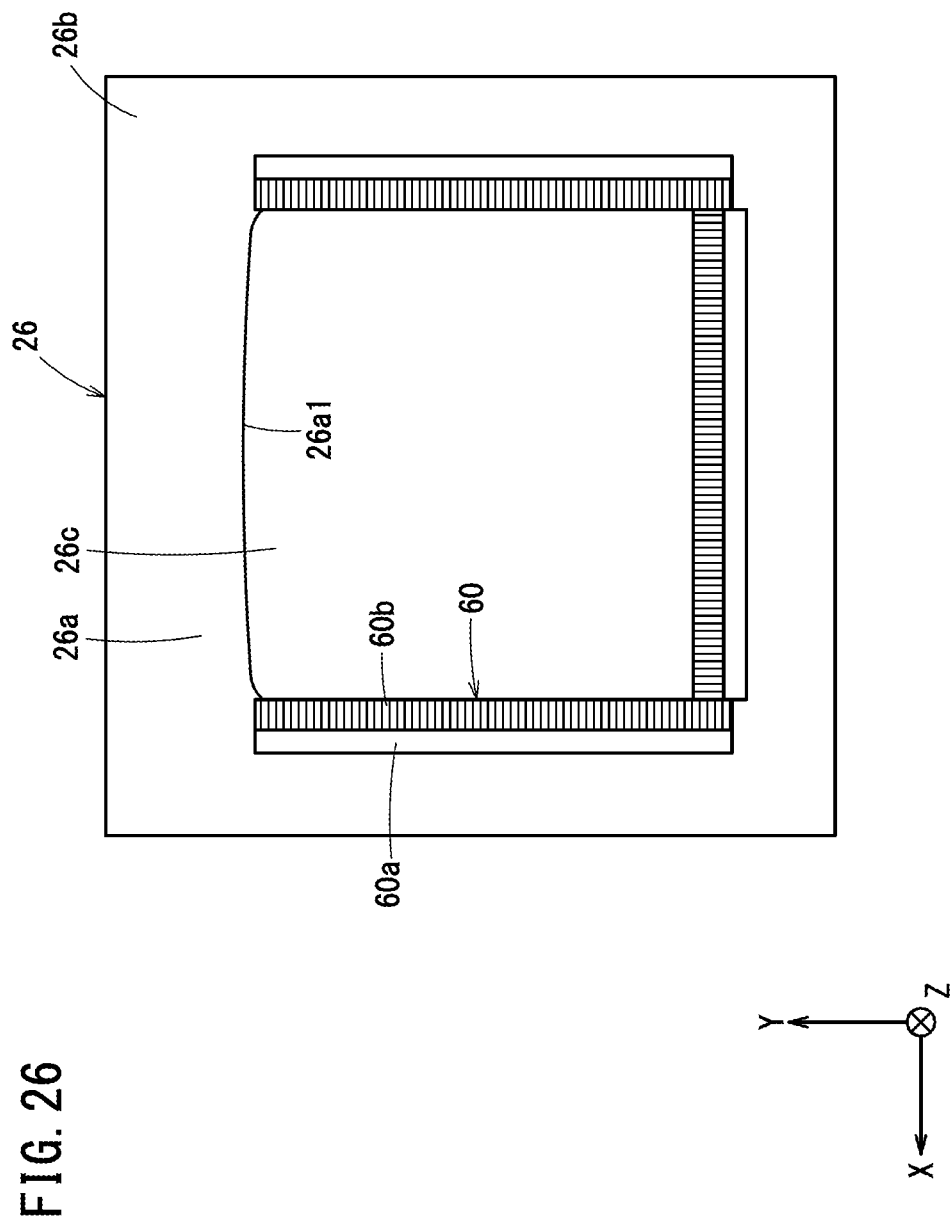
FIG. 26 is a rear view of the slot flange.

FIG. 21 is a front view of the slot flange 26. FIG. 22 is a perspective view of the slot flange 26. FIG. 23 is a cross-sectional view of the slot 14. FIG. 23 shows a portion of the slot 14 on the +Z-axis direction side, in a state where the mobile battery 12 is not stored in the slot sleeve 23. FIG. 24 is an exploded perspective view of the slot flange 26. FIG. 25 is a cross-sectional view of the slot flange 26. FIG. 26 is a rear view of the slot flange 26. The configuration of the slot flange 26 will be described using FIGS. 6, 7, 8, 13, 14, 21, 22, 23, 24, 25, and 26.

As shown in FIGS. 21 and 22, the slot flange 26 includes a guide portion 26a and a flange portion 26b. The guide portion 26a includes a side plate 26a1, a side plate 26a2, a side plate 26a3, and a side plate 26a4. The guide portion 26a has an approximately rectangular shape, when the guide portion 26a is viewed from the Z-axis direction. The guide portion 26a includes an insertion port 26c that is surrounded by the side plates 26a1, 26a2, 26a3, and 26a4.

As shown in FIG. 23, the area of the opening of the insertion port 26c of the slot flange 26 becomes gradually larger along the Z-axis direction. Due to this, when the user inserts the mobile battery 12 into the insertion port 26c in the −Z-axis direction, the mobile battery 12 can be inserted easily into the insertion port 26c.

As shown in FIGS. 13 and 14, the side plate 26a2 of the guide portion 26a of the slot flange 26 is positioned further toward the +Y-axis direction side than the slider 28d of the reverse-insertion prevention flange 28. Due to this, when the mobile battery 12 is inserted into the slot sleeve 23 in the −Z-axis direction, the mobile battery can be prevented from catching on the end portion of the slider 28d of the reverse-insertion prevention flange 28 on the +Z-axis direction side.

As shown in FIGS. 13 and 14, the side plate 26a2 of the guide portion 26a of the slot flange 26 is positioned further toward the +Y-axis direction side than the slider 22a1 of the slot body 22. Due to this, the mobile battery 12 inserted into the slot sleeve 23 in the −Z-axis direction can be prevented from catching on the end portion of the slider 22a1 of the slot body 22 on the +Z-axis direction side.

When the mobile battery 12 is inserted into the slot sleeve 23, the side plate 26a2 of the guide portion 26a of the slot flange 26 is positioned vertically lower than the mobile battery 12. Furthermore, when the mobile battery 12 is stored in the slot sleeve 23, the slider 22a1 of the slot body 22 is positioned vertically lower than the mobile battery 12.

As shown in FIGS. 21 and 22, the side plate 26a2 positioned on the −Y-axis direction side of the slot flange 26 is provided with an indicator 40. The indicator 40 is disposed on the surface of the side plate 26a2 on the +Z-axis direction side. The indicator 40 indicates the availability of the slots 14, the charging state or the like of the mobile battery 12 stored in the slot 14, using a state in which a light is lit up, a state in which the light is blinking, a state in which the light is not lit up, the color of the light, and the like.

As shown in FIG. 24, the indicator 40 includes an LED unit 40a and a cover 40b. The slot flange 26 and the indicator 40 are formed separately from each other. As shown in FIG. 25, the end portion of the indicator 40 on the +Z-axis direction side is positioned slightly further (approximately 0.5 mm, for example) in the −Z-axis direction than the end portion of the guide portion 26a on the +Z-axis direction side. Due to this, when the mobile battery 12 is inserted into or removed from the slot 14, interference between the mobile battery 12 and the indicator 40 can be restricted. Therefore, the impact resistance of the indicator 40 can be improved. Furthermore, water droplets can be prevented from moving from the guide portion 26a to the indicator 40. Therefore, exposure of the indicator 40 to water can be restricted.

As shown in FIG. 22, a portion of the guide portion 26a connecting the side plate 26a2 and the side plate 26a3 has an arc shape. A portion of the guide portion 26a connecting the side plate 26a2 and the side plate 26a4 has an arc shape. The indicator 40 extends from the side plate 26a2 of the guide portion 26a to the arc-shaped portion connecting the side plate 26a2 and the side plate 26a3 of the guide portion 26a. Furthermore, the indicator 40 extends from the side plate 26a2 of the guide portion 26a to the arc-shaped portion connecting the side plate 26a2 and the side plate 26a4 of the guide portion 26a. Due to this, the user can see the indicator 40 even when the user is viewing the battery exchanger 10 from the side.

As shown in FIGS. 6, 7, and 26, a brush seal 60 is attached to the slot flange 26 on the −Z-axis direction side. The brush seal 60 is arranged further toward the +Z-axis direction side than the exhaust slits 22b2. The brush seal 60 includes a frame 60a and a brush 60b. The frame 60a and the brush 60b are formed of resin. The brush 60b is flocked to the frame 60a. The frame 60a and the brush 60b are flexible. The brush seal 60 corresponds to an inner peripheral protruding portion of the present invention. The brush 60b corresponds to a flexible portion of the present invention.

The brush seal 60 is provided on the side plates 26a2, 26a3, and 26a4 among the side plates 26a1, 26a2, 26a3, and 26a4 of the guide portion 26a. Specifically, the brush seal 60 extends along the inner peripheral surface of the slot sleeve 23. However, the brush seal 60 is not ring-shaped. The tip of the brush 60b is positioned further inward than the guide portion 26a. That is, the brush 60b of the brush seal 60 protrudes from the inner peripheral surface of the slot sleeve 23. Furthermore, the tip of the brush 60b is positioned more inward than the inner surfaces 28e2, 28e3, and 28e4 of the reverse-insertion prevention flange 28 described above.

The position of the mobile battery 12 when stored in the slot sleeve 23 is shown by a two-dot chain line in FIG. 6. As shown in FIG. 6, the tip of the brush 60b is positioned more inward than the mobile battery 12. Therefore, the mobile battery 12 is inserted into the slot sleeve 23 while causing the brush 60b to fall sideways. Due to this, in a state where the mobile battery 12 is stored in the slot sleeve 23, the tip of the brush 60b abuts against the side surfaces 12c, 12e, and 12f of the mobile battery 12. The space between the mobile battery 12 and the side plate 26a2 of the guide portion 26a, the space between the mobile battery 12 and the side plate 26a3 of the guide portion 26a, and the space between the mobile battery 12 and the side plate 26a4 of the guide portion 26a are blocked by the brush 60b. Relatively cold air in the slot 14 collects at the −Y-axis direction side of the slot 14, and the relatively warm air collects at the +Y-axis direction side of the slot 14. Therefore, the discharge of relatively cool air in the slot 14 can be restricted by the brush 60b.

The total area of the opening of the two exhaust slits 22b2 (see FIG. 3) provided to the top side plate 22b of the slot body 22 is greater than the total area of the opening between the outer periphery of the mobile battery 12 and the inner periphery of the guide portion 26a of the slot flange 26. Due to this, most of the air guided into the slot body 22 by the fan 62 described further below passes between the slot body 22 and the side surfaces 12c to 12f of the mobile battery 12, and is then discharged through the exhaust slits 22b2.

As shown in FIGS. 13, 14, and 23, the frame 60a has a slit 60a1 cut in the Z-axis direction. A brush seal attaching portion 26d formed on the slot flange 26 is inserted into the slit 60a1. Due to this, the brush seal 60 is attached to the slot flange 26.

As shown in FIGS. 13, 14, and 23, the brush seal 60 is arranged closer to the opening portion of the slot sleeve 23 at the +Z-axis direction side than the inner door 24.

As shown in FIG. 6, in a state where the mobile battery 12 is not stored in the slot sleeve 23, members other than the inner door lock mechanism 29 and the brush seal 60 do not protrude to the inside of the insertion hole 26c. Furthermore, as shown in FIG. 8, in a state where the mobile battery 12 is stored in the slot sleeve 23, members other than the battery lock mechanism 30 do not protrude to the inside of the insertion hole 26c. Due to this, even when the user inserts a hand or the like into the insertion hole 26c, harm to the user can be prevented.

[Configuration of the Inner Door Lock Mechanism]

Figure 27:
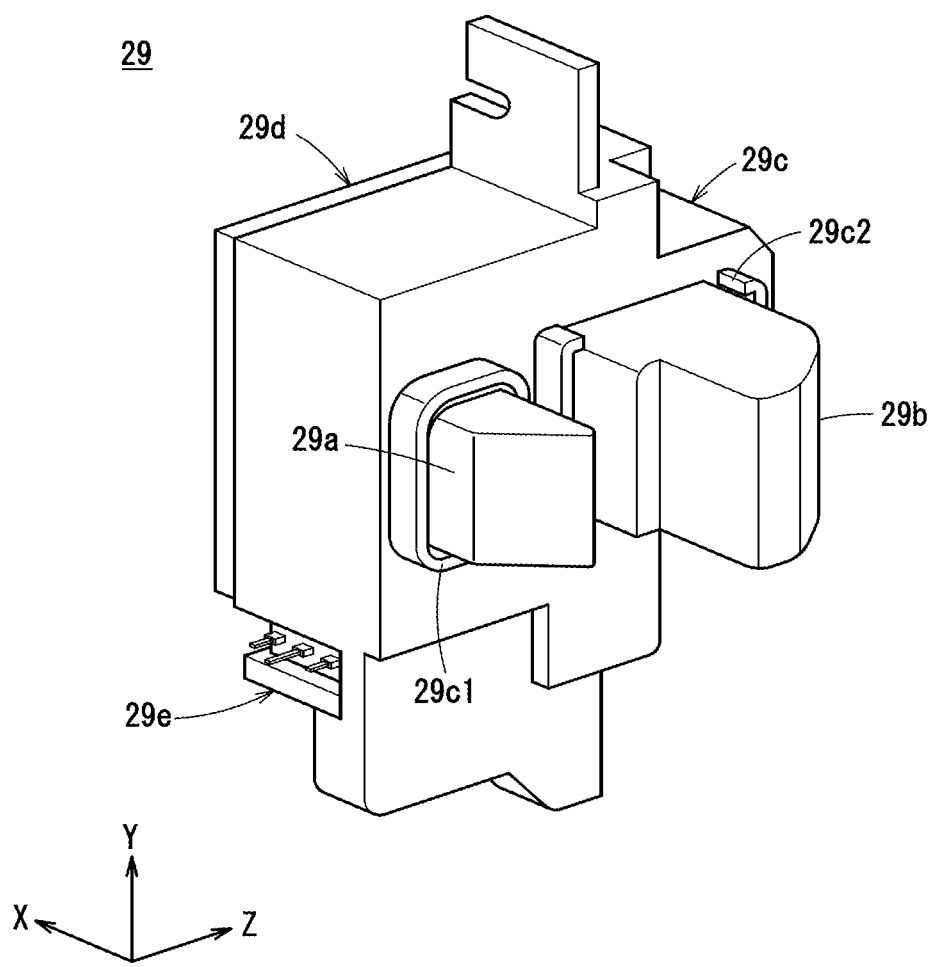
FIG. 27 is a perspective view of an inner door lock mechanism.
Figure 28:
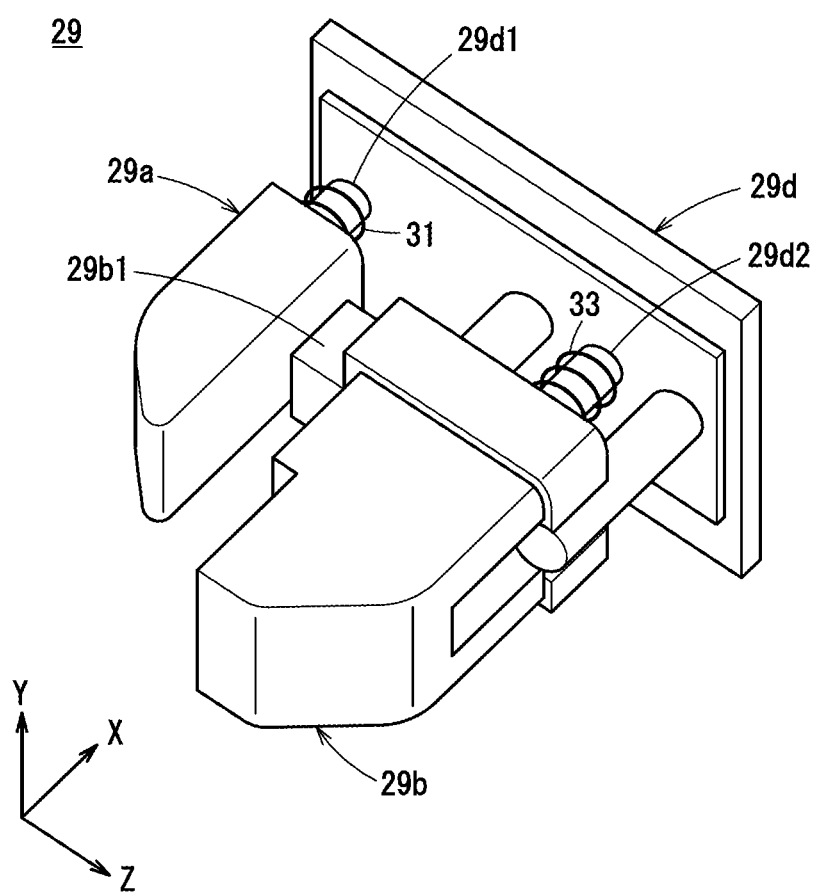
FIG. 28 is a perspective view of the inner door lock mechanism.
Figure 29:
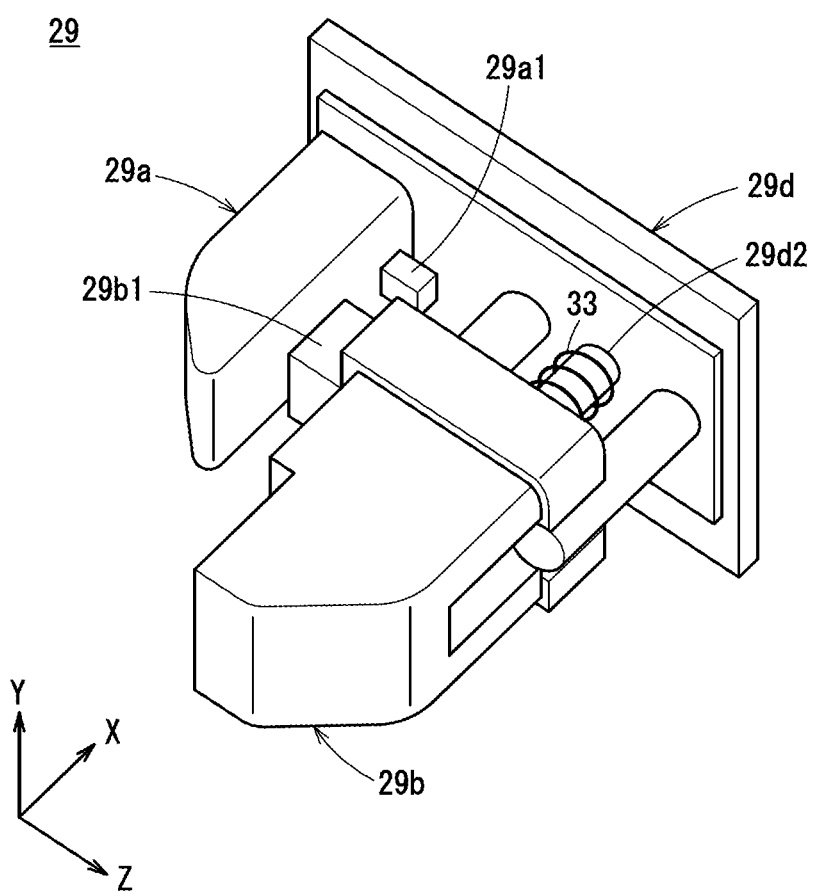
FIG. 29 is a perspective view of the inner door lock mechanism.
Figure 30:
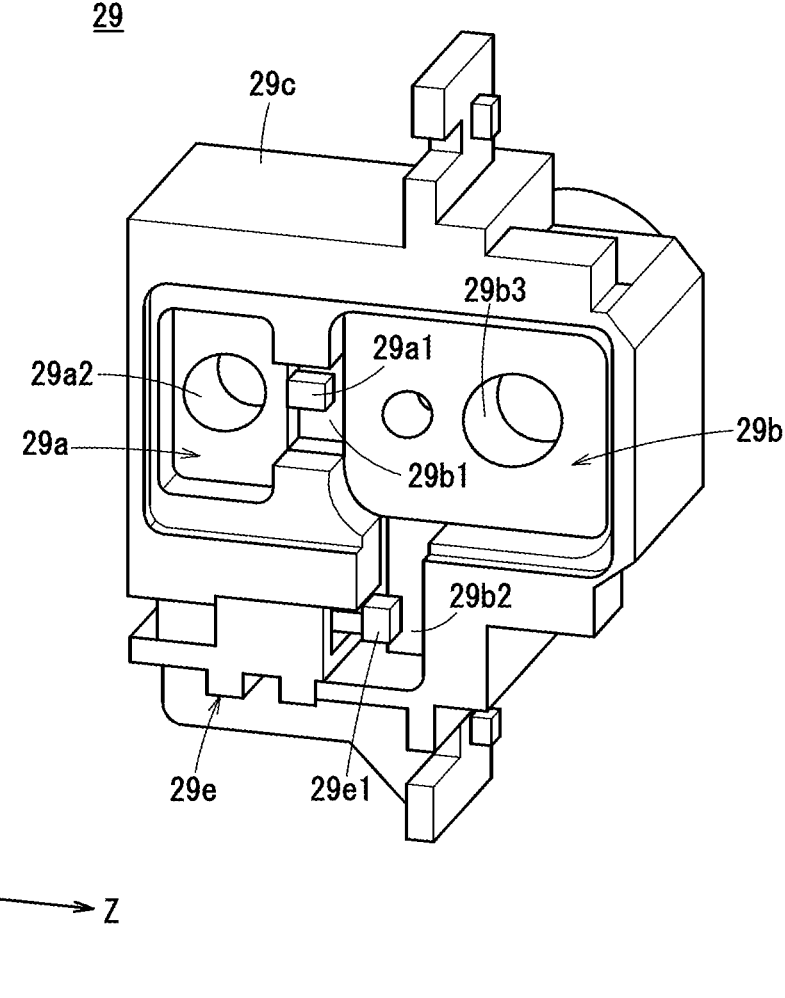
FIG. 30 is a perspective view of the inner door lock mechanism.
Figure 31:
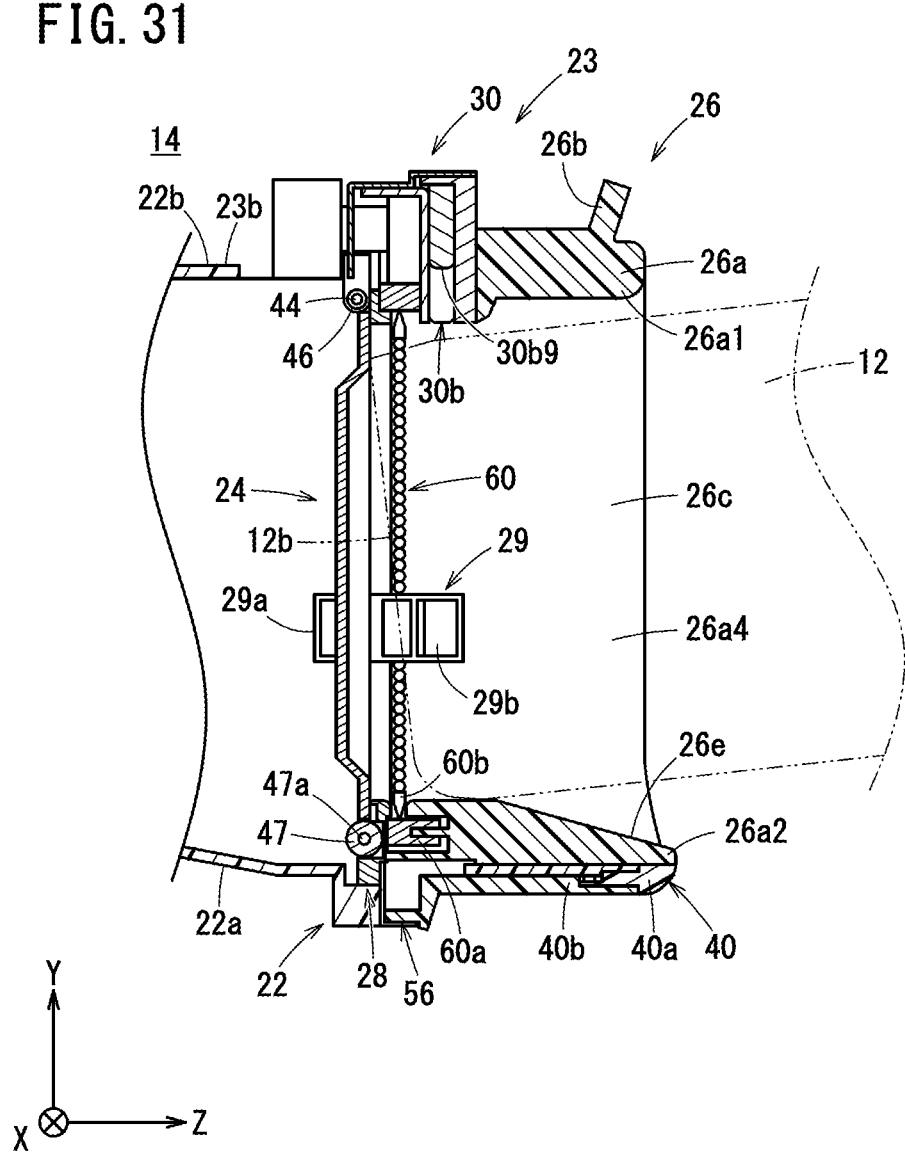
FIG. 31 shows a state in which the mobile battery is inserted diagonally into the slot flange.

FIGS. 27, 28, 29, and 30 are each a perspective view of the inner door lock mechanism 29. FIGS. 28 and 29 show the inner door lock mechanism 29 in a state where the cover 29c is removed. FIG. 31 shows a state in which the mobile battery 12 is inserted at an angle relative to the slot flange 26. The configuration of the inner door lock mechanism 29 will be described using FIGS. 6, 7, 23, 27, 28, 29, 30, and 31.

As shown in FIGS. 6 and 7, two inner door lock mechanisms 29 are provided to the slot flange 26. One inner door lock mechanism 29 is provided at the +X-axis direction side of the slot flange 26. The other inner door lock mechanism 29 is provided at the −X-axis direction side of the slot flange 26. FIGS. 29 and 30 show the inner door lock mechanism 29 provided on the +X-axis direction side of the slot flange 26. The inner door lock mechanism 29 provided on the −X-axis direction side of the slot flange 26 has mirror symmetry with respect to the inner door lock mechanism 29 provided on the +X-axis direction side of the slot flange 26.

As shown in FIG. 27, the inner door lock mechanism 29 includes a latch 29a, a release trigger 29b, a cover 29c, a guide 29d, and an insertion detection switch 29e.

As shown in FIG. 28, the latch 29a is provided to be capable of moving back and forth in the X-axis direction. The latch 29a is guided by a first guide protruding portion 29d1 formed in the guide 29d. The release trigger 29b is provided to be capable of moving back and forth in the X-axis direction. The release trigger 29b is guided by a second guide protruding portion 29d2 formed in the guide 29d.

The latch 29a is biased in a direction to protrude outward from a latch opening portion 29c1 (see FIG. 27) of the cover 29c by a return spring 31. The release trigger 29b is biased in a direction to protrude outward from a release trigger opening portion 29c2 (see FIG. 27) of the cover 29c by a return spring 33.

As shown in FIG. 29, the latch 29a includes a first protruding portion 29a1 that extends toward the release trigger 29b. As shown in FIGS. 28 and 29, the release trigger 29b includes a second protruding portion 29b1 that extends toward the latch 29a. When the latch 29a is pressed down toward the guide 29d, only the latch 29a withdraws toward the guide 29d. On the other hand, when the release trigger 29b is pressed down toward the guide 29d, the second protruding portion 29b1 presses down on the first protruding portion 29a1, and the latch 29a withdraws toward the guide 29d along with the release trigger 29b.

Due to this, the latch 29a and the release trigger 29b are mechanically connected. The latch 29a and the release trigger 29b may be electrically connected. For example, when the release trigger 29b is pressed down toward the guide 29d, a signal may be output to an actuator (not shown in the drawings) that causes the latch 29a to withdraw. Due to this, even in a case where the latch 29a and the release trigger 29b are not mechanically connected, the latch 29a can be caused to withdraw when the release trigger 29b is pressed down toward the guide 29d.

As shown in FIG. 30, the release trigger 29b includes a third protruding portion 29b2 that extends in the −Y-axis direction. When the release trigger 29b withdraws toward the guide 29d, the third protruding portion 29b2 abuts against a lever 29e1 of the insertion detection switch 29e, switching the insertion detection switch 29e from OFF to ON.

As shown in FIG. 30, a first guide hole 29a2 is formed in the latch 29a. The first guide protruding portion 29d1 described above is inserted, along with the return spring 31, into the first guide hole 29a2. A second guide hole 29b3 is formed in the release trigger 29b. The second guide protruding portion 29d2 described above is inserted, along with the return spring 33, into the second guide hole 29b3.

As shown in FIG. 23, when the inner door 24 is in the closed state, the latch 29a is positioned further toward the −Z-axis direction side than the inner door 24. That is, in the Z-axis direction in which the mobile battery 12 is inserted into and removed from the slot sleeve 23, the latch 29a is arranged on the opposite side of the inner door 24 from the insertion port 26c. When the inner door 24 is in the closed state, the release trigger 29b is arranged further toward the +Z-axis direction side than the inner door 24. That is, in the Z-axis direction in which the mobile battery 12 is inserted into and removed from the slot sleeve 23, the release trigger 29b is arranged between the inner door 24 and the insertion port 26c. Due to this, the inner door 24 is sandwiched from both sides in the Z-axis direction by the latch 29a and the release trigger 29b.

The inner door lock mechanism 29 includes one set of a latch 29a and a release trigger 29b. One set of the latch 29a and the release trigger 29b is provided on the +X-axis direction side of the slot flange 26, and another set of the latch 29a and the release trigger 29b is provided on the −X-axis direction side of the slot flange 26. That is, the one set of the latch 29a and the release trigger 29b and the other set of the latch 29a and the release trigger 29b are arranged opposite each other. Due to this, when the inner door lock mechanism 29 is in the locked state, bending of the inner door 24 can be suppressed when a force acts on the inner door 24. Furthermore, even when one of the two inner door lock mechanisms 29 is in an unlocked state, pivoting of the inner door 24 in an opening direction can be restricted.

The inner door lock mechanisms 29 may be provided on the +Y-axis direction side of the slot flange 26. On the other hand, it is preferable to avoid providing the inner door lock mechanisms 29 on the −Y-axis direction side of the slot flange 26. In other words, the inner door lock mechanisms 29 are preferably provided at positions on the inner periphery of the slot flange 26 other than portions that are lower than the mobile battery 12 when the mobile battery 12 is inserted into the slot 14. Furthermore, it can be said that the inner door lock mechanisms 29 are preferably provided on the inner periphery of the slot flange 26 other than positions that face portions located below the mobile battery 12 when the mobile battery 12 is inserted into the slot 14. This is in order to avoid a situation where an excessive force acts on the inner door lock mechanisms 29 due to the weight of the mobile battery 12 when the mobile battery 12 is inserted into the slot sleeve 23.

As shown in FIG. 6, the release trigger 29b is arranged on the path via which the mobile battery 12 is inserted into and removed from the slot sleeve 23. When the mobile battery 12 is inserted into the slot sleeve 23 from the +Z-axis direction, the mobile battery 12 presses down on the release trigger 29b. Due to this, the latch 29a withdraws along with the release trigger 29b. As a result, the inner door lock mechanism 29 enters the unlocked state. At this time, the insertion detection switch 29e switches from OFF to ON. Due to this, the mobile battery 12 is detected as being inserted into the slot sleeve 23.

FIG. 31 shows a state in which the mobile battery 12 is inserted into the slot flange 26 with the mobile battery 12 having the maximum inclination with respect to the slot flange 26. In this case as well, the mobile battery 12 presses down on the release trigger 29b before the mobile battery 12 abuts against the inner door 24. Due to this, at the time when the mobile battery 12 pushes the inner door 24, the inner door lock mechanism 29 already enters the unlocked state. As a result, the inner door 24 can pivot in the opening direction.

When the mobile battery 12 is pulled out from the slot 14, the latch 29a and the release trigger 29b return to their original positions. As a result, the inner door lock mechanism 29 enters the locked state. The bias force of the return spring 31 of the latch 29a is set to be slightly smaller than the bias force of the return spring 33 of the release trigger 29b. Due to this, the latch 29a returns to the original position later than the release trigger 29b. Therefore, after the inner door 24 has closed, the latch 29a returns to its original position. Therefore, the movement of pivoting of the inner door 24 in the closing direction can be prevented from interfering with the latch 29a.

[Configuration of the Holding Detection Switch]

Figure 32A:
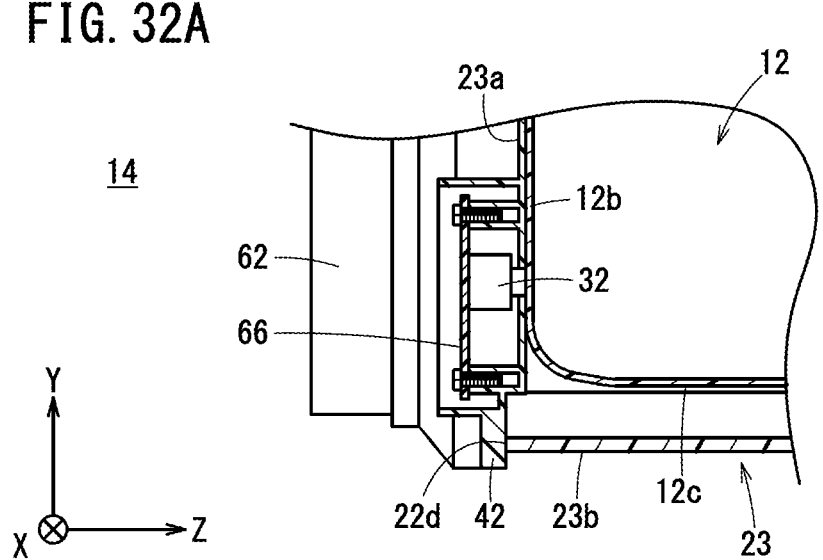
FIG. 32A is a cross-sectional view of the slot.
Figure 32B:
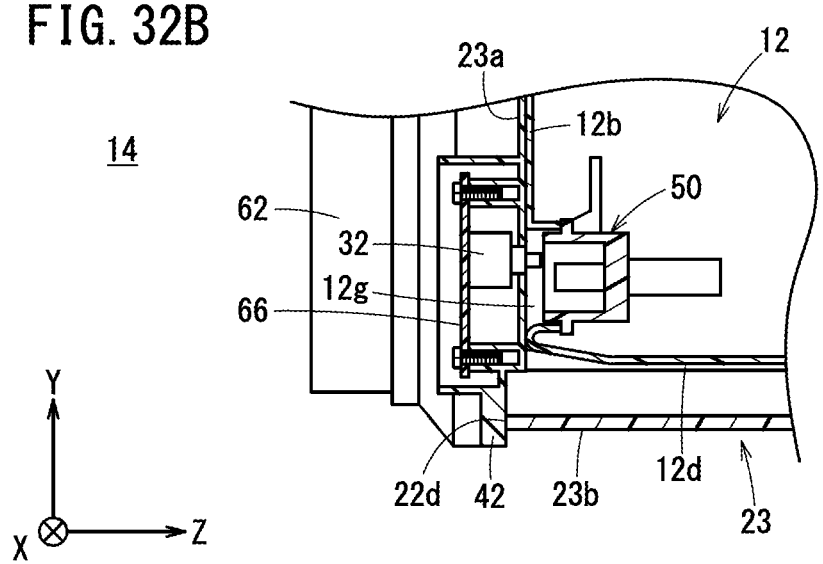
FIG. 32B is a cross-sectional view of the slot.

FIGS. 32A and 32B are cross-sectional views of the slot 14.

FIGS. 32A and 32B show the holding detection switch 32 and members in the vicinity thereof. FIGS. 32A and 32B show a state in which the mobile battery 12 is stored in the slot sleeve 23. The configuration of the holding detection switch 32 will be described using FIGS. 5, 32A, and 32B.

As shown in FIG. 5, the holding detection switch 32 is attached to the bottom cover 42. The holding detection switch 32 is arranged more toward the −Y-axis direction side than the center of the bottom cover 42 in the Y-axis direction.

In a state where the side surface 12d faces in the +Y-axis direction, when the mobile battery 12 is inserted into the slot sleeve 23, the bottom surface 12b of the mobile battery 12 presses down on the holding detection switch 32, as shown in FIG. 32A. Due to this, the holding detection switch 32 switches from OFF to ON.

In a state where the side surface 12d faces in the −Y-axis direction, when the mobile battery 12 is inserted into the slot sleeve 23, the holding detection switch 32 is inserted into the recessed portion 12g around the connector 50 of the mobile battery 12, as shown in FIG. 32B. Therefore, the bottom surface 12b cannot press on the holding detection switch 32. Due to this, the holding detection switch 32 remains in the OFF state.

Since the slot 14 of the present embodiment includes the reverse-insertion prevention flange 28, in the state where the side surface 12d faces in the −Y-axis direction, the mobile battery 12 is not actually inserted into the slot sleeve 23, as shown in FIG. 32B.

[Configuration of the Bottom Cover Assembly]

Figure 33:
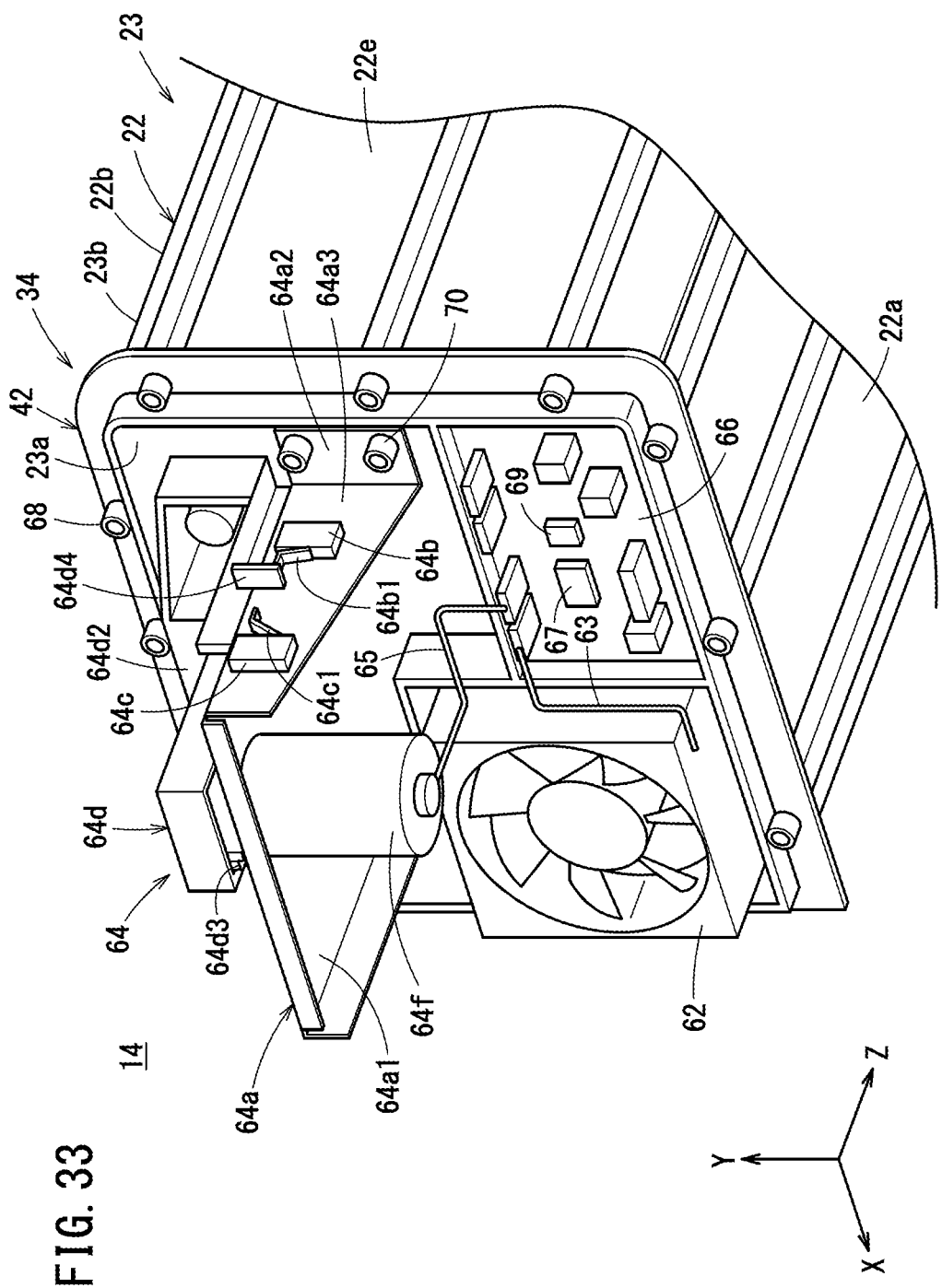
FIG. 33 is a perspective view of the slot.
Figure 34:
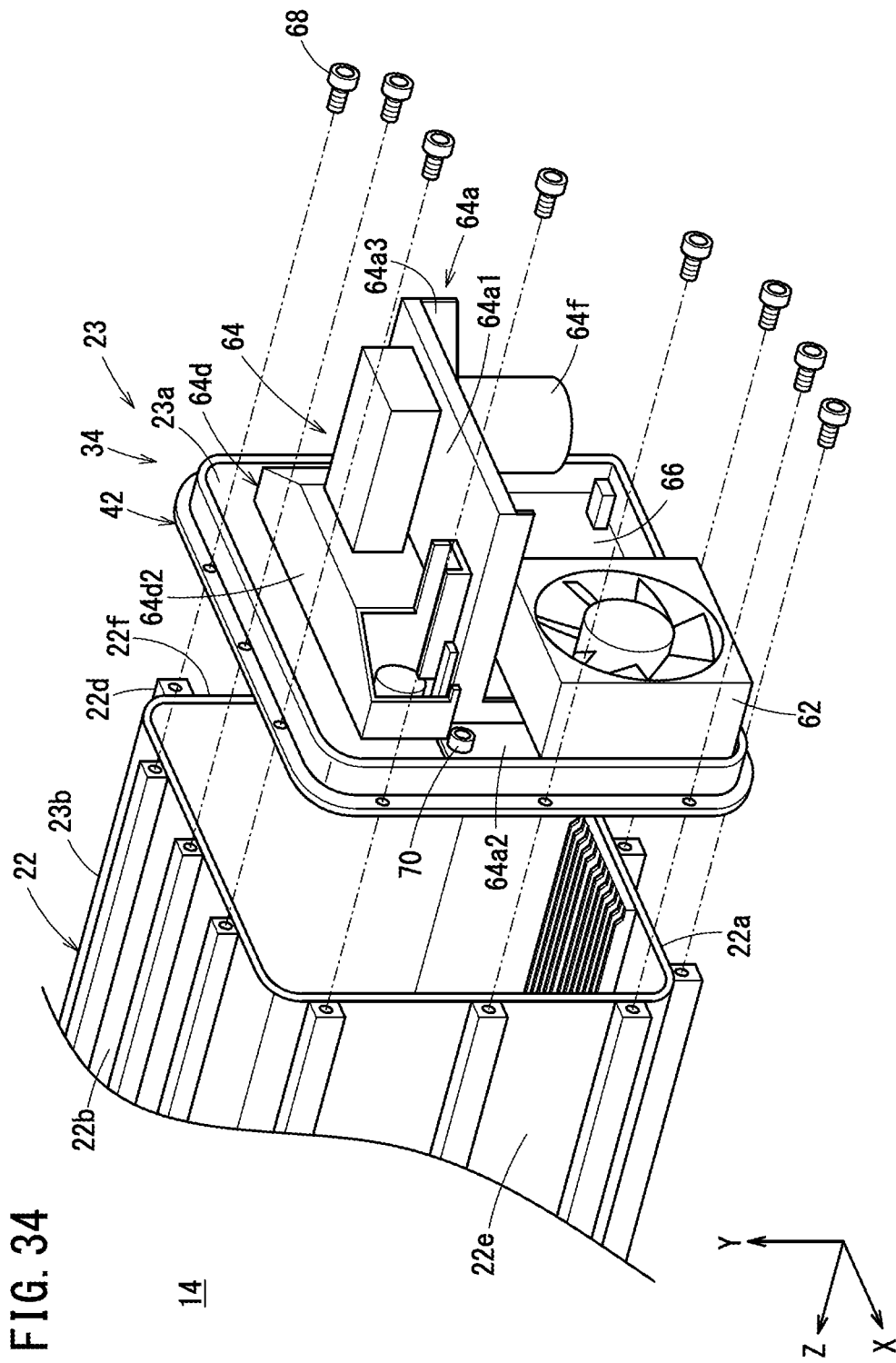
FIG. 34 is a perspective view of the slot.
Figure 35:
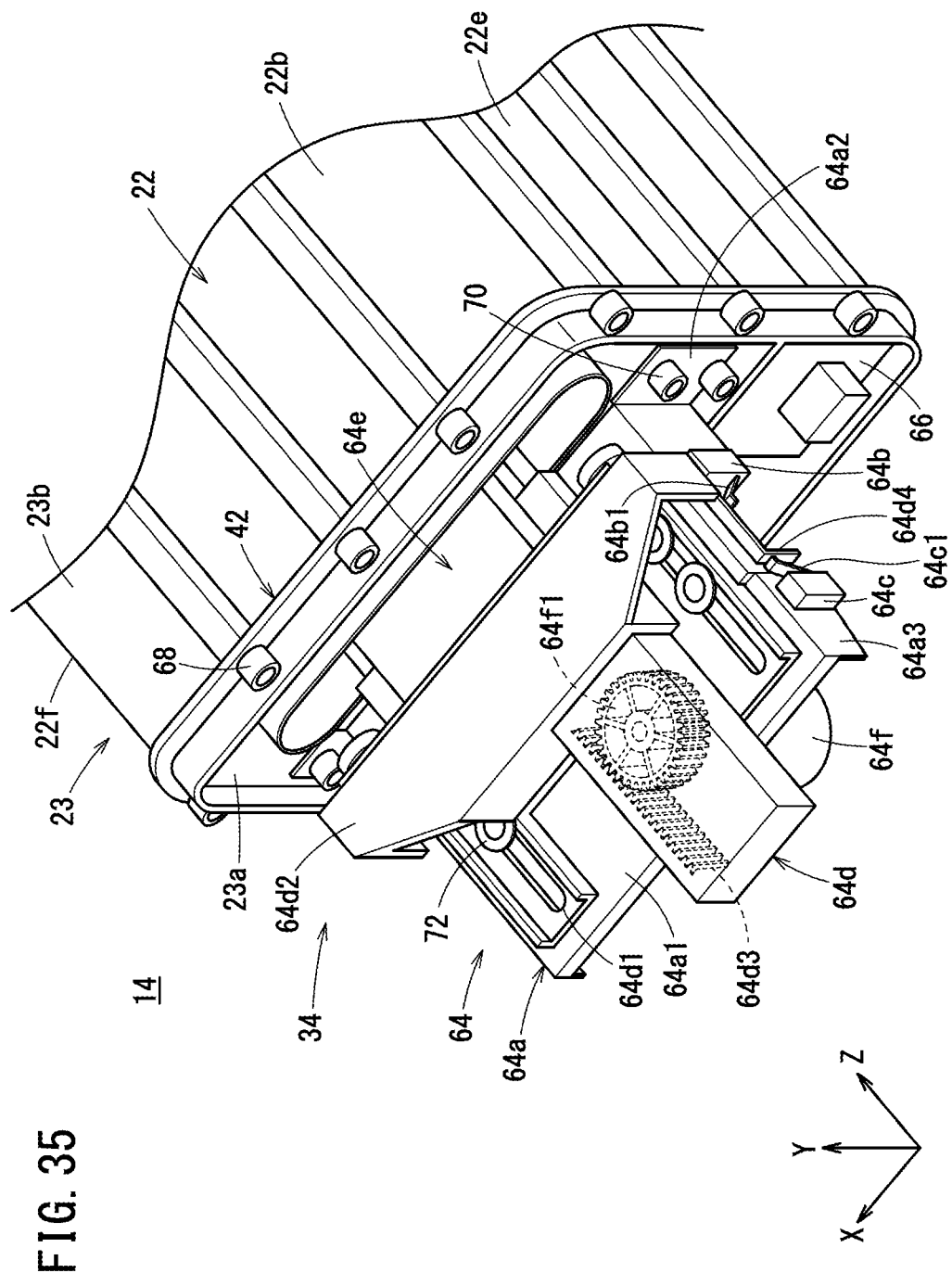
FIG. 35 is a perspective view of the slot.
Figure 36:
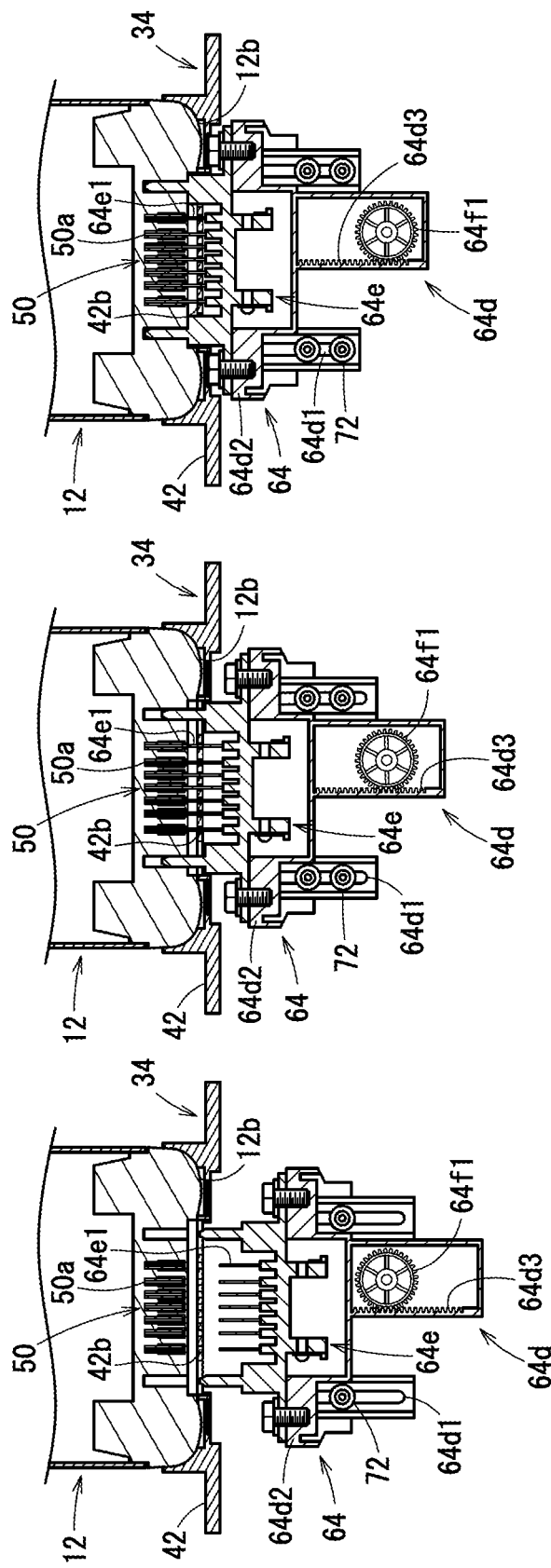
FIG. 36A is a cross-sectional view of a bottom cover assembly and the mobile battery.
FIG. 36B is a cross-sectional view of a bottom cover assembly and the mobile battery.
FIG. 36C is a cross-sectional view of a bottom cover assembly and the mobile battery.

FIGS. 33, 34, and 35 are each a perspective view of the slot 14. FIG. 34 shows a state in which the bottom cover assembly 34 has been removed from the slot body 22. FIGS. 36A, 36B, and 36C are each a cross-sectional view of the bottom cover assembly 34 and the mobile battery 12. The configuration of the bottom cover assembly 34 will be described using FIGS. 5, 33, 34, 35, 36A, 36B, and 36C.

As shown in FIGS. 33, 34, and 35, the fan 62, connector unit 64, and electronic circuit board 66 are attached to the bottom portion 23a of the bottom cover 42, to form the bottom cover assembly 34. The fan 62 corresponds to a blowing portion of the present invention.

A control section 67 and a storage section 69 are mounted on the electronic circuit board 66. The electronic circuit board 66 with the control section 67 and storage section 69 mounted thereon forms a computer. An electronic circuit is formed on the electronic circuit board 66, and the control section 67, the storage section 69, and many other electronic devices and electric devices are mounted on this electronic circuit. The holding detection switch 32 described above is also mounted on the electronic circuit of the electronic circuit board 66. As shown in FIG. 15, the holding detection switch 32 is attached to the surface of the electronic circuit board 66 on the +Z-axis direction side. The holding detection switch 32 is included in the bottom cover assembly 34. The fan 62, the connector unit 64, and the electronic circuit board 66 are assembled together with the bottom cover 42. The bottom cover 42 and the opening portion 22d of the slot body 22 on the −Z-axis direction side are fastened together by bolts 68.

The control section 67 performs charging control of the mobile battery 12 stored in the slot sleeve 23. The control section 67 is realized by a processing circuit, for example. The processing circuit is formed by an integrated circuit such as an ASIC (Application Specific Integrated Circuit) or an FPGA (Field-Programmable Gate Array), for example. Alternatively, the processing circuit may be formed by an electronic circuit that includes a discrete device. The processing circuit may be formed by a processor such as a CPU (Central Processing Unit) or a GPU (Graphics Processing Unit), for example. In such a case, the processing circuit is realized by executing a program stored in the storage section 69 with the processor.

As described above, the fan 62, the connector unit 64, and the electronic circuit board 66 are assembled to the bottom portion 23a of the bottom cover 42, to form the bottom cover assembly 34. The holding detection switch 32 described above is also mounted on the electronic circuit of the electronic circuit board 66. As shown in FIG. 15, the holding detection switch 32 is attached to the surface of the electronic circuit board 66 on the +Z-axis direction side. The holding detection switch 32 is included in the bottom cover assembly 34. The fan 62, the connector unit 64, and the electronic circuit board 66 are assembled together with the bottom cover 42. The bottom cover 42 and the opening portion 22d of the slot body 22 on the −Z-axis direction side are fastened together by bolts 68.

As described above, the fan 62, the connector unit 64, and the electronic circuit board 66 are assembled together with the bottom cover 42, to form the bottom cover assembly 34. Therefore, when the fan 62, the connector unit 64, and the electronic circuit board 66 malfunction, the entire bottom cover assembly 34 can be replaced along with the bottom cover 42. Due to this, the time for the work of replacing malfunctioning devices can be shortened. Furthermore, since the slot body 22 that has high durability compared to the bottom cover assembly 34 can be reused, the cost of maintaining the battery exchanger 10 can be reduced.

As shown in FIGS. 33 and 34, the fan 62 is attached at a position corresponding to an intake port 42c (see FIG. 7) of the bottom cover 42. The intake port 42c allows communication between the outside and the inside of the slot sleeve 23. The intake port 42c is arranged on the +X-axis direction side of the bottom cover 42 relative to the axial line 21, in the horizontal direction (X-axis direction). Furthermore, the intake port 42c is arranged vertically lower than the axial line 21. By driving the fan 62, air is sent to the inside of the slot sleeve 23. Due to this, the flow of air inside the slot sleeve 23 is facilitated.

As described above, the exhaust slits 22b2 are arranged at the −X-axis direction side of the slot body 22 relative to the axial line 21, in the horizontal direction (X-axis direction). Furthermore, the exhaust slits 22b2 are arranged vertically higher than the axial line 21. Furthermore, the exhaust slits 22b2 are arranged on the +Z-axis direction side of the center of the slot sleeve 23, in the Z-axis direction. Therefore, inside the slot sleeve 23, the distance between the intake port 42c and the exhaust slits 22b2 can be increased. Due to this, the flow of air in the entire inside of the slot sleeve 23 can be facilitated. Furthermore, due to air at a lower temperature than the mobile battery 12 being blown inside the slot sleeve 23, cooling of the mobile battery 12 can be facilitated.

As shown in FIGS. 33 and 34, the electronic circuit board 66 is arranged further toward the −X-axis direction side than the fan 62. A cable 63 is arranged between the electronic circuit board 66 and the fan 62. A cable 65 is arranged between the electronic circuit board 66 and a motor 64f of the connector unit 64 described further below. Electricity is supplied from the electronic circuit board 66 to the fan 62 and motor 64f. Due to this, the fan 62 and the motor 64f are driven.

As shown in FIGS. 33, 34, and 35, the connector unit 64 includes a base 64a, a connection detection switch 64b, a disconnection detection switch 64c, a connector holder 64d, the connector 64e, and the motor 64f.

The base 64a is fixed to the bottom portion 23a of the bottom cover 42. The base 64a extends in the −Z-axis direction from the surface of the bottom portion 23a on the −Z-axis direction side. The base 64a may be formed integrally with the bottom cover 42. The base 64a includes a body portion 64a1, two flange portions 64a2, and a switch attachment surface 64a3.

The two flange portions 64a2 are formed integrally with the body portion 64a1. One flange portion 64a2 is provided on the +X-axis direction side of the body portion 64a1. The other flange portion 64a2 is provided on the −X-axis direction side of the body portion 64a1. Each flange portion 64a2 is formed extending in the X-axis direction from the end portion of the body portion 64a1 on the +Z-axis direction side.

The switch attachment surface 64a3 is formed integrally with the body portion 64a1. The switch attachment surface 64a3 is provided on the −X-axis direction side of the body portion 64a1. The switch attachment surface 64a3 extends in the −Y-axis direction from the end portion of the body portion 64a1 on the −X-axis direction side.

The flange portion 64a2 of the base 64a and the bottom cover 42 are fastened together by a bolt 70. The connection detection switch 64b and the disconnection detection switch 64c are attached to the switch attachment surface 64a3. The connection detection switch 64b and the disconnection detection switch 64c are separated from each other in the Z-axis direction. The connection detection switch 64b is arranged on the +Z-axis direction side and the disconnection detection switch 64c is arranged on the −Z-axis direction side, relative to the center of the switch attachment surface 64a3 in the Z-axis direction.

The connector holder 64d is attached to the surface of the body portion 64a1 of the base 64a on the +Y-axis direction side. The connector holder 64d includes two guide holes 64d1, a connector attachment portion 64d2, a rack 64d3, and a switch operating element 64d4.

Each guide hole 64d1 is a through-hole that extends in the Z-axis direction. The two guide holes 64d1 are separated from each other in the X-axis direction. Two guide pins 72 are inserted into the respective guide holes 64d1. The guide pins 72 are fixed to the body portion 64a1 of the base 64a. Due to this, the connector holder 64d moves in the Z-axis direction relative to the base 64a.

The connector 64e (male connector 64e) is attached to the connector attachment portion 64d2. As shown in FIG. 15, the connector 64e is arranged vertically higher than the holding detection switch 32. Due to this, exposure of the connector 64e to water, due to liquid intruding inside the slot 14, can be restricted. The connector 64e engages with the connector 50 of the mobile battery 12. At this time, electricity is supplied from the connector 64e to the mobile battery 12, and the mobile battery 12 is charged. The male connecter 64e corresponds to a second electric terminal of the present invention.

The rack 64d3 is arranged further toward the −Z-axis direction side than the connector attachment portion 64d2. The rack 64d3 extends in the Z-axis direction. The +Y-axis direction side of the rack 64d3 is not exposed to the outside. On the other hand, as shown in FIG. 33, the −Y-axis direction side of the rack 64d3 is exposed to the outside.

The switch operating element 64d4 is attached to the side surface of the connector holder 64d on the −X-axis direction side. The switch operating element 64d4 moves in the Z-axis direction, along with the connector holder 64d. The switch operating element 64d4 extends in the −Y-axis direction along the switch attachment surface 64a3 of the base 64a, from the connector holder 64d.

The motor 64f is attached to the surface of the body portion 64a1 of the base 64a on the −Y-axis direction side. The motor 64f includes a drive shaft (not shown in the drawings). The drive shaft extends in the +Y-axis direction from the motor 64f. The tip of the drive shaft is inserted into the connector holder 64d. A pinion 64f1 is attached to the tip of the drive shaft of the motor 64f. The pinion 64f1 meshes with the rack 64d3. Due to this, the motor 64f is mechanically connected to the connector 64e, via the pinion 64f1, the rack 64d3, and the base 64a.

The connector 64e and the motor 64f are attached to the bottom portion 23a of the bottom cover 42 via the base 64a. The connector 64e and the motor 64f are supported by the bottom cover 42. Due to this, the connector 64e, the motor 64f, and the bottom cover 42 can be handled integrally.

When the bottom cover 42 is viewed from the −Z-axis direction, the holding detection switch 32, the fan 62, the base 64a, the connection detection switch 64b, the disconnection detection switch 64c, the connector holder 64d, the connector 64e, the motor 64f, the pinion 64f1, the rack 64d3, and the electronic circuit board 66 are arranged in a manner to be contained inside the outer edge of the bottom cover 42. In other words, the holding detection switch 32, the fan 62, the base 64a, the connection detection switch 64b, the disconnection detection switch 64c, the connector holder 64d, the connector 64e, the motor 64f, the pinion 64f1, the rack 64d3, and the electronic circuit board 66 are arranged to be contained within the range of a parallel projection of the outer edge of the bottom cover 42. The parallel projection of the outer edge of the bottom cover 42 is a virtual region obtained by projecting the outer edge of the bottom cover 42 in an extension direction of the slot sleeve 23 (insertion and removal direction of the mobile battery 12, or the Z-axis direction).

Due to this, when the bottom cover 42 is attached to the slot body 22, the holding detection switch 32, the fan 62, the base 64a, the connection detection switch 64b, the disconnection detection switch 64c, the connector holder 64d, the connector 64e, the motor 64f, the pinion 64f1, the rack 64d3, and the electronic circuit board 66 can be prevented from interfering with the surrounding members.

The base 64a extends in the −Z-axis direction from the surface of the bottom portion 23a of the bottom cover 42 on the −Z-axis direction side, and therefore many members can be attached to the base 64a.

[Control of the Slot]

By driving the motor 64f, the connector 64e moves in the Z-axis direction along with the connector holder 64d. When the holding detection switch 32 has switched from OFF to ON, the holding detection switch 32 detects that the mobile battery 12 is held by the slot sleeve 23. In this case, the motor 64f moves the connector 64e in the +Z-axis direction, to bring the connector 64e closer to the connector 50 of the mobile battery 12.

When the holding detection switch 32 has switched from ON to OFF, the holding detection switch 32 detects that the mobile battery 12 has been removed from the slot sleeve 23. In this case, the motor 64f moves the connector 64e in the −Z-axis direction, to move the connector 64e away from the connector 50 of the mobile battery 12.

When the holding detection switch 32 is OFF, the holding detection switch 32 does not detect that the mobile battery 12 is held by the slot sleeve 23. In this case, the motor 64f does not move the connector 64e in the +Z-axis direction, and so the connector 64e does not approach the connector 50 of the mobile battery 12.

FIG. 33 shows a state in which the connector holder 64d is positioned on the most +Z-axis direction side. As shown in FIG. 33, when the connector holder 64d is positioned on the most +Z-axis direction side, the switch operating element 64d4 abuts against a movable contact piece 64b1 of the connection detection switch 64b, and presses the movable contact piece 64b1 in the +Z-axis direction. Due to this, the connection detection switch 64b is turned ON. The position of the connector 64e at this time is a connection position. The connection detection switch 64b detects that the connector 64e is at the connection position, and that the connector 64e is connected to the connector 50 of the mobile battery 12.

FIG. 35 shows a state in which the connector holder 64d is positioned on the most −Z-axis direction side. As shown in FIG. 35, when the connector holder 64d is positioned on the most −Z-axis direction side, the switch operating element 64d4 abuts against a movable contact piece 64c1 of the disconnection detection switch 64c, and presses the movable contact piece 64c1 in the −Z-axis direction. Due to this, the disconnection detection switch 64c is turned ON. The position of the connector 64e at this time is a disconnection position. The disconnection detection switch 64c detects that the connector 64e is at the disconnection position, and that the connector 64e is disconnected from the connector 50 of the mobile battery 12.

FIG. 36A shows a state in which the connector 64e is positioned at the disconnection position. When the connector 64e is positioned at the disconnection position, as shown in FIG. 36A, the tip of the terminal 64e1 of the connector 64e is position further toward the −Z-axis direction side than the bottom cover 42. At this time, the disconnection detection switch 64c is ON and the connection detection switch 64b is OFF.

FIG. 36B shows a state in which the connector 64e has moved in the +Z-axis direction from the disconnection position. As shown in FIG. 36B, when the connector 64e moves in the +Z-axis direction from the disconnection position, the tip of the terminal 64e1 passes through a connector insertion hole 42b of the bottom cover 42. The tip of the terminal 64e1 that has passed through the connector insertion hole 42b is inserted into a terminal hole 50a of the connector 50 of the mobile battery 12. At this time, the disconnection detection switch 64c and the connection detection switch 64b are both OFF.

FIG. 36C shows a state when the connector 64e is positioned at the connection position. As shown in FIG. 36C, when the connector 64e is positioned at the connection position, connection between the connector 64e and the connector 50 of the mobile battery 12 is complete. At this time, the disconnection detection switch 64c is OFF and the connection detection switch 64b is ON.

When the connector 64e is moving in a direction toward the connector 50 of the mobile battery 12, if the connection detection switch 64b detects that the connector 64e and the connector 50 have been connected, the control section 67 controls the motor 64f to stop the connector 64e. When the connector 64e is moving in a direction away from the connector 50 of the mobile battery 12, if the disconnection detection switch 64c detects that the connector 64e has been disconnected from the connector 50, the control section 67 controls the motor 64f to stop the connector 64e.

When the holding detection switch 32 has detected that the mobile battery 12 is held in the slot sleeve 23 and the connection detection switch 64b has detected that the connector 64e and the connector 50 of the mobile battery 12 are connected, the control section 67 allows usage of the mobile battery 12. Specifically, the control section 67 performs charging control of the mobile battery 12, to charge the mobile battery 12.

If the holding detection switch 32 does not detect that the mobile battery 12 is held in the slot sleeve 23, or the connection detection switch 64b does not detect that the connector 64e and the connector 50 of the mobile battery 12 are connected, the control section 67 prohibits usage of the mobile battery 12. Specifically, the control section 67 does not perform charging control of the mobile battery 12, and does not charge the mobile battery 12.

If the disconnection detection switch 64c detects that the connector 64e has been disconnected from the connector 50 of the mobile battery 12, the control section 67 allows the mobile battery 12 to be removed from the slot sleeve 23. Specifically, the control section 67 sets the battery lock mechanism 30 to the unlocked state, which is a state in which the user can pull the mobile battery 12 out from the slot 14.

If the disconnection detection switch 64c does not detect that the connector 64e is disconnected from the connector 50 of the mobile battery 12, the control section 67 prohibits removal of the mobile battery 12 from the slot sleeve 23. Specifically, the control section 67 sets the battery lock mechanism 30 to the locked state, which is a state in which the user cannot pull the mobile battery 12 out from the slot 14.

With the connector unit 64 of the present embodiment, by driving the motor 64f, the connector 64e is moved from the disconnection position to the connection position, and the connector 64e is moved from the connection position to the disconnection position.

In the connector unit 64, a first aspect or a second aspect described below, in which the connector 64e is moved using the elastic bias force of a spring or the like, may be adopted. In the first aspect, the connector 64e is moved from the disconnection position to the connection position by driving the motor 64f, and the connector 64e is moved from the connection position to the disconnection position by the elastic bias force of the spring or the like. In the second aspect, the connector 64e is moved from the disconnection position to the connection position by the elastic bias force of the spring or the like, and the connector 64e is moved from the connection position to the disconnection position by driving the motor 64f.

In the connector unit 64, the connector 64e may be moved using the force generated when the inner door 24 is opened.

In the connector unit 64, the connector 64e may be moved using the weight of the mobile battery 12.

[Configuration of the Battery Lock Mechanism]

Figure 37:
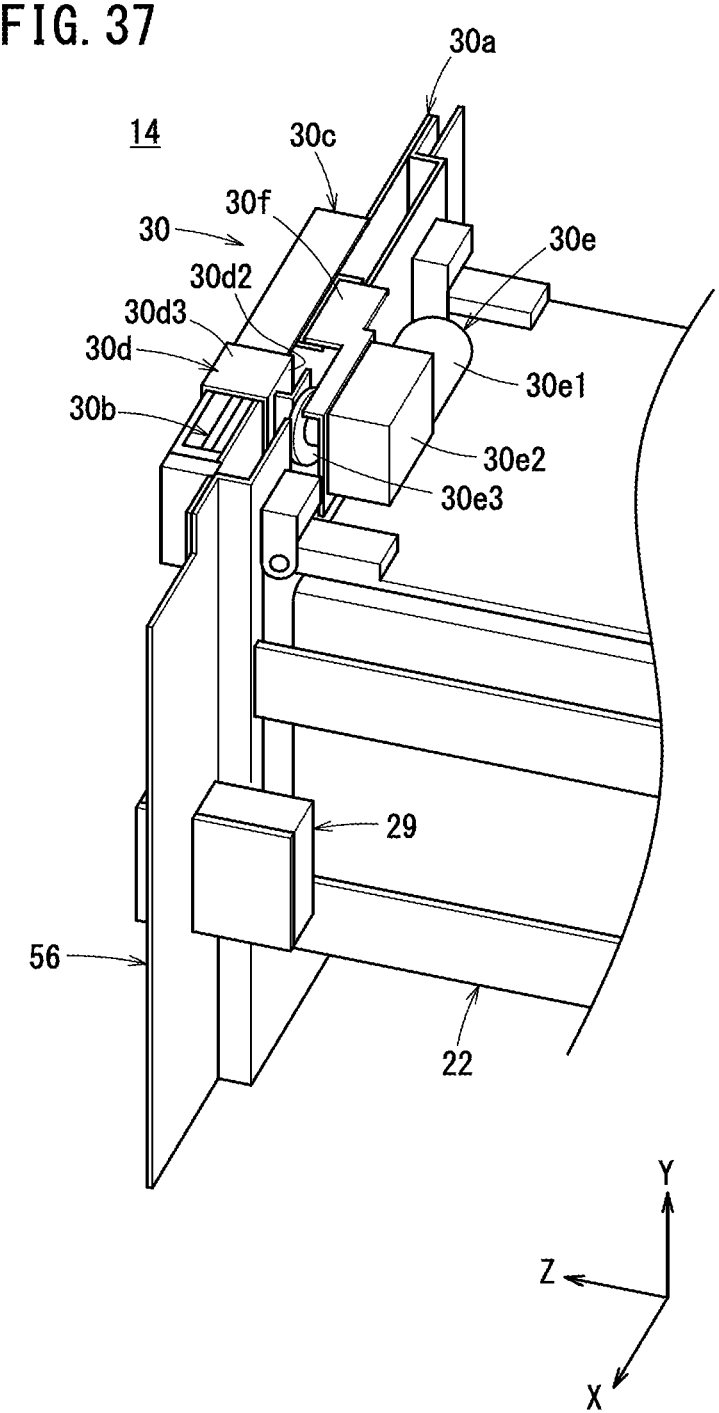
FIG. 37 is a perspective view of the slot.
Figure 38:
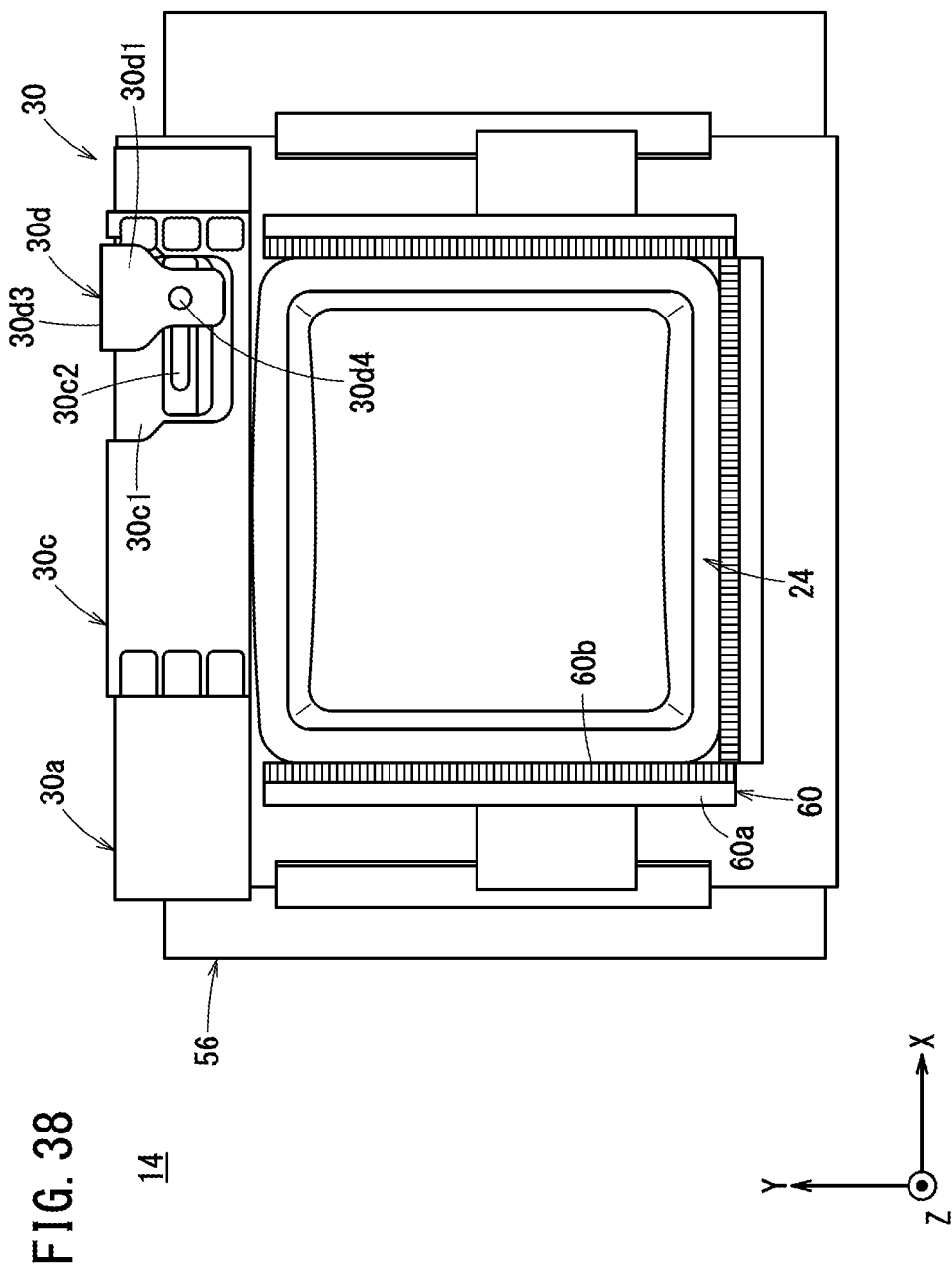
FIG. 38 is a front view of the slot.
Figure 39:
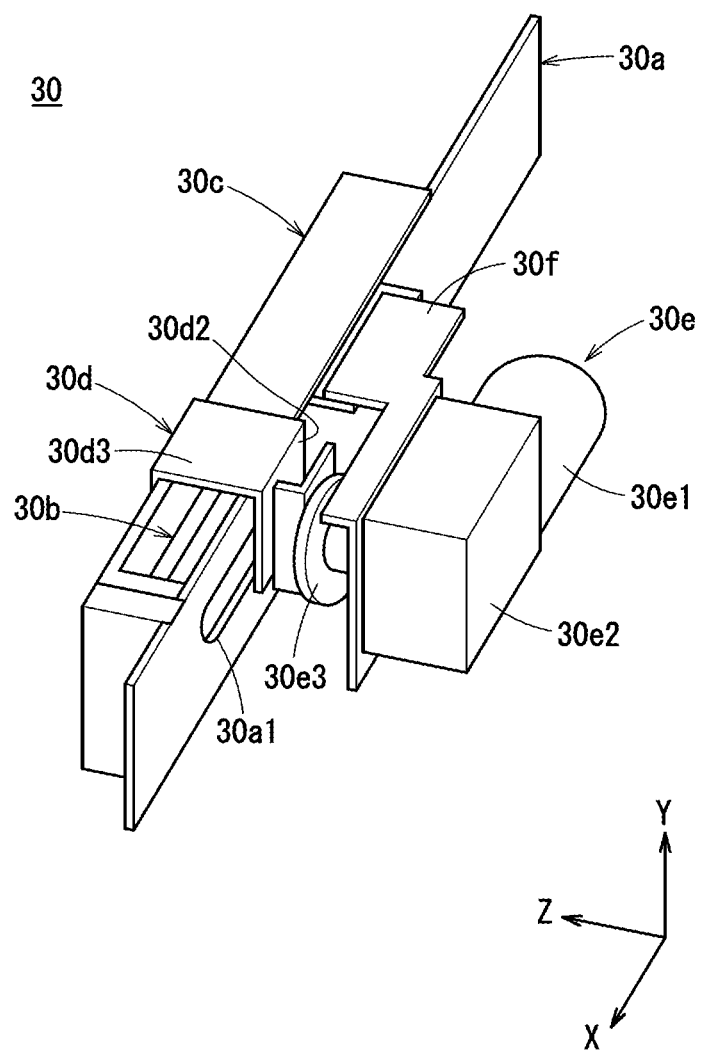
FIG. 39 is a perspective view of the battery lock mechanism.
Figure 40:
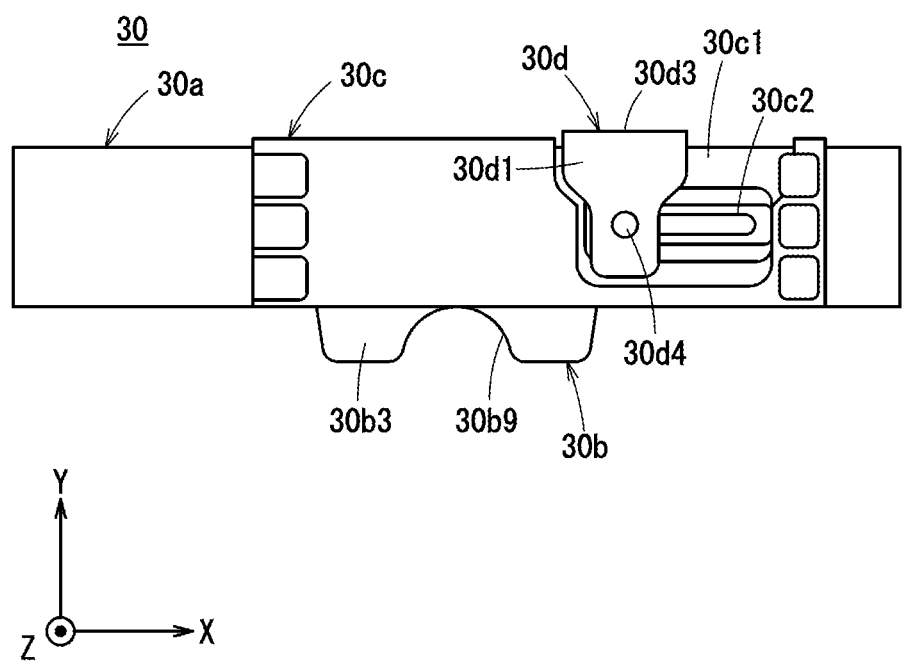
FIG. 40 is a front view of the battery lock mechanism.
Figure 41:
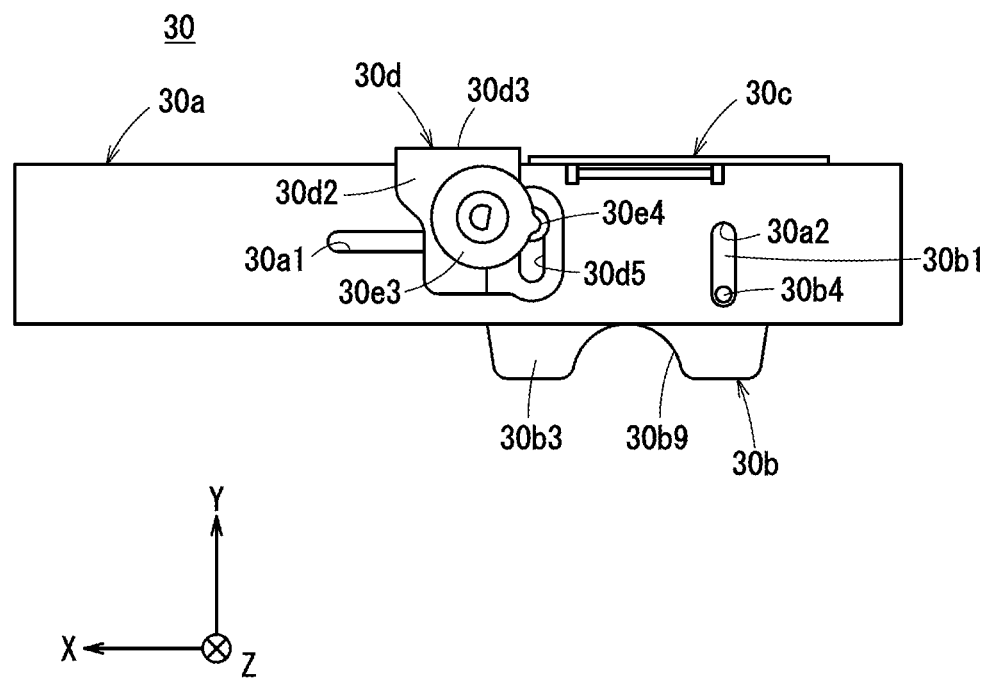
FIG. 41 is a rear view of the battery lock mechanism.
Figure 42A:
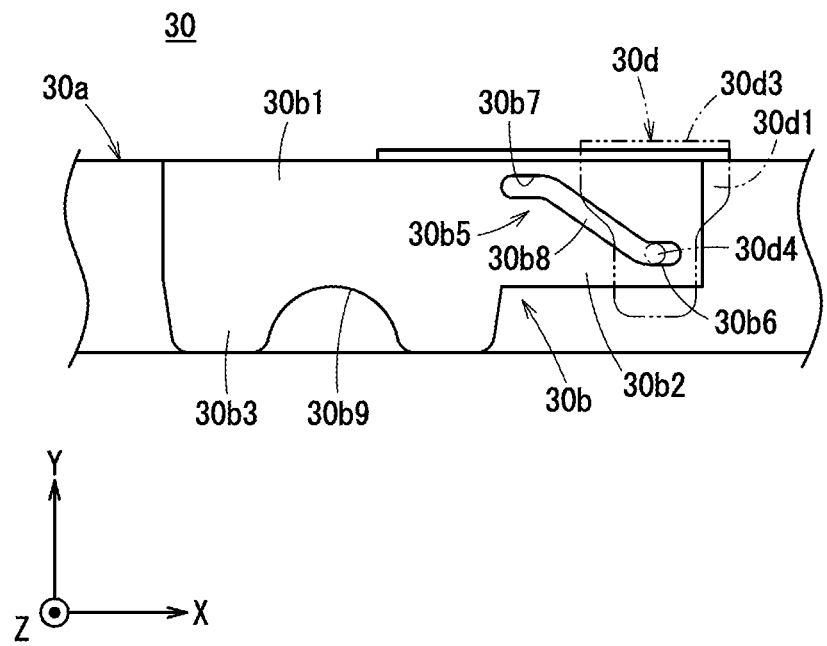
FIG. 42A is a front view of the battery lock mechanism.
Figure 42B:
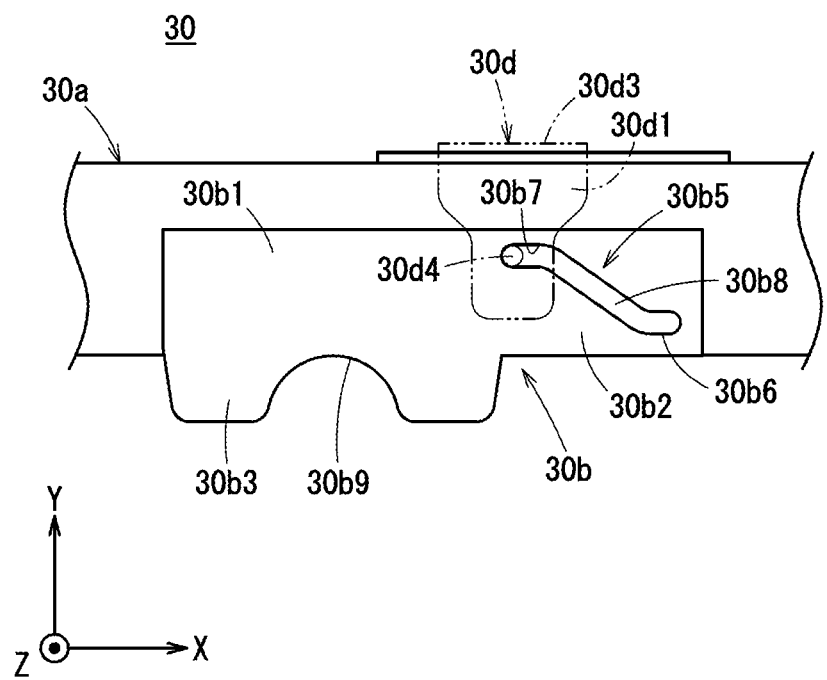
FIG. 42B is a front view of the battery lock mechanism.
Figure 43:
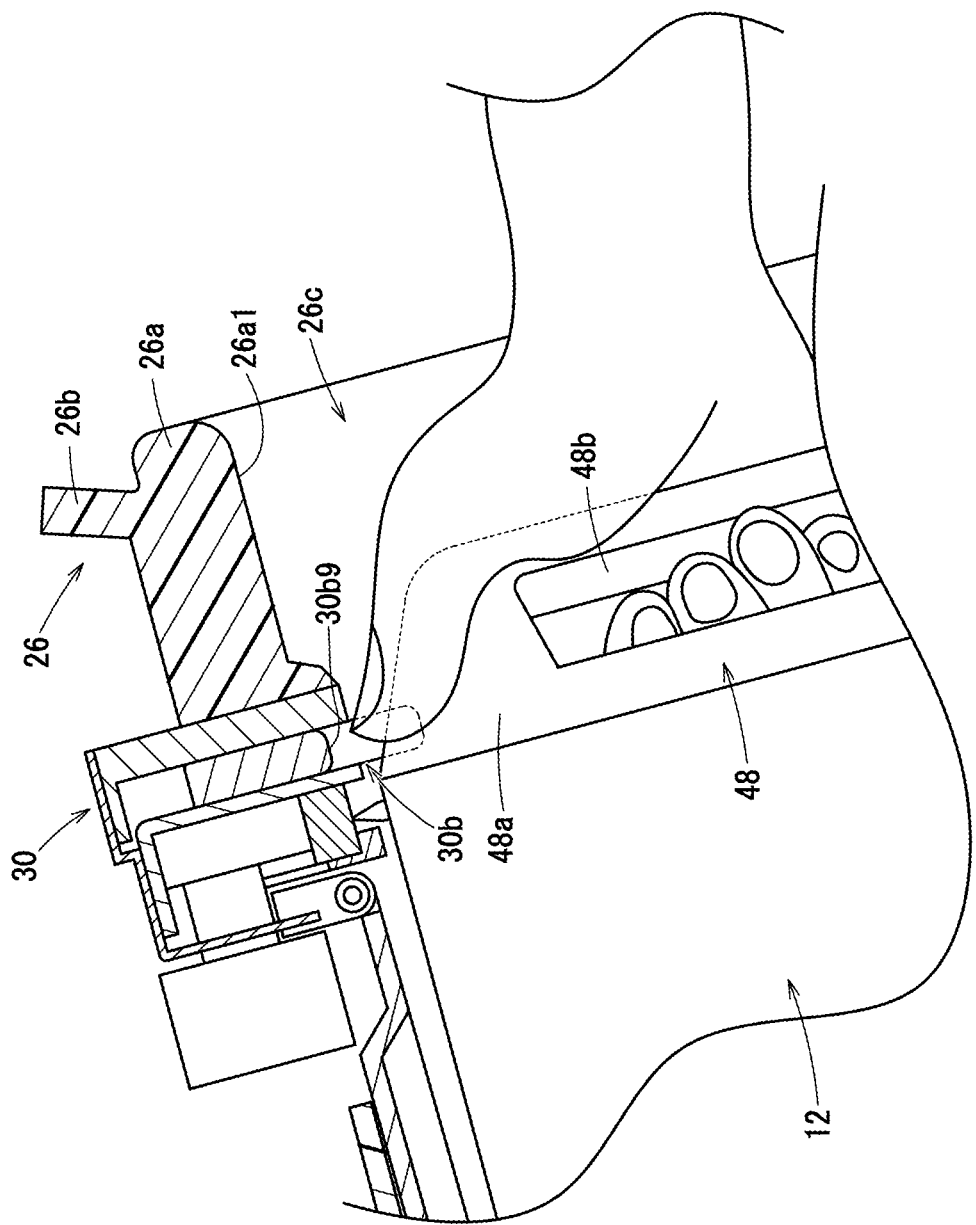
FIG. 43 shows a state in which the mobile battery is pulled out from a slot sleeve.

FIG. 37 is a perspective view of the slot 14. FIG. 38 is a front view of the slot 14. FIGS. 37 and 38 show a state in which the slot flange 26 has been removed. FIG. 39 is a perspective view of the battery lock mechanism 30. FIG. 40 is a front view of the battery lock mechanism 30. FIG. 41 is a rear view of the battery lock mechanism 30. FIGS. 42A and 42B are each a front view of the battery lock mechanism 30. FIGS. 42A and 42B show a state in which a cover 30c has been removed. FIG. 43 shows a state in which the mobile battery 12 is pulled out from the slot sleeve 23. The configuration of the battery lock mechanism 30 will be described using FIGS. 6, 8, 37, 38, 39, 40, 41, 42A, 42B, and 43.

As shown in FIGS. 37 and 38, the battery lock mechanism 30 is attached to the +Y-axis direction side of the slot fixing stay 56.

As shown in FIG. 39, the battery lock mechanism 30 includes a frame 30a, a plate 30b, the cover 30c, a slide bar 30d, and a slide driving portion 30e. A stopper 30b3 of the plate 30b described further below is provided on the trajectory along which the mobile battery 12 is inserted into and removed from the slot 14, in a manner capable of moving back and forth.

As shown in FIG. 41, the frame 30a includes a slide rail 30a1 and two guide holes 30a2. The slide rail 30a1 is an elongated hole extending in the X-axis direction. The two guide holes 30a2 are spaced from each other in the X-axis direction. The two guide holes 30a2 are each an elongated hole extending in the Y-axis direction. In FIG. 41, one guide hole 30a2 among the two guide holes 30a2 overlaps with the slide bar 30d and cannot be seen.

The plate 30b is attached to the surface of the frame 30a on the +Z-axis direction side. As shown in FIGS. 42A and 42B, the plate 30b includes a body portion 30b1, an extending portion 30b2, and the stopper 30b3.

As shown in FIG. 41, a guide pin 30b4 protrudes toward the −Z-axis direction side from the body portion 30b1. The guide pin 30b4 is inserted into the guide hole 30a2 of the frame 30a. Due to this, the plate 30b moves in the Y-axis direction relative to the frame 30a.

As shown in FIGS. 42A and 42B, the extending portion 30b2 is formed extending in the +X-axis direction from the body portion 30b1. A slide slit 30b5 is formed in the extending portion 30b2. The slide slit 30b5 is a through-hole that penetrates through the extending portion 30b2. The slide slit 30b5 includes a first horizontal portion 30b6, a second horizontal portion 30b7, and an inclined portion 30b8. The inclined portion 30b8 is arranged between the first horizontal portion 30b6 and the second horizontal portion 30b7. The first horizontal portion 30b6 is provided contiguously to the end portion of the inclined portion 30b8 on the +X-axis direction side. The second horizontal portion 30b7 is provided contiguously to the end portion of the inclined portion 30b8 on the −X-axis direction side.

As shown in FIGS. 42A and 42B, the stopper 30b3 is formed extending in the −Y-axis direction from the body portion 30b1. The stopper 30b3 includes an escape portion 30b9 that is recessed in the +Y-axis direction and formed near a center portion of the stopper 30b3 in the X-axis direction.

As shown in FIG. 39, in a state where the plate 30b is attached to the frame 30a, the cover 30c is attached to the frame 30a from the +Z-axis direction. Due to this, the plate 30b is arranged in a state of being sandwiched from both sides in the Z-axis direction by the frame 30a and the cover 30c.

As shown in FIG. 40, the cover 30c includes a slide bar attachment portion 30c1 and a slide rail 30c2. The slide bar attachment portion 30c1 has a recessed shape which is recessed in the −Z-axis direction from the side surface of the cover 30c. The slide rail 30c2 is shaped as an elongated hole extending in the X-axis direction, and is arranged in the slide bar attachment portion 30c1.

As shown in FIGS. 40 and 41, the slide bar 30d includes a front surface portion 30d1, a back surface portion 30d2, a middle portion 30d3, and a slide pin 30d4.

The front surface portion 30d1 is arranged further toward the +Z-axis direction side than the cover 30c, and the back surface portion 30d2 is arranged further toward the −Z-axis direction side than the frame 30a. The middle portion 30d3 links the front surface portion 30d1 and the back surface portion 30d2, on the +Y-axis direction side of the slide bar 30d. In a state where the slide pin 30d4 has been inserted into the slide rail 30c2 of the cover 30c, the slide slit 30b5 of the plate 30b, and the slide rail 30a1 of the frame 30a, the both ends of the slide pin 30d4 are fixed respectively to the front surface portion 30d1 and the back surface portion 30d2. Due to this, the slide bar 30d moves in the X-axis direction relative to the frame 30a, the plate 30b, and the cover 30c.

As shown in FIG. 41, a cam hole 30d5 is formed in the back surface portion 30d2 of the slide bar 30d. The cam hole 30d5 is shaped as an elongated hole extending in the Y-axis direction.

As shown in FIG. 39, the slide driving portion 30e is attached to a mount 30f extending from the −Z-axis direction side of the frame 30a. The slide driving portion 30e includes a motor 30e1, a gearbox 30e2, and a cam 30e3. The motor 30e1 has a drive shaft extending in the X-axis direction. The gearbox 30e2 converts the rotation of the motor 30e1 around a rotational axis parallel to the X-axis direction into rotation around a rotational axis parallel to the Z-axis, and transmits this rotation to the cam 30e3. As shown in FIG. 41, the cam 30e3 is a member shaped as a circular disc. The cam 30e3 includes a cam pin 30e4 that extends in the +Z-axis direction, on an outer circumferential portion thereof. The cam pin 30e4 is inserted into the cam hole 30d5 of the slide bar 30d.

When the cam 30e3 rotates to the right in FIG. 41, the cam pin 30e4 moves in the −Y-axis direction inside the cam hole 30d5. Due to this, the cam pin 30e4 slides the slide bar 30d in the +X-axis direction. As shown in FIG. 42A, when the slide bar 30d has slid in the +X-axis direction, the slide pin 30d4 is positioned at the first horizontal portion 30b6 of the slide slit 30b5 of the plate 30b. Due to this, the plate 30b moves in the +Y-axis direction. As a result, as shown in FIG. 6, the stopper 30b3 of the plate 30b protrudes to the inside of the slot flange 26. At this time, the battery lock mechanism 30 enters the unlocked state. Due to this, the battery lock mechanism 30 does not obstruct the movement of the mobile battery 12 being inserted into the slot sleeve 23. Furthermore, the battery lock mechanism 30 does not obstruct the movement of the mobile battery 12 being pulled out from the slot 14.

When the cam 30e3 rotates to the left in FIG. 41, the cam pin 30e4 moves in the +Y-axis direction inside the cam hole 30d5. Due to this, the cam pin 30e4 slides the slide bar 30d in the −X-axis direction. As shown in FIG. 42B, when the slide bar 30d has moved in the −X-axis direction, the slide pin 30*d*4 moves to the second horizontal portion 30*b*7 through the slide slit 30*b*5 of the plate 30*b*. Due to this, the plate 30*b* moves in the −Y-axis direction. As a result, as shown in FIG. 8, the stopper 30*b*3 of the plate 30*b* protrudes to the inside of the slot flange 26. At this time, the battery lock mechanism 30 is in the locked state. When the mobile battery 12 stored in the slot sleeve 23 moves in the +Z-axis direction, the plate 30*b* abuts against the top surface 12*a* of the mobile battery 12. Due to this, the battery lock mechanism 30 restricts the movement of the mobile battery 12 being pulled out from the slot 14.

When the battery lock mechanism 30 is in the locked state, the slide pin 30*d*4 is positioned at the second horizontal portion 30*b*7. At this time, even though a force in the +Y-axis direction acts on the stopper 30*b*3, movement of the stopper 30*b*3 in the +Y-axis direction is restricted. Due to this, the battery lock mechanism 30 can be restricted from entering the unlocked state.

As shown in FIG. 8, the escape portion 30*b*9 of the plate 30*b* is positioned further toward the +Y-axis direction side than the first grip portion 48*a* and the second grip portion 48*b* of the handle 48. When inserting or removing the mobile battery 12 into or from the slot 14, the user usually grips the second grip portion 48*b* of the handle 48 of the mobile battery 12 with their second finger (pointer finger), third finger (middle finger), fourth finger (ring finger), and fifth finger (pinkie finger). Therefore, the first finger (thumb) is put on a portion where the first grip portion 48*a* and the second grip portion 48*b* intersect.

The escape portion 30*b*9 of the plate 30*b* is positioned further toward the +Y-axis direction side than the portion of the handle 48 where the first grip portion 48*a* and the second grip portion 48*b* intersect. Therefore, as shown in FIG. 43, interference between the first finger of the user and the plate 30*b* can be restricted.

Second Embodiment

The battery exchanger 10 of the present embodiment includes a mechanism that discharges liquid such as rain water to the outside from the inside of the slot 14. Aside from the configuration described below, the configuration of the battery exchanger 10 of the present embodiment is the same as that of the battery exchanger 10 of the first embodiment.

Figure 44:
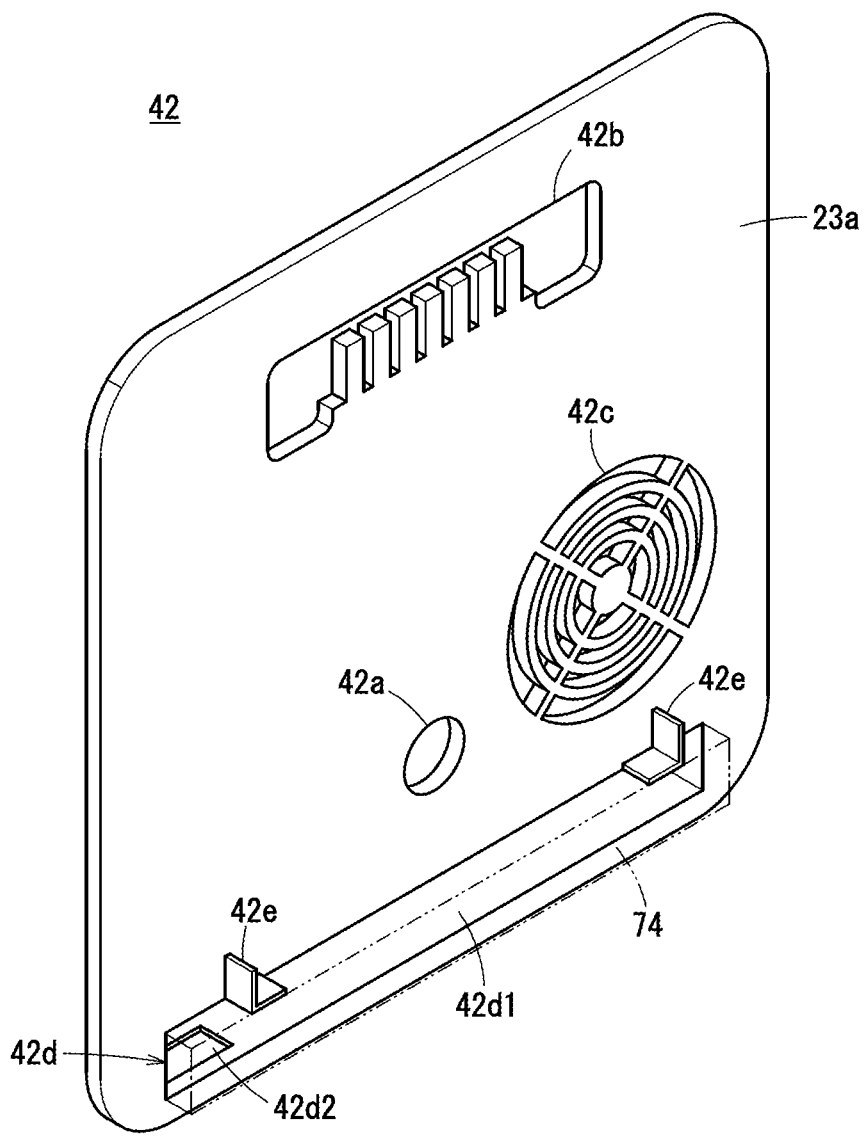
FIG. 44 is a perspective view of a bottom cover.
Figure 45:
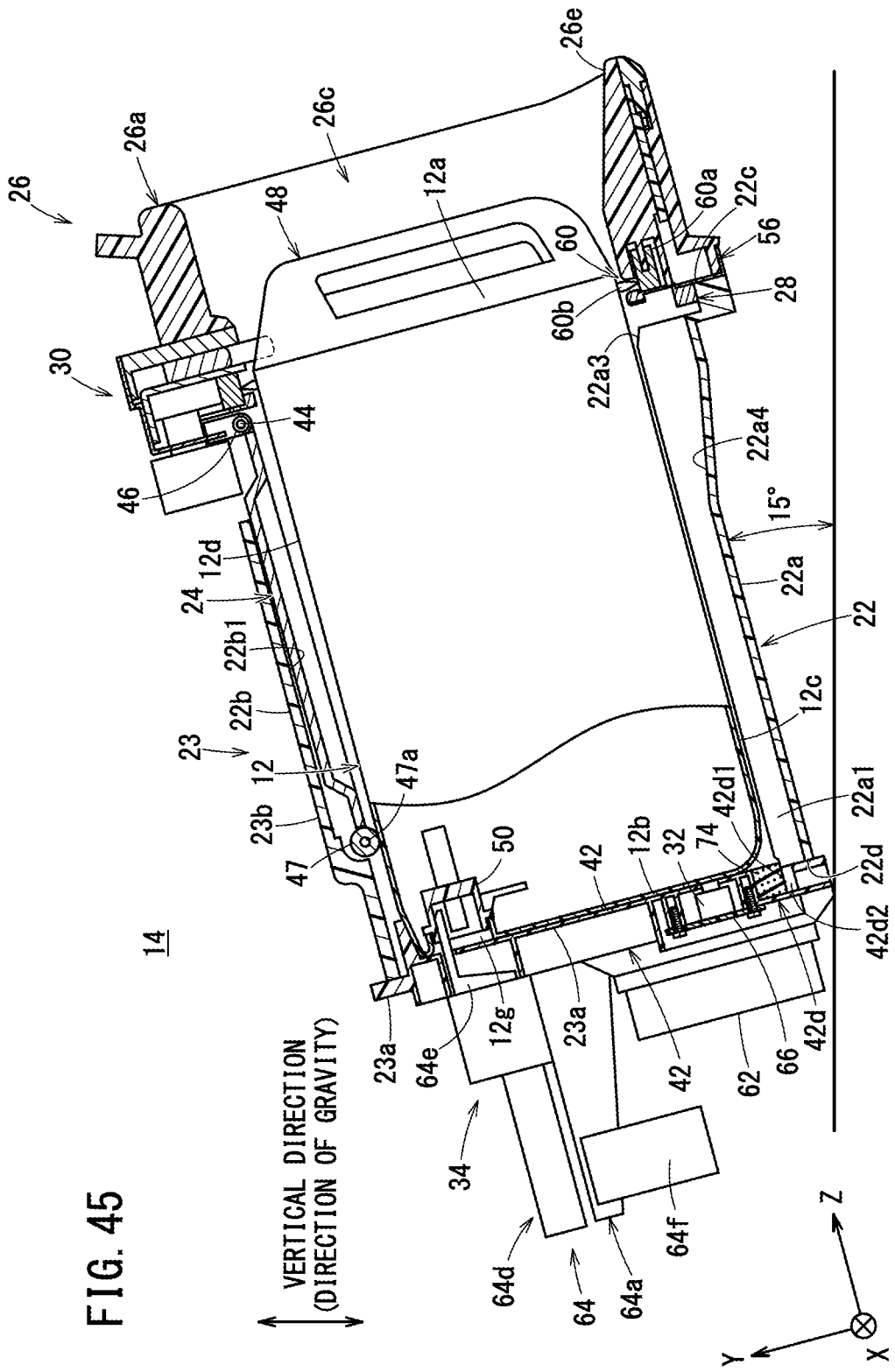
FIG. 45 is a cross-sectional view of the slot.

FIG. 44 is a perspective view of the bottom cover 42. FIG. 45 is a cross-sectional view of the slot 14. FIG. 45 shows a state in which the mobile battery 12 is stored in the slot sleeve 23.

As shown in FIG. 44, the bottom cover 42 includes a switch hole 42*a*, a connector insertion hole 42*b*, an intake port 42*c*, and a water discharge path 42*d*. The intake port 42*c* corresponds to a first communication path of the present invention. The connector insertion hole 42*b* corresponds to a third communication path of the present invention. The water discharge path 42*d* corresponds to a fourth communication path of the present invention.

The holding detection switch 32 is attached in the switch hole 42*a* from the −Z-axis direction side. A portion of the holding detection switch 32 passes through the switch hole 42*a* to be exposed on the +Z-axis direction side of the bottom cover 42.

When the connector 64*e* has moved in the +Z-axis direction, the tip of the connector 64*e* passes through the connector insertion hole 42*b* to be exposed on the +Z-axis direction side of the bottom cover 42. The connector insertion hole 42*b* is arranged on the +Y-axis direction side, relative to the switch hole 42*a*, the intake port 42*c* and the water discharge path 42*d*. That is, the connector insertion hole 42*b* is arranged vertically above the switch hole 42*a*, the intake port 42*c*, and the water discharge path 42*d*. The space remaining after the switch hole 42*a*, the intake port 42*c*, and the water discharge path 42*d* have been arranged on the bottom cover 42 is utilized to arrange the connector insertion hole 42*b* therein. Furthermore, exposure of the connector 64*e* to water, due to liquid that has intruded into the slot 14, can be restricted.

The intake port 42*c* and the water discharge path 42*d* connect the outside and the inside of the slot 14 with each other. The fan 62 is attached to the −Z-axis direction side of the intake port 42*c*. By driving the fan 62, air is blown to the inside of the slot sleeve 23 from the intake port 42*c*. Due to this, the flow of air between the outside and inside of the slot sleeve 23 is facilitated.

The water discharge path 42*d* discharges liquid such as rain water to the outside from inside the slot 14. The water discharge path 42*d* is arranged further on the −Y-axis direction side than the intake port 42*c* and the switch hole 42*a*. In other words, the water discharge path 42*d* is arranged vertically below the intake port 42*c* and the switch hole 42*a*. Due to this, as shown in FIG. 45, the water discharge path 42*d* is arranged vertically below the fan 62 and the holding detection switch 32.

The water discharge path 42*d* is formed from a first water discharge path 42*d*1 and a second water discharge path 42*d*2. As shown in FIG. 45, the portion of the bottom cover 42 that is further on the −Y-axis direction side than the position where the holding detection switch 32 is attached has a recessed shape that is recessed in the −Z-axis direction. The portion having this recessed shape extends in the X-axis direction, as shown in FIG. 44. The portion having this recessed shape forms the first water discharge path 42*d*1. An opening portion that opens in the Y-axis direction is formed in the end portion of the first water discharge path 42*d*1 on the −X-axis direction side. This opening portion forms the second water discharge path 42*d*2.

A filtering member 74 is attached to the first water discharge path 42*d*1. The filtering member 74 is fitted in the first water discharge path 42*d*1 having a recessed shape. The filtering member 74 is attachable to and detachable from the first water discharge path 42*d*1. Two ribs 42*e* are formed further on the +Y-axis direction side than the first water discharge path 42*d*1. A portion of the filtering member 74 sticking out from the first water discharge path 42*d*1 is held down in the −Y-axis direction by these two ribs 42*e*. The filtering member 74 may be a porous member such as a sponge filter, for example.

Figure 46:
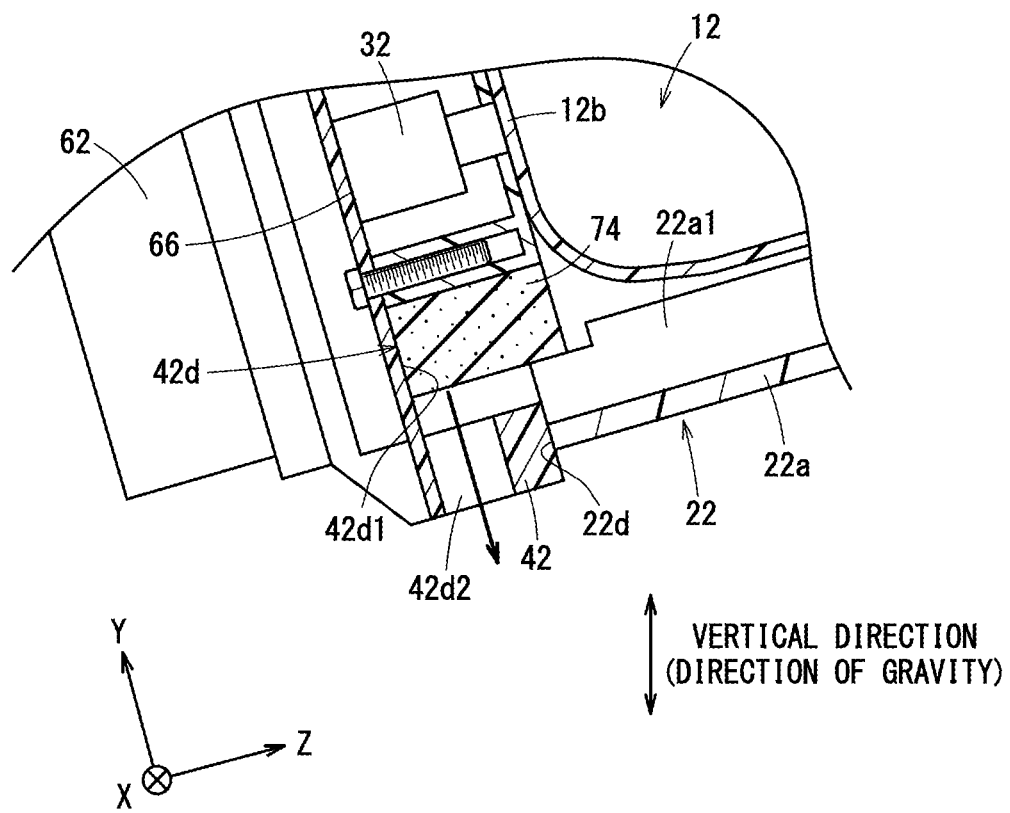
FIG. 46 is a cross-sectional view of the slot.

FIG. 46 is a cross-sectional view of the slot 14. FIG. 46 is an enlarged view of the water discharge path 42*d* and the surrounding region. FIG. 46 shows a state in which the mobile battery 12 is stored in the slot sleeve 23.

As shown by the arrows in FIG. 46, liquid that has entered inside the slot 14 from the insertion port 26*c* of the slot 14 passes through the filtering member 74 of the first water discharge path 42*d*1, and is discharged to the outside of the slot 14 from the second water discharge path 42*d*2. By providing the filtering member 74 in the first water discharge path 42*d*1, the flow of liquid is dispersed or decelerated while passing through the filtering member 74. Due to this, it is possible to avoid forceful discharge or gushing of the liquid from the slot 14.

There may be cases where solid debris such as dust, fallen leaves, paper, or the like intrudes into the slot 14 from the insertion port 26*c* of the slot 14. By providing the filtering member 74 in the first water discharge path 42d1, debris can be contained inside the slot 14. The debris contained inside the slot 14 can be removed along with the filtering member 74.

Since the intake port 42c and the water discharge path 42d are formed in the bottom portion 23a of the bottom cover 42, in a state where the bottom cover 42 has been removed from the slot body 22, cleaning or the like of the intake port 42c and the water discharge path 42d can be performed.

Third Embodiment

In the battery exchanger 10 of the present embodiment, the shape of the bottom cover 42 differs from that of the battery exchanger 10 of the first embodiment. Aside from the configuration described below, the configuration of the battery exchanger 10 of the present embodiment is the same as that of the battery exchanger 10 of the first embodiment.

Figure 47:
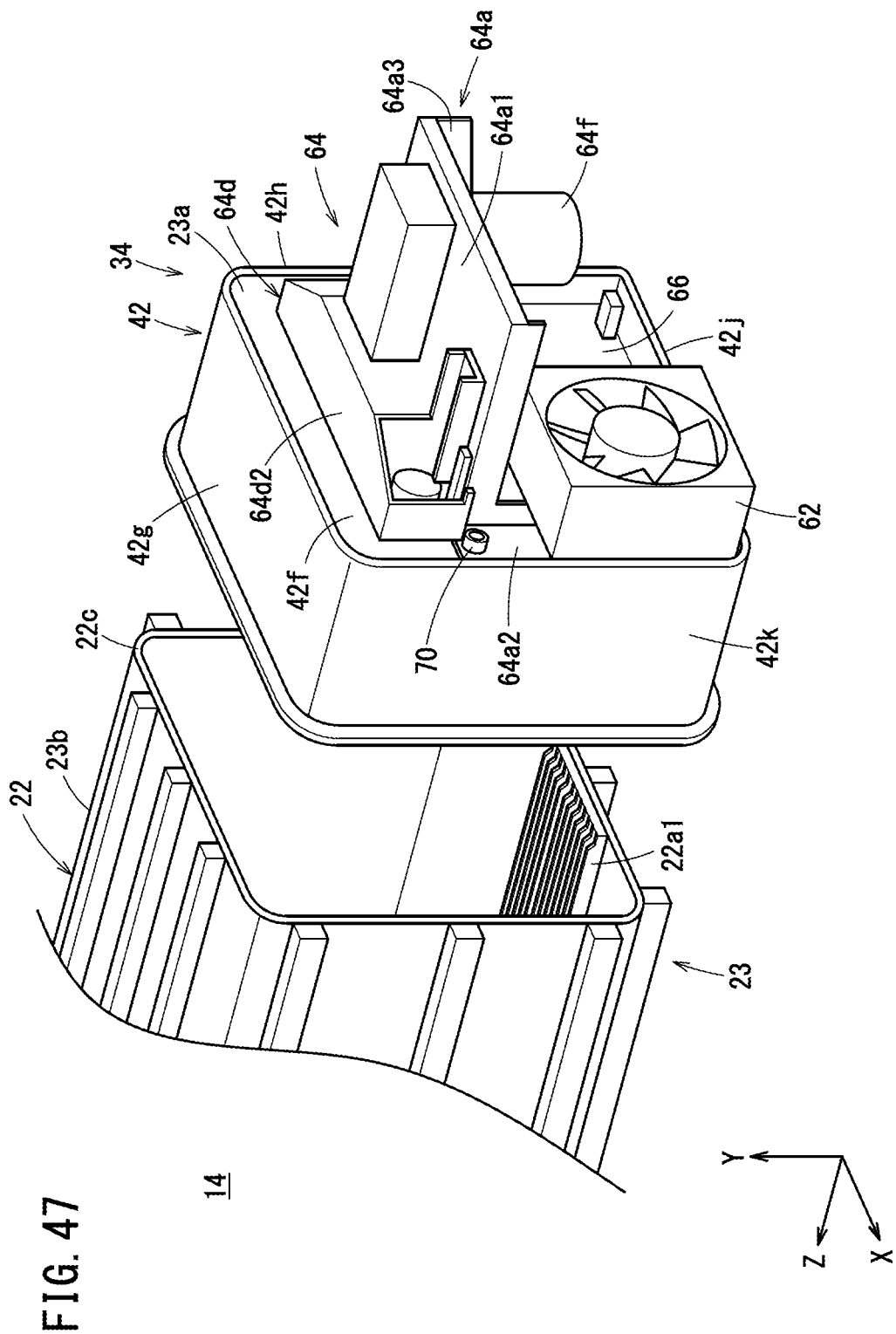
FIG. 47 is a perspective view of the slot.

FIG. 47 is a perspective view of the slot 14. FIG. 47 shows a state in which the bottom cover assembly 34 has been removed from the slot body 22.

The bottom cover 42 includes one bottom surface 42f and four side surfaces 42g, 42h, 42j, and 42k. The bottom surface 42f is formed as a rectangle, when viewed from the +Z-axis direction. As shown in FIG. 47, the side surfaces 42g, 42h, 42j, and 42k each extend in the +Z-axis direction respectively from the four edges of the bottom surface 42f.

Fourth Embodiment

Figure 48:
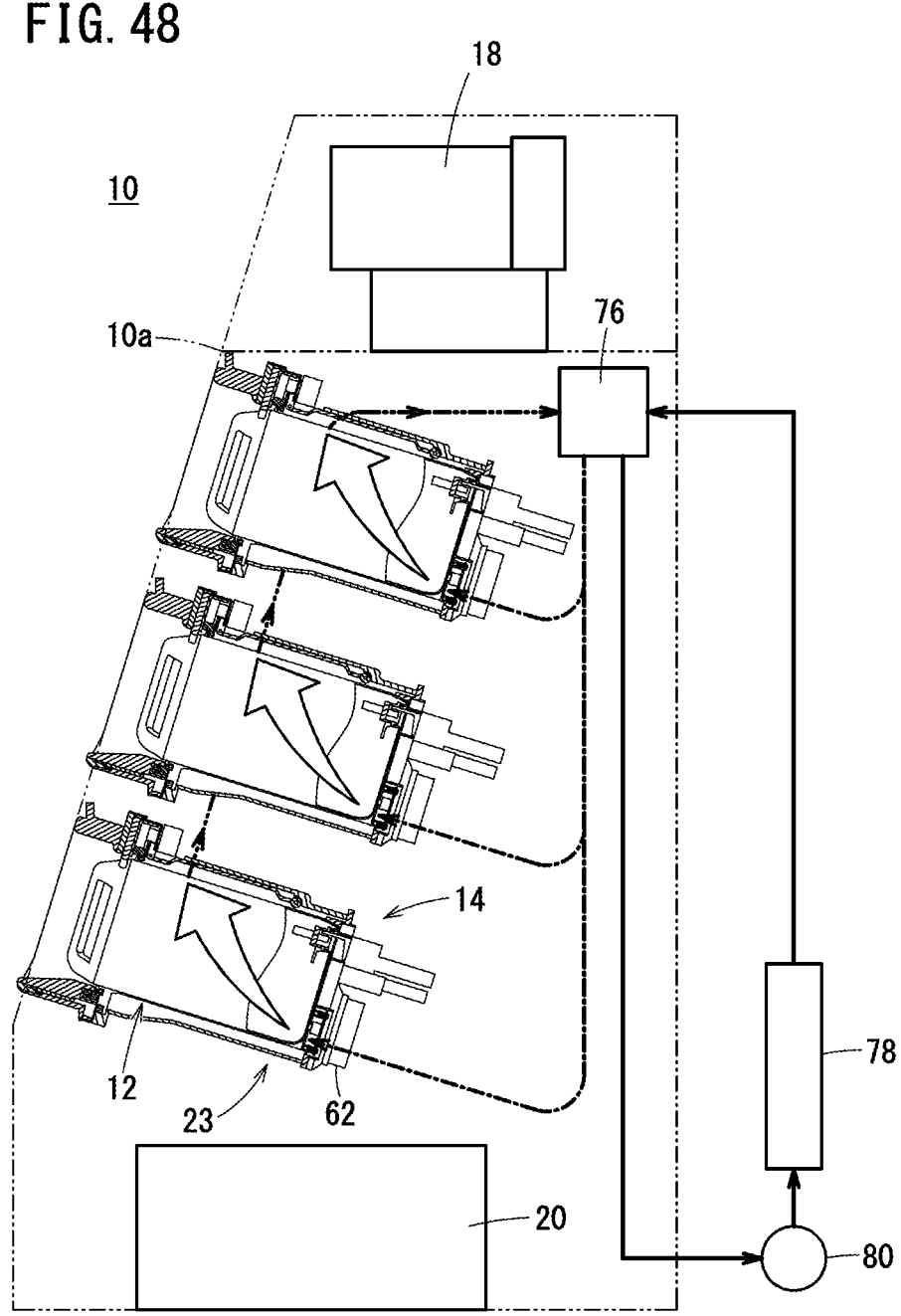
FIG. 48 is a cross-sectional schematic view of the battery exchanger.

FIG. 48 is a cross-sectional schematic view of the battery exchanger 10. The battery exchanger 10 of the present embodiment includes an indoor unit 76, an outdoor unit 78, and a compressor 80. Aside from the configuration described below, the configuration of the battery exchanger 10 of the present embodiment is the same as that of the battery exchanger 10 of the first embodiment.

The indoor unit 76 and the outdoor unit 78 are heat exchangers. The indoor unit 76 causes a refrigerant (cooling medium) to absorb heat from the air inside the battery exchanger 10. The refrigerant that has absorbed the heat is sent to the compressor 80. The compressor 80 compresses the refrigerant. The compressed refrigerant is sent to the outdoor unit 78. The outdoor unit 78 discharges the heat of the refrigerant to the outside of the battery exchanger 10.

The single-dot chain line arrows in FIG. 48 indicate the flow of air cooled by the indoor unit 76. The arrows drawn inside the slot 14 in FIG. 48 indicate the flow of the air inside the slot 14. The two-dot chain line arrows in FIG. 48 indicate the flow of warmed air inside the slot 14. The flow of air indicated by the arrows in FIG. 48 shows an image of the air flow, and does not show the actual air flow.

The air cooled by the indoor unit 76 is sent inside the slot sleeve 23 by the fan 62. The air sent inside the slot sleeve 23 absorbs the heat of the mobile battery 12, while passing through the inside of the slot sleeve 23. The air discharged from the slot sleeve 23 returns to the indoor unit 76.

Due to this, the battery exchanger 10 of the present embodiment can cool the mobile battery 12 stored in the slot sleeve 23 of each slot 14.

The present invention is not limited to the above-described embodiment, and it goes without saying that various modifications could be adopted therein without departing from the essence and gist of the present invention.

In the first to fourth embodiments described above, the slots 14 of the battery exchanger 10 that charges the mobile battery 12 are described. However, the slots 14 of the first to fourth embodiments may be applied to another apparatus.

In the first to fourth embodiments described above, each slot 14 is a device that stores the mobile battery 12 serving as an electric device. However, the mobile battery 12 and a power converter may be included inside the slot 14, and a power supply device (battery power source) capable of supplying electric power to the outside may be stored therein. Furthermore, the slot 14 may be a device that stores some other electric device.

As an example, the slot 14 may be applied to a stationary power supply apparatus installed in houses, buildings, factories, or the like. Furthermore, the slot 14 may be applied to moving bodies such as automobiles, aircraft, or ships. In a case where the slot 14 is applied to such a stationary power supply apparatus, such a moving body, or the like, the mobile battery 12 stored in the slot sleeve 23 supplies electric power by discharging and is also charged by the stationary power supply apparatus, moving body, or the like.

In the first to fourth embodiments described above, the slot sleeve 23 covers the entire mobile battery 12 being held. However, the slot sleeve 23 may be a member that covers a portion of the mobile battery 12 being held.

In the first to fourth embodiments described above, when the connector 64e of the connector unit 64 has moved in the +Z-axis direction, the tip of the connector 64e passes through the connector insertion hole 42b, to be exposed on the +Z-axis direction side of the bottom cover 42. However, the connector 64e may be fixed in an unmovable manner to the bottom portion 23a of the bottom cover 42. In such a case, in a state where the tip of the connector 64e is inserted into the connector insertion hole 42b of the bottom portion 23a from the −Z-axis direction side, the connector 64e is fixed in an unmovable manner to the bottom portion 23a. The tip of the connector 64e is constantly exposed in the +Z-axis direction side of the bottom cover 42.

In the first to fourth embodiments described above, the battery lock mechanism 30 is provided in a manner to be capable of moving back and forth at a position that does not overlap with the mobile battery 12 stored in the slot 14. When the battery lock mechanism 30 is in the locked state, the movement of the mobile battery 12 in the +Z-axis direction is restricted due to the plate 30b abutting against the top surface 12a of the mobile battery 12.

The battery lock mechanism 30 may be provided in a manner capable of moving back and forth at a position that overlaps with the mobile battery 12 stored in the slot 14. The battery lock mechanism 30 may restrict the movement of the mobile battery 12 in the +Z-axis direction by abutting against abutment portions (not shown in the drawings) provided on the side surfaces 12c, 12d, 12e, and 12f. In this case, the technology disclosed in JP H10-313543 A may be applied to the slot 14 of the first to fourth embodiments.

Furthermore, a door (not shown in the drawings) may be provided at a position that is further on the +Z-axis direction side than the mobile battery 12 stored in the slot sleeve 23. In this case, the battery lock mechanism 30 may be used as a mechanism that locks and unlocks this door.

The invention claimed is:

1. A storage apparatus comprising:
   a storage portion that includes an insertion port into which an electric device is inserted, the storage portion being configured to store the electric device in an insertable and removable manner; and
   a protruding portion that protrudes from an inner peripheral surface of the storage portion, wherein:

the storage portion includes a tubular portion and a bottom portion connected to the tubular portion;
the tubular portion surrounds an outer periphery of the electric device stored in the storage portion;
the bottom portion includes a first communication path configured to allow an outside and an inside of the storage portion to communicate with each other;
the tubular portion includes a second communication path configured to allow the outside and the inside of the storage portion to communicate with each other; and
the protruding portion extends in a direction in which the electric device is inserted into and removed from the storage portion.

2. The storage apparatus according to claim 1, wherein:
the first communication path is arranged on a side of a first direction, the first direction being one direction in a horizontal direction, relative to an axial line that passes through a center of the storage portion and extends in a direction in which the electric device is inserted into and removed from the storage portion; and
the second communication path is arranged on a side of a second direction, the second direction being another direction in the horizontal direction, which is opposite to the first direction, relative to the axial line.

3. The storage apparatus according to claim 2, wherein:
the second communication path is arranged on a side of a fifth direction relative to the center of the storage portion, the fifth direction being a direction in which the electric device is removed, among the direction in which the electric device is inserted into and removed from the storage portion.

4. The storage apparatus according to claim 3, wherein:
when the bottom portion is viewed from the direction in which the electric device is inserted into and removed from the storage portion, the bottom portion has a rectangular shape;
the tubular portion includes four surfaces that extend in the fifth direction respectively from four edges of the bottom portion.

5. The storage apparatus according to claim 1, wherein:
the first communication path is arranged on a side of a third direction, the third direction being one direction in a vertical direction, relative to an axial line that passes through a center of the storage portion and extends in a direction in which the electric device is inserted into and removed from the storage portion; and
the second communication path is arranged on a side of a fourth direction, the fourth direction being another direction in the vertical direction, which is opposite to the third direction, relative to the axial line.

6. The storage apparatus according to claim 5, comprising:
a second electric terminal configured to be connected to a first electric terminal of the electric device, wherein:
the bottom portion includes a third communication path configured to allow the outside and the inside of the storage portion to communicate with each other;
at least a portion of the second electric terminal is inserted through the third communication path; and
the third communication path is arranged on a side of the fourth direction relative to the first communication path.

7. The storage apparatus according to claim 6, wherein:
the fourth direction is upward in the vertical direction; and
the third communication path is arranged at a position higher than the first communication path.

8. The storage apparatus according to claim 7, wherein:
the bottom portion includes a fourth communication path configured to allow the outside and the inside of the storage portion to communicate with each other, on a side of the third direction relative to the first communication path; and
the fourth communication path is arranged at a position lower than the first communication path.

9. The storage apparatus according to claim 8, comprising:
a filtering member arranged in the fourth communication path.

10. The storage apparatus according to claim 5, wherein:
the second communication path is disposed on a surface, of an outer surface of the tubular portion, that faces upward.

11. The storage apparatus according to claim 1, comprising:
an inner peripheral protruding portion provided protruding from an inner peripheral surface of the storage portion, wherein:
the inner peripheral protruding portion extends along a circumferential direction around an axial line that extends in a direction in which the electric device is inserted into and removed from the storage portion.

12. The storage apparatus according to claim 11, wherein:
the inner peripheral protruding portion includes a flexible portion on a tip thereof protruding from the inner peripheral surface of the storage portion.

13. The storage apparatus according to claim 12, wherein:
the tip of the flexible portion, when the electric device is not stored in the storage portion, is positioned more inward than an outer peripheral surface of the electric device when the electric device is stored in the storage portion.

14. The storage apparatus according to claim 11, wherein:
the second communication path is arranged on the tubular portion at a side of a fifth direction relative to a center of the storage portion in the direction in which the electric device is inserted into and removed from the storage portion, the fifth direction being a direction in which the electric device is removed; and
the inner peripheral protruding portion is arranged on the side of the fifth direction relative to the second communication path.

15. The storage apparatus according to claim 1, comprising:
a blowing portion configured to facilitate flow of air between the inside and the outside of the storage portion.

16. The storage apparatus according to claim 15, wherein:
the blowing portion is attached to a surface of the bottom portion opposite to a surface that faces toward the tubular portion, at a position corresponding to the first communication path, and is supported by the bottom portion.

17. An electric power system comprising the storage apparatus according to claim 15, further comprising:
a heat exchanger configured to absorb heat of air inside the electric power system, wherein:
the blowing portion supplies air, which has absorbed heat through the heat exchanger, to the inside of the storage portion via the first communication path.

18. A storage apparatus comprising:
a storage portion that includes an insertion port into which an electric device is inserted, the storage portion being configured to store the electric device in an insertable and removable manner; and a second electric terminal configured to be connected to a first electric terminal of the electric device, wherein:

the storage portion includes a tubular portion and a bottom portion connected to the tubular portion;

the tubular portion surrounds an outer periphery of the electric device stored in the storage portion;

the bottom portion includes a first communication path configured to allow an outside and an inside of the storage portion to communicate with each other;

the tubular portion includes a second communication path configured to allow the outside and the inside of the storage portion to communicate with each other;

the first communication path is arranged on a side of a third direction, the third direction being one direction in a vertical direction, relative to an axial line that passes through a center of the storage portion and extends in a direction in which the electric device is inserted into and removed from the storage portion;

the second communication path is arranged on a side of a fourth direction, the fourth direction being another direction in the vertical direction, which is opposite to the third direction, relative to the axial line;

the bottom portion includes a third communication path configured to allow the outside and the inside of the storage portion to communicate with each other;

at least a portion of the second electric terminal is inserted through the third communication path;

the third communication path is arranged on a side of the fourth direction relative to the first communication path;

the fourth direction is upward in the vertical direction;

the third communication path is arranged at a position higher than the first communication path;

the bottom portion includes a fourth communication path configured to allow the outside and the inside of the storage portion to communicate with each other, on a side of the third direction relative to the first communication path; and the fourth communication path is arranged at a position lower than the first communication path.

19. A storage apparatus comprising:

a storage portion that includes an insertion port into which an electric device is inserted, the storage portion being configured to store the electric device in an insertable and removable manner; and an inner peripheral protruding portion provided protruding from an inner peripheral surface of the storage portion, wherein:

the storage portion includes a tubular portion and a bottom portion connected to the tubular portion;

the tubular portion surrounds an outer periphery of the electric device stored in the storage portion;

the bottom portion includes a first communication path configured to allow an outside and an inside of the storage portion to communicate with each other;

the tubular portion includes a second communication path configured to allow the outside and the inside of the storage portion to communicate with each other; and the inner peripheral protruding portion extends along a circumferential direction around an axial line that extends in a direction in which the electric device is inserted into and removed from the storage portion.

20. A storage apparatus comprising:

a storage portion that includes an insertion port into which an electric device is inserted, the storage portion being configured to store the electric device in an insertable and removable manner; and a second electric terminal configured to be connected to a first electric terminal of the electric device, wherein:

the storage portion includes a tubular portion and a bottom portion connected to the tubular portion;

the tubular portion surrounds an outer periphery of the electric device stored in the storage portion;

the bottom portion includes a first communication path configured to allow an outside and an inside of the storage portion to communicate with each other;

the tubular portion includes a second communication path configured to allow the outside and the inside of the storage portion to communicate with each other;

the first communication path is arranged on a side of a third direction, the third direction being one direction in a vertical direction, relative to an axial line that passes through a center of the storage portion and extends in a direction in which the electric device is inserted into and removed from the storage portion;

the second communication path is arranged on a side of a fourth direction, the fourth direction being another direction in the vertical direction, which is opposite to the third direction, relative to the axial line;

the bottom portion includes a third communication path configured to allow the outside and the inside of the storage portion to communicate with each other;

at least a portion of the second electric terminal is inserted through the third communication path; and the third communication path is arranged on the side of the fourth direction relative to the first communication path.

21. The storage apparatus according to claim 20, wherein:

the fourth direction is upward in the vertical direction; and the third communication path is arranged at a position higher than the first communication path.

22. The storage apparatus according to claim 20, wherein the second electric terminal is driven forward and backward by a motor, and at least a portion of the second electric terminal is configured to move inside the third communication path.

* * * * *